US012633594B2

(12) United States Patent
Taniguchi et al.

(10) Patent No.: US 12,633,594 B2
(45) Date of Patent: May 19, 2026

(54) VEHICLE AND BATTERY PACK

(71) Applicant: PANASONIC INTELLECTUAL PROPERTY MANAGEMENT CO., LTD., Osaka (JP)

(72) Inventors: Katsuji Taniguchi, Kanagawa (JP); Yuki Makita, Kanagawa (JP); Yoshitoshi Noda, Kanagawa (JP); Atsushi Sueyoshi, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 567 days.

(21) Appl. No.: 18/190,541

(22) Filed: Mar. 27, 2023

(65) Prior Publication Data

US 2023/0231228 A1 Jul. 20, 2023

Related U.S. Application Data

(63) Continuation of application No. PCT/JP2021/028520, filed on Jul. 30, 2021.

(30) Foreign Application Priority Data

Sep. 28, 2020 (JP) ................................. 2020-162731
Sep. 28, 2020 (JP) ................................. 2020-162732
(Continued)

(51) Int. Cl.
*H01M 10/6568* (2014.01)
*B60K 1/04* (2019.01)
(Continued)

(52) U.S. Cl.
CPC ........... *H01M 10/6568* (2015.04); *B60K 1/04* (2013.01); *B60K 11/02* (2013.01); *H01M 10/617* (2015.04);
(Continued)

(58) Field of Classification Search
None
See application file for complete search history.

(56) References Cited

U.S. PATENT DOCUMENTS

2011/0262794 A1 10/2011 Yoon
2012/0003521 A1 1/2012 Sohn
(Continued)

FOREIGN PATENT DOCUMENTS

DE 102019118356 1/2020
DE 102019135260 6/2020
(Continued)

OTHER PUBLICATIONS

JP-2020100389-A English machine translation (Year: 2020).*
(Continued)

*Primary Examiner* — Scott J. Chmielecki
(74) *Attorney, Agent, or Firm* — Greenblum & Bernstein, P.L.C.

(57) ABSTRACT

A battery pack includes a battery module group including a plurality of battery modules, a coolant layer configured to allow a coolant to circulate, and a refrigerant layer configured to allow a refrigerant to circulate. The coolant layer includes a first surface and a second surface opposite to the first surface. The refrigerant layer includes a third surface and a fourth surface opposite to the third surface. The first surface of the coolant layer is closer to the battery module group than the second surface of the coolant layer. The third surface of the refrigerant layer is closer to the battery module group than the fourth surface of the refrigerant layer. The battery module group is arranged along the first surface of the coolant layer. At least part of the coolant layer is arranged between the refrigerant layer and the battery module group in a plan view.

20 Claims, 45 Drawing Sheets

(30)        Foreign Application Priority Data

Sep. 28, 2020    (JP) ................................ 2020-162733
Oct. 7, 2020    (JP) ................................ 2020-169909

(51)  Int. Cl.
       *B60K 11/02*        (2006.01)
       *H01M 10/617*       (2014.01)
       *H01M 10/625*       (2014.01)
       *H01M 10/6554*      (2014.01)
       *H01M 50/20*        (2021.01)
(52)  U.S. Cl.
       CPC ..... *H01M 10/625* (2015.04); *H01M 10/6554*
                 (2015.04); *H01M 50/20* (2021.01); *H01M*
                 *2220/20* (2013.01)

(56)              References Cited

U.S. PATENT DOCUMENTS

| | | | |
|---|---|---|---|
| 2016/0087319 | A1 | 3/2016 | Roh et al. |
| 2019/0123405 | A1 | 4/2019 | Jeon et al. |
| 2019/0379014 | A1 | 12/2019 | Jeon |

FOREIGN PATENT DOCUMENTS

| | | | | | |
|---|---|---|---|---|---|
| JP | 2007-139288 | A | 6/2007 | | |
| JP | 2008-059950 | | 3/2008 | | |
| JP | 2010-50000 | A | 3/2010 | | |
| JP | 2011-228301 | A | 11/2011 | | |
| JP | 2012-15112 | | 1/2012 | | |
| JP | 2014-229480 | | 12/2014 | | |
| JP | 2015-069845 | | 4/2015 | | |
| JP | 2016-511509 | | 4/2016 | | |
| JP | 5983534 | B2 | 8/2016 | | |
| JP | 2018-127087 | A | 8/2018 | | |
| JP | 2020-9694 | A | 1/2020 | | |
| JP | 2020100389 | A | * 7/2020 | ........... | H01M 50/20 |
| WO | 2019-139022 | | 7/2019 | | |
| WO | 2019-155810 | | 8/2019 | | |

OTHER PUBLICATIONS

Official Communication in Japanese patent application 2020-162733 issued Dec. 19, 2023, along with English translation thereof.
Official Communication in Japanese patent application 2020-169909 issued Dec. 19, 2023, along with English translation thereof.
Official Action in Japanese Patent Application No. 2024-093808 dated Mar. 5, 2025, along with English translation thereof.
Official communication issued in German application 11 2021 005 081.8 dated Apr. 22, 2024, along with English translation.
Official Communication issued in International Patent Application No. PCT/JP2021/028520, dated Oct. 19, 2021, along with an English translation thereof.

* cited by examiner

DIRECT CONNECTION

FLANGE CONNECTION

VEHICLE AND BATTERY PACK

CROSS-REFERENCE TO RELATED APPLICATIONS

This is a continuation of International Application No. PCT/JP2021/028520 filed on Jul. 30, 2021, and claims priority from Japanese Patent Application No. 2020-162731 filed on Sep. 28, 2020, Japanese Patent Application No. 2020-162732 filed on Sep. 28, 2020, Japanese Patent Application No. 2020-162733 filed on Sep. 28, 2020 and Japanese Patent Application No. 2020-169909 filed on Oct. 7, 2020, the entire content of which is incorporated herein by reference.

TECHNICAL FIELD

The present disclosure relates to a vehicle and a battery pack.

BACKGROUND ART

In a hybrid vehicle and an electric vehicle, an in-vehicle battery configured to supply power to a motor serving as a drive source is mounted. There is a hybrid heat exchanger configured to simultaneously supply a refrigerant and a coolant, in order to prevent an increase in temperature of an in-vehicle battery (see JP2010-050000A).

SUMMARY OF INVENTION

The hybrid heat exchanger handles both the refrigerant and the coolant, and thus has a more complicated configuration than a heat exchanger that handles only the refrigerant or only the coolant. Accordingly, a better configuration of the hybrid heat exchanger is not sufficiently studied.

An object of the present disclosure is to provide a battery pack and a vehicle, in which a hybrid heat exchanger having a better configuration is mounted.

A vehicle according to an aspect of the present disclosure includes: a battery module group including a plurality of battery modules; a coolant layer configured to allow a coolant to circulate; a refrigerant layer configured to allow a refrigerant to circulate; a first wheel and a second wheel that are coupled to a vehicle body; and an electric motor configured to drive at least the first wheel using power supplied from the battery module group. The coolant layer has a first surface and a second surface opposite to the first surface. The refrigerant layer has a third surface and a fourth surface opposite to the third surface. The first surface of the coolant layer is closer to the battery module group than the second surface of the coolant layer. The third surface of the refrigerant layer is closer to the battery module group than the fourth surface of the refrigerant layer. The battery module group is arranged along the first surface of the coolant layer. At least part of the coolant layer is arranged between the refrigerant layer and the battery module group in a plan view.

A battery pack according to an aspect of the present disclosure is mountable on a vehicle, the vehicle including a first wheel and a second wheel that are coupled to a vehicle body, and an electric motor configured to drive at least the first wheel, and the battery pack includes: a battery module group including a plurality of battery modules; a coolant layer configured to allow a coolant to circulate; and a refrigerant layer configured to allow a refrigerant to circulate. The coolant layer includes a first surface and a second surface opposite to the first surface. The refrigerant layer includes a third surface and a fourth surface opposite to the third surface. The first surface of the coolant layer is closer to the battery module group than the second surface of the coolant layer. The third surface of the refrigerant layer is closer to the battery module group than the fourth surface of the refrigerant layer. The battery module group is arranged along the first surface of the coolant layer. At least part of the coolant layer is arranged between the refrigerant layer and the battery module group in a plan view.

According to the present disclosure, it is possible to provide a battery pack and a vehicle on which a hybrid heat exchanger having a better configuration is mounted.

DESCRIPTION OF EMBODIMENTS

Hereinafter, embodiments of the present disclosure will be described in detail with reference to the drawings as appropriate. However, unnecessarily detailed descriptions may be omitted. For example, detailed descriptions of well-known matters and repeated descriptions of substantially the same configurations may be omitted. This is to avoid unnecessary redundancy in the following description and to facilitate understanding for those skilled in the art. The accompanying drawings and the following description are provided for those skilled in the art to fully understand the present disclosure, and are not intended to limit the claimed subject matter described in the claims.

First Embodiment

<Configuration of Vehicle>

Figure 1A:
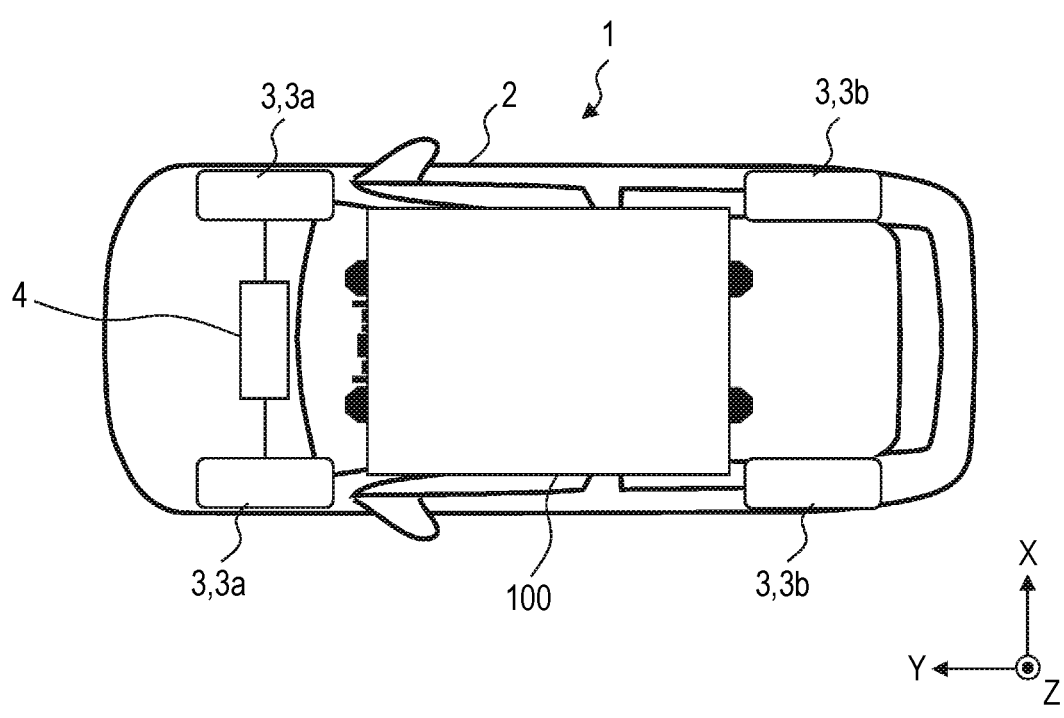
FIG. 1A is a plan view showing a configuration example of a vehicle according to a first embodiment.
Figure 1B:
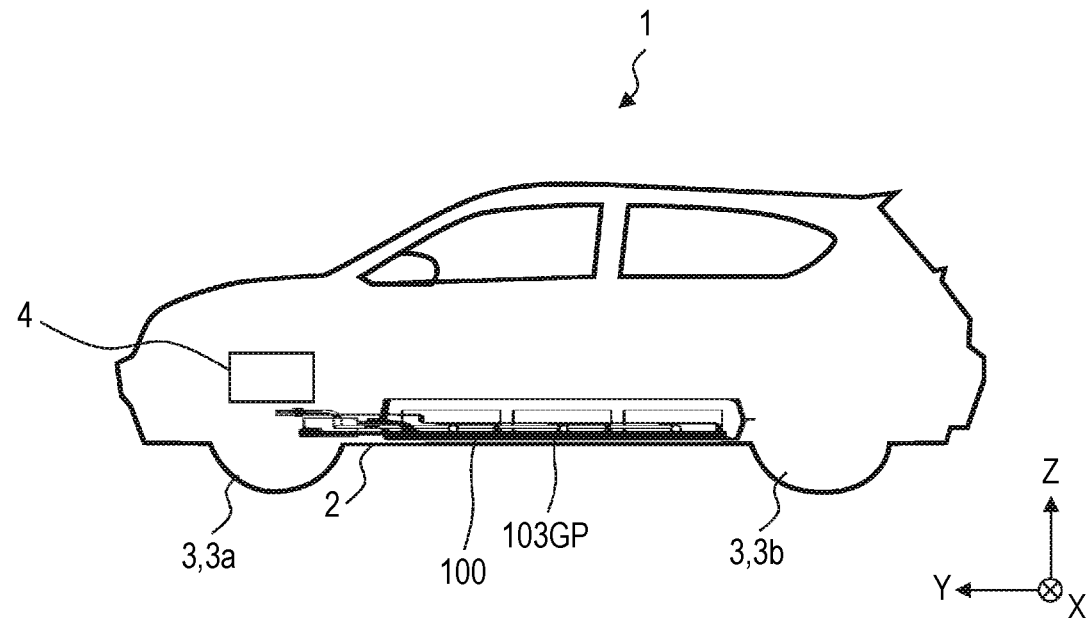
FIG. 1B is a left side view showing the configuration example of the vehicle according to the first embodiment.

FIG. 1A is a plan view showing a configuration example of a vehicle 1 according to a first embodiment. FIG. 1B is a left side view showing the configuration example of the vehicle 1 according to the first embodiment.

For convenience of description, as shown in FIGS. 1A and 1B, an axis extending in a height direction of the vehicle 1 is taken as a Z axis. An axis perpendicular to the Z axis (that is, parallel to the ground) and extending in a traveling direction of the vehicle 1 is taken as a Y axis. An axis perpendicular to the Y axis and the Z axis (that is, an axis in a width direction of the vehicle 1) is taken as an X axis. Further, for convenience of description, a positive direction of the Z axis may be referred to as "up", a negative direction of the Z axis may be referred to as "down", a positive direction of the Y axis may be referred to as "front", a negative direction of the Y axis may be referred to as "rear", a positive direction of the X axis may be referred to as "right", and a negative direction of the X axis may be referred to as "left". These expressions also apply to other drawings in which the X, Y, and Z axes are described. The expressions related to these directions are used for convenience of description and are not intended to limit the posture of the structure in actual use.

The vehicle 1 includes a vehicle body 2, wheels 3, an electric motor 4, and a battery pack 100.

The battery pack 100 is stored in the vehicle body 2. The battery pack 100 includes a plurality of battery modules 103 which are chargeable and dischargeable. Hereinafter, the plurality of battery modules 103 included in the battery pack 100 are referred to as a battery module group 103GP. Examples of the battery module 103 include a lithium ion battery. The battery module group 103GP supplies (discharges) accumulated power to the electric motor 4 and the like. The battery module group 103GP may accumulate (charge) the power generated by the electric motor 4 by regenerative energy. As shown in FIGS. 1A and 1B, the battery pack 100 may be stored under a floor of the vehicle body 2 at the center. Details of the battery pack 100 will be described later.

The wheels 3 are coupled to the vehicle body 2. FIGS. 1A and 1B show an automobile in which the vehicle 1 includes four wheels 3, but the vehicle 1 may include at least one wheel 3. For example, the vehicle 1 may be a motorcycle including two wheels 3, or may be a vehicle including three or five or more wheels 3. One of the plurality of wheels 3 included in the vehicle 1 may be referred to as a first wheel 3a, and one of the plurality of wheels 3 different from the first wheel 3a may be referred to as a second wheel 3b. The first wheels 3a may be front wheels of the vehicle 1, and the second wheels 3b may be rear wheels of the vehicle 1. The vehicle 1 is movable in a predetermined direction (for example, a front-rear direction) by the first wheel 3a and the second wheel 3b.

The electric motor 4 drives the at least one wheel 3 (for example, the first wheel 3a) using the power supplied from the battery module group 103GP. The vehicle 1 includes the at least one electric motor 4. The vehicle 1 may have a configuration in which the electric motor 4 drives the front wheels (that is, front-wheel drive). Alternatively, the vehicle 1 may have a configuration in which the electric motor 4 drives the rear wheels (that is, rear-wheel drive), or a configuration in which the electric motor 4 drives both the front wheels and the rear wheels (that is, four wheel drive). Alternatively, the vehicle 1 may include a plurality of electric motors 4, and the plurality of electric motors 4 may drive the wheels 3, respectively. The electric motor 4 may be installed in a motor room (engine room) located at a front side of the vehicle 1.

<Configuration of Electric Circuit>

Figure 2:
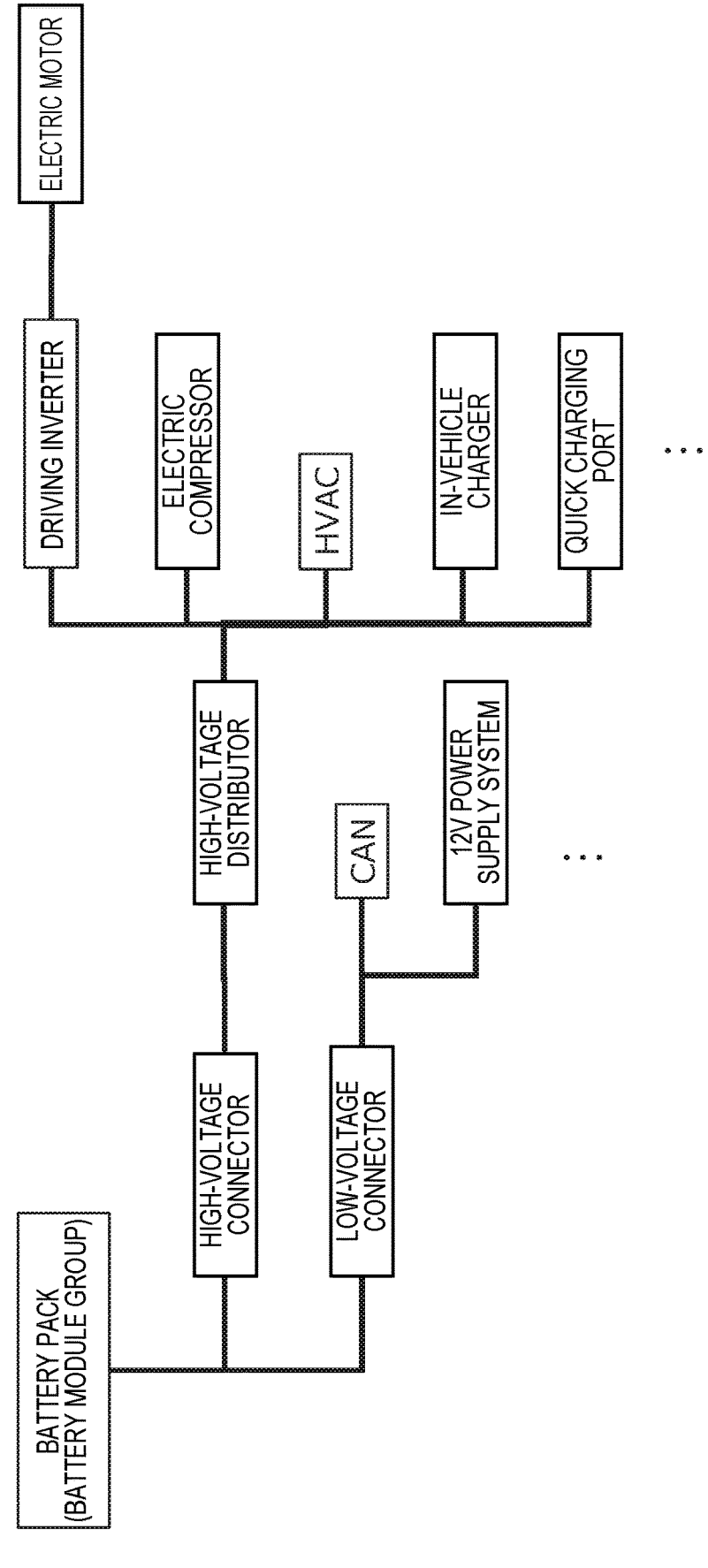
FIG. 2 is a diagram showing an example of an electric circuit included in the vehicle according to the first embodiment.

FIG. 2 is a diagram showing an example of an electric circuit included in the vehicle 1 according to the first embodiment.

The battery pack 100 including the battery module group 103GP includes a high-voltage connector and a low-voltage connector. In the present disclosure, the high-voltage connector and the low-voltage connector are referred to as an electrical connector 115 (see FIG. 3A) without being distinguished from each other.

A high-voltage distributor may be connected to the high-voltage connector. A driving inverter, a compressor 141 (see FIG. 4), a heating, ventilation, and air conditioning (HVAC), an in-vehicle charger, and a quick charging port may be connected to the high-voltage distributor. A controller area network (CAN) and a 12 V power supply system may be connected to the low-voltage connector.

The electric motor 4 may be connected to the driving inverter. That is, the power output from the battery module group 103GP may be supplied to the electric motor 4 through the high-voltage connector, the high-voltage distributor, and the driving inverter.

<Configuration of Battery Pack>

Figure 3A:
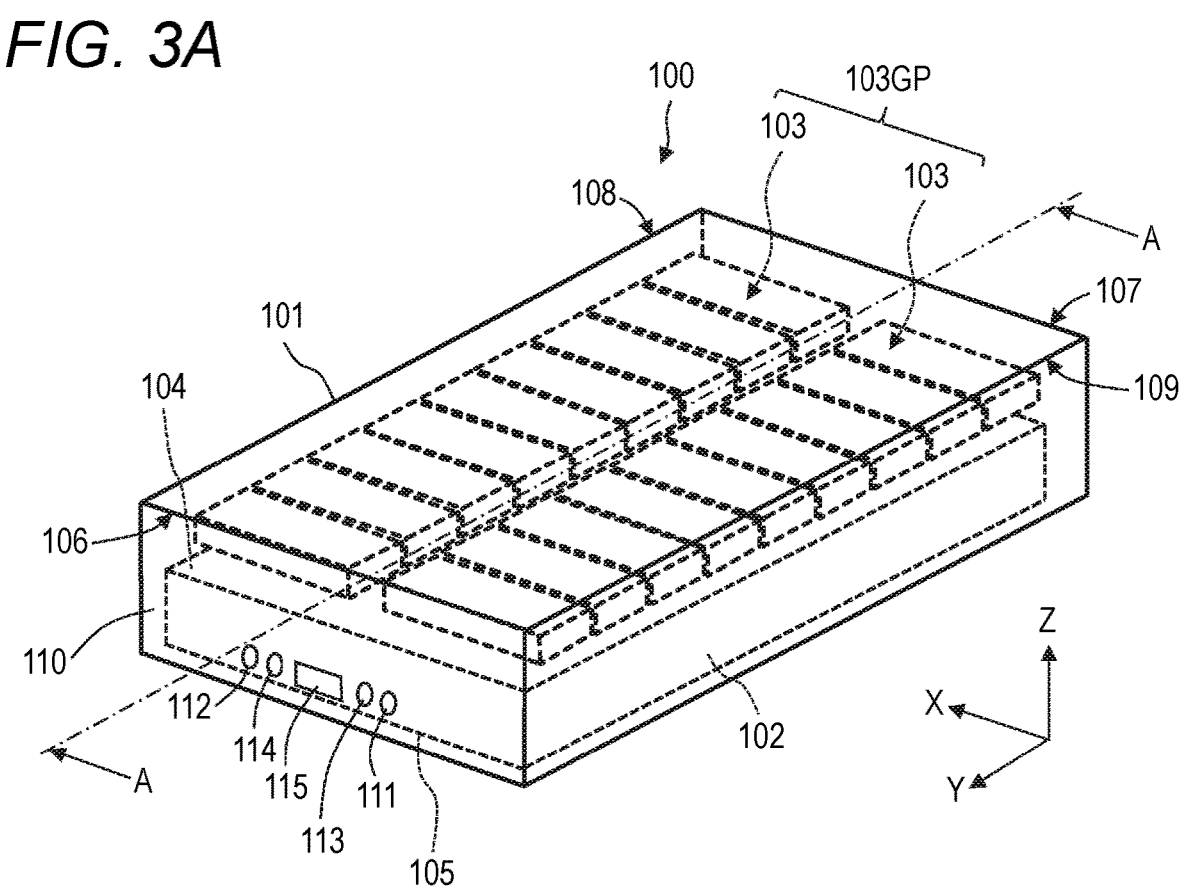
FIG. 3A is a perspective view showing a configuration example of a battery pack according to the first embodiment.
Figure 3B:
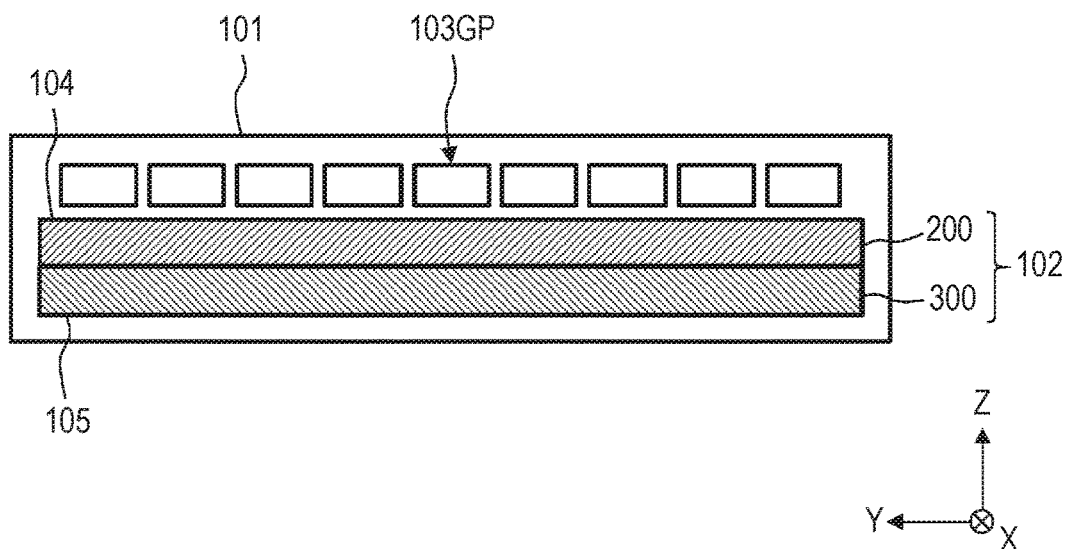
FIG. 3B is a cross-sectional view showing the configuration example of the battery pack according to the first embodiment.
Figure 3C:
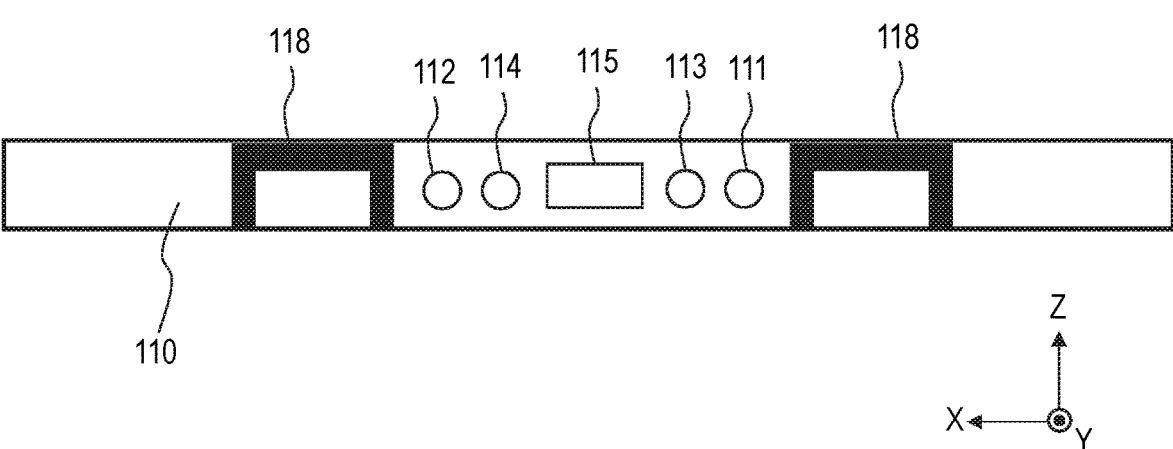
FIG. 3C is a front view showing the configuration example of the battery pack according to the first embodiment.

FIG. 3A is a perspective view showing a configuration example of the battery pack 100 according to the first embodiment. FIG. 3B is a cross-sectional view showing the configuration example of the battery pack 100 according to the first embodiment. The cross-sectional view shown in FIG. 3B is a cross-sectional view taken along a line A-A of the battery pack 100 shown in FIG. 3A. FIG. 3C is a front view (view seen from the positive direction of the Y axis) showing the configuration example of the battery pack 100 according to the first embodiment.

The battery pack 100 includes a housing 101, a heat exchange plate 102, and the battery module group 103GP. The housing 101 stores the heat exchange plate 102 and the battery module group 103GP.

The heat exchange plate 102 has, for example, a flat and substantially rectangular parallelepiped shape, and includes a first surface 104 and a second surface 105 opposite to (facing) the first surface 104. In the present embodiment, the first surface 104 is described as an upper surface, and the second surface 105 is described as a lower surface. However, the first surface 104 may be the lower surface, and the second surface 105 may be the upper surface. The heat exchange plate 102 may be read as a heat exchanger.

The heat exchange plate 102 includes a coolant layer 200 that allows a coolant to circulate and a refrigerant layer 300 that allows a refrigerant to circulate between the first surface 104 and the second surface 105. Examples of the coolant includes an antifreeze containing ethylene glycol. Examples of the refrigerant include hydrofluorocarbon (HFC).

In the present embodiment, the heat exchange plate 102 has a configuration in which the coolant layer 200 is arranged on the refrigerant layer 300. Alternatively, the heat exchange plate 102 may have a configuration in which the refrigerant layer 300 is arranged on the coolant layer 200. The coolant layer 200 may be read as a coolant plate. The refrigerant layer 300 may be read as a refrigerant plate. A configuration example of the coolant layer 200 and the refrigerant layer 300 will be described later.

The housing 101 has a predetermined shape including a predetermined side in a plan view (that is, when viewed from above). The predetermined shape may include a first side 106, which is a predetermined side, and a second side 107 opposing the first side 106. In addition to the first side 106 and the second side 107, the predetermined shape may further include a third side 108 and a fourth side 109 opposing the third side 108. At least the third side 108 may be longer than the first side 106 and may be arranged along a predetermined direction (for example, the traveling direction of the vehicle 1). In other words, the housing 101 may have a substantially rectangular parallelepiped shape, and may have a rectangular shape in which short sides (first side 106 and second side 107) extend in a left-right direction of the vehicle 1 and long sides (third side 108 and fourth side 109) extend in the front-rear direction of the vehicle 1 in a plan view. The housing 101 may have a predetermined surface (hereinafter, referred to as a "front surface") 110 arranged along a direction from the first surface 104 to the second surface 105 of the heat exchange plate 102. The first side 106 of the housing 101 may be arranged between the electric motor 4 and the second side 107 of the housing 101. That is, the predetermined side (first side 106) of the housing 101 may be a side constituting the front surface 110 of the housing 101, which is close to the electric motor 4.

The housing 101 includes a coolant input port 111, a coolant output port 112, a refrigerant input port 113, a refrigerant output port 114, and the electrical connector 115, as interfaces of the battery pack 100. The coolant input port 111, the coolant output port 112, the refrigerant input port 113, the refrigerant output port 114, and the electrical connector 115 may be arranged on a predetermined side (first side 106) of the housing 101 when the housing 101 is viewed in a plan view (that is, when viewed from above). For example, the coolant input port 111, the coolant output port 112, the refrigerant input port 113, the refrigerant output port 114, and the electrical connector 115 may be arranged on the front surface 110 of the housing 101.

As shown in FIG. 3C, the coolant input port 111, the coolant output port 112, the refrigerant input port 113, the input port output port 114, and the electrical connector 115 may be arranged in a space between two fixing legs 118 that fix the vehicle body 2 and the battery pack 100 on the front surface 110.

The coolant input port 111 is an interface for inputting the coolant from the outside of the battery pack 100 to the coolant layer 200. The coolant input port 111 may be read as a coolant input portion. The coolant input portion may be a part of a coolant input pipe 121 (see FIG. 5) that continues from the outside of the battery pack 100 to the coolant layer 200. The coolant input pipe 121 may be read as a first pipe. The expression "outside" of the battery pack 100 means an outer side of the battery pack 100 inside the vehicle 1, and does not mean an outer side of the vehicle 1.

The coolant output port 112 is an interface for outputting the coolant from the coolant layer 200 to the outside of the battery pack 100. The coolant output port 112 may be read as a coolant output portion. The coolant output portion may be a part of a coolant output pipe 122 (see FIG. 5) that continues from the coolant layer 200 to the outside of the battery pack 100. The coolant output pipe 122 may be read as a second pipe.

The refrigerant input port 113 is an interface for inputting the refrigerant from the outside of the battery pack 100 to the refrigerant layer 300. The refrigerant input port 113 may be read as a refrigerant input portion. The refrigerant input portion may be a part of a refrigerant input pipe 123 (see FIG. 5) that continues from the outside of the battery pack 100 to the refrigerant layer 300. The refrigerant input pipe 123 may be read as a third pipe.

The refrigerant output port 114 is an interface for outputting the refrigerant from the refrigerant layer 300 to the outside of the battery pack 100. The refrigerant output port 114 may be read as a refrigerant output portion. The refrigerant output portion may be a part of a refrigerant output pipe 124 (see FIG. 5) that continues from the refrigerant layer 300 to the outside of the battery pack 100. The refrigerant output pipe 124 may be read as a fourth pipe.

The electrical connector 115 is a connector having an electrical contact, and is an interface for inputting and outputting power between the battery module group 103GP and the outside of the battery pack 100. The electrical connector 115 may be read as a power input/output portion. The electrical connector 115 and the battery module group 103GP may be connected by a bus bar 116 (see FIG. 5). The electrical connector 115 may include a signal connector that inputs and outputs a control signal of the battery module group 103GP, in addition to the high-voltage connector and the low-voltage connector that input and output power of the battery module group 103GP.

The battery module group 103GP is arranged along the first surface 104 of the heat exchange plate 102. The battery module group 103GP is cooled by the coolant circulating through the coolant layer 200 and the refrigerant circulating through the refrigerant layer 300 in the heat exchange plate 102. Configurations of a coolant circuit 130 through which the coolant circulates and a refrigerant circuit 140 through which the refrigerant circulates will be described later.

<Configuration of Coolant Circuit and Refrigerant Circuit>

Figure 4:
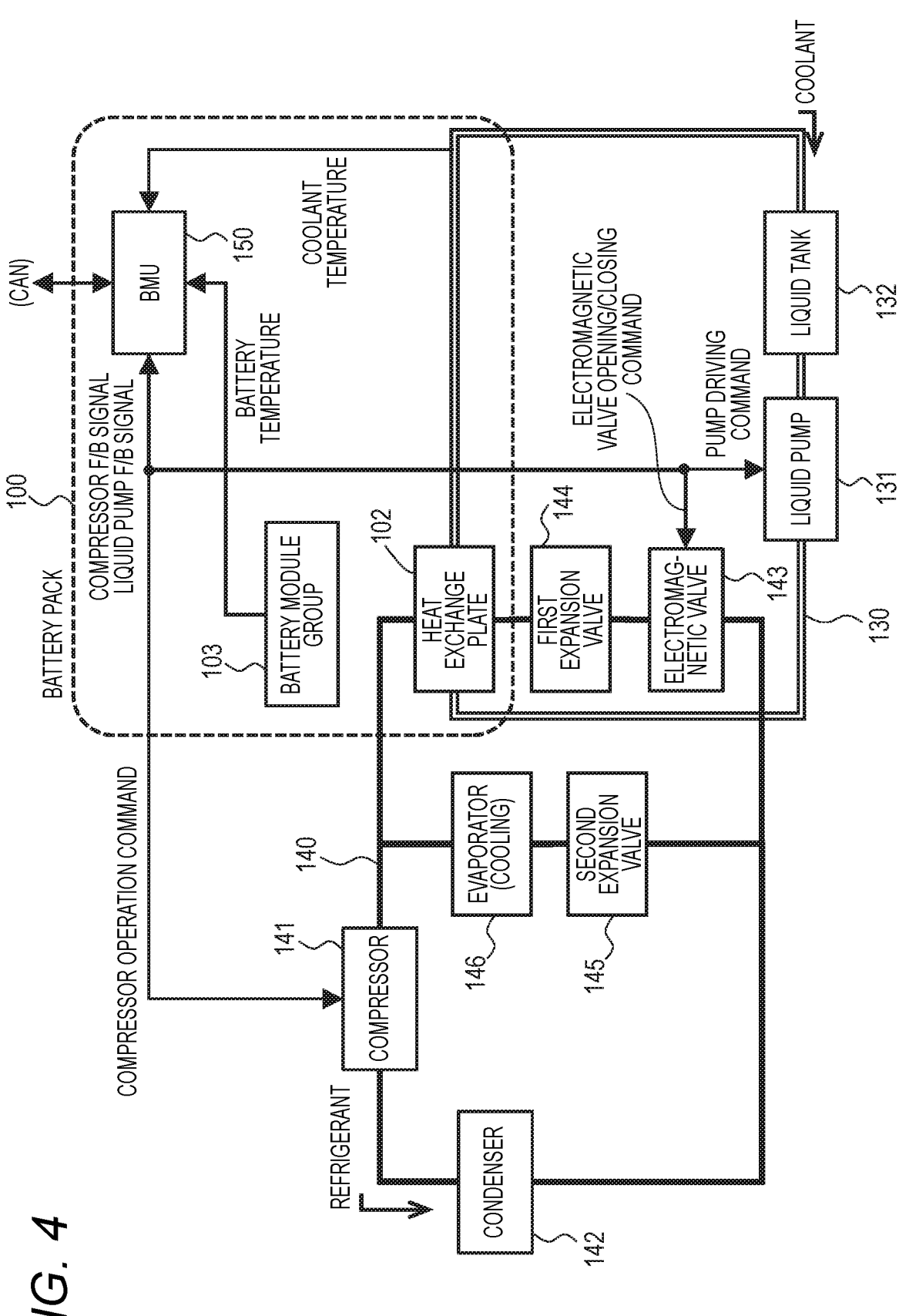
FIG. 4 is a diagram showing a configuration example of a coolant circuit and a refrigerant circuit according to the first embodiment.

FIG. 4 is a diagram showing a configuration example of the coolant circuit 130 and the refrigerant circuit 140 according to the first embodiment.

The vehicle 1 includes the battery pack 100, the coolant circuit 130, and the refrigerant circuit 140. The battery pack 100 includes the heat exchange plate 102, the battery module group 103GP, and a battery management unit (BMU) 150.

First, the coolant circuit 130 will be described. The coolant circuit 130 constitutes a circulation cycle of the coolant including the coolant layer 200 in the heat exchange plate 102. The coolant circuit 130 includes a liquid pump 131, the coolant layer 200, the coolant output pipe 122 and the coolant input pipe 121 connected to the coolant layer 200, and a liquid tank 132. The coolant circuit 130 cools the battery module group 103GP by the following circulation cycle of S11 to S13.

(S11) The liquid pump 131 sucks up the coolant from the liquid tank 132 and outputs the coolant to the coolant input pipe 121.

(S12) The coolant input from the coolant input pipe 121 flows through the coolant layer 200 and is output from the coolant output pipe 122. The coolant flowing through the coolant layer 200 absorbs heat generated by the battery module group 103GP, and is cooled by a low-temperature and low-pressure refrigerant flowing through the refrigerant layer 300 which is in contact with a lower surface of the coolant layer 200.

(S13) The coolant output from the coolant output pipe 122 is input to the liquid tank 132, and is sucked up by the liquid pump 131 as described in S11.

Next, the refrigerant circuit 140 will be described. The refrigerant circuit 140 includes a first refrigerant circuit 140 that cools the battery module group 103GP and a second refrigerant circuit 140 that cools the air in the vehicle.

First, the first refrigerant circuit 140 will be described. The first refrigerant circuit 140 constitutes a refrigeration cycle including the refrigerant layer 300 in the heat exchange plate 102. The first refrigerant circuit 140 includes the compressor 141, a condenser 142, an electromagnetic valve 143, a first expansion valve 144, the refrigerant layer 300, and the refrigerant output pipe 124 and the refrigerant input pipe 123 connected to the refrigerant layer 300. The first refrigerant circuit 140 cools the battery module group 103GP by the next refrigeration cycle of S21 to S25.

(S21) The low-temperature and low-pressure refrigerant flowing through the refrigerant layer 300 absorbs heat by heat exchange with the coolant in the coolant layer 200 which is in contact with an upper surface of the refrigerant layer 300, and is output from the refrigerant output pipe 124.

(S22) The refrigerant output from the refrigerant output pipe 124 is input to the compressor 141. The compressor 141 compresses the input refrigerant and outputs a high-pressure and high-temperature refrigerant.

(S23) The high-pressure and high-temperature refrigerant output from the compressor 141 is input to the condenser 142. The condenser 142 cools and condenses the input high-pressure and high-temperature refrigerant, and outputs a high-pressure and low-temperature refrigerant.

(S24) The high-pressure and low-temperature refrigerant output from the condenser 142 is input to the first expansion valve 144 when the electromagnetic valve 143 is open. The first expansion valve 144 reduces the pressure of the input high-pressure and low-temperature refrigerant, controls a flow rate of the refrigerant, and outputs a low-pressure and low-temperature refrigerant.

(S25) The low-pressure and low-temperature refrigerant output from the first expansion valve 144 is input to the refrigerant input pipe 123 and flows through the refrigerant layer 300 as described in S11.

Next, the second refrigerant circuit 140 will be described. The second refrigerant circuit 140 constitutes a refrigeration cycle including an evaporator 146 in the vehicle (for example, an air conditioner in the vehicle). The second refrigerant circuit 140 includes the compressor 141, the condenser 142, a second expansion valve 145, and the evaporator 146. The compressor 141 and the condenser 142 may be shared with the first refrigerant circuit 140. Alternatively, the second refrigerant circuit may include a compressor and a condenser different from those of the first refrigerant circuit. That is, the first refrigerant circuit and the second refrigerant circuit may form separate refrigeration cycles. The second refrigerant circuit 140 cools the air in the vehicle by the next refrigeration cycle of S31 to S35.

(S31) The low-temperature and low-pressure refrigerant flowing through the evaporator 146 absorbs the heat of the air in the vehicle and is output from the evaporator 146.

(S32) The refrigerant output from the evaporator 146 is input to the compressor 141. The compressor 141 compresses the input refrigerant and outputs a high-pressure and high-temperature refrigerant.

(S33) The high-pressure and high-temperature refrigerant output from the compressor 141 is input to the condenser 142. The condenser 142 cools and condenses the input high-pressure and high-temperature refrigerant, and outputs a high-pressure and low-temperature refrigerant.

(S34) The high-pressure and low-temperature refrigerant output from the condenser 142 is input to the second expansion valve 145. The second expansion valve 145 reduces the pressure of the input high-pressure and low-temperature refrigerant, controls a flow rate of the refrigerant, and outputs a low-pressure and low-temperature refrigerant.

(S35) The low-pressure and low-temperature refrigerant output from the second expansion valve 145 is input to the evaporator 146 and flows through the evaporator 146.

The BMU 150 is a device that monitors and controls the battery module group 103GP, and performs, for example, the following operation.

The BMU 150 monitors the temperature of the battery module group 103GP.

The BMU 150 receives, from the compressor 141, a feedback signal indicating a state of the compressor 141.

The BMU 150 receives, from the liquid pump 131, a feedback signal indicating a state of the liquid pump 131.

The BMU 150 transmits an operation command to the compressor 141 according to the situation.

The BMU 150 transmits an opening/closing command to the electromagnetic valve 143 according to the situation.

The BMU 150 transmits a driving command to the liquid pump 131 according to the situation.

For example, when it is detected that the temperature of the battery module group 103GP is equal to or higher than a predetermined threshold and determined that the temperature of the battery module group 103GP is to be lowered, the BMU 150 performs the following operation. That is, the BMU 150 transmits an opening command to the electromagnetic valve 143, transmits an operation start command to the compressor 141, and transmits a drive start command to the liquid pump 131. Accordingly, the refrigeration cycle of the first refrigerant circuit 140 and the circulation cycle of the coolant circuit 130 operate, and the temperature of the battery module group 103GP decreases.

<First Interface Arrangement>

Figure 5:
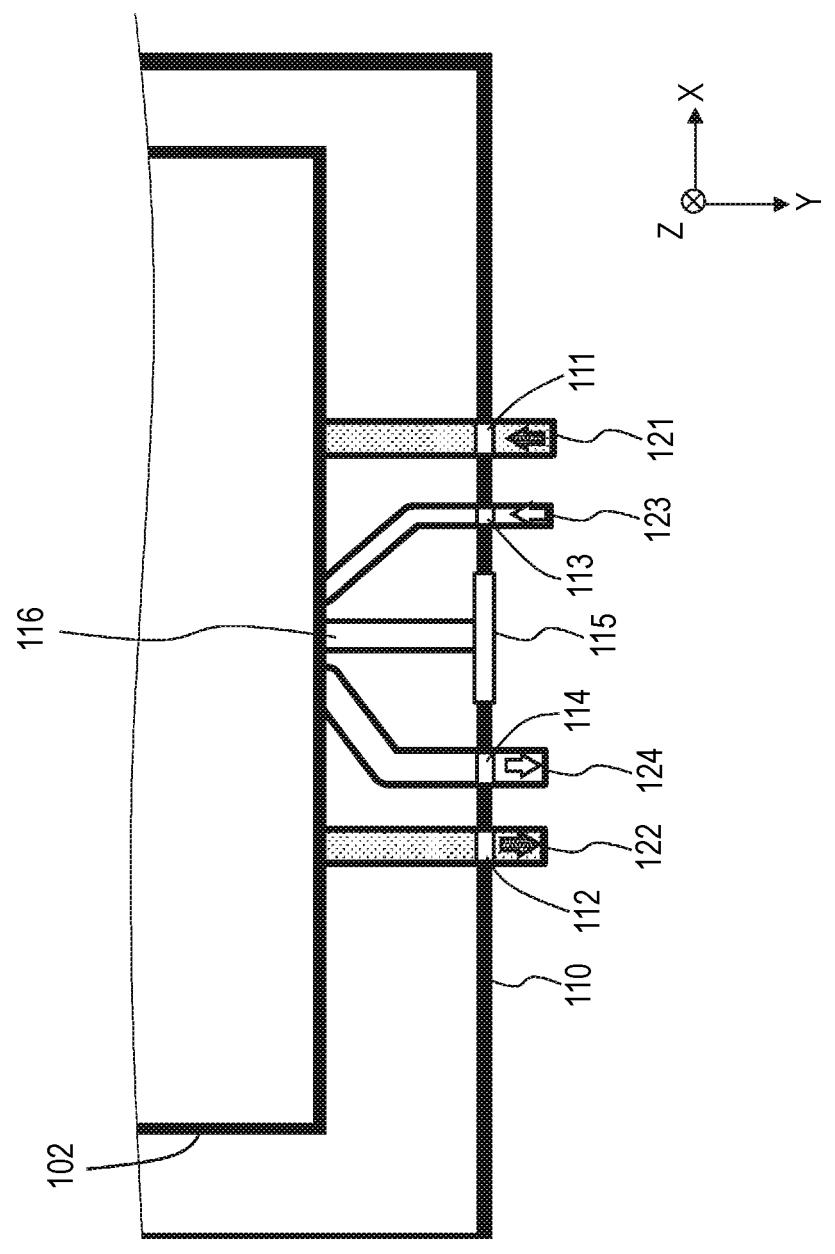
FIG. 5 is a diagram showing an example of a first interface arrangement according to the first embodiment.

FIG. 5 is a diagram showing an example of a first interface arrangement according to the first embodiment.

In general, the driving inverter to which power is supplied from the battery module group 103GP, the compressor 141 to which the refrigerant output pipe 124 is connected, the condenser 142 to which the refrigerant input pipe 123 is connected, the liquid tank 132 to which the coolant output pipe 122 is connected, and the liquid pump 131 to which the coolant input pipe 121 is connected are stored in the motor room (engine room) at a front side of the vehicle body 2.

Accordingly, the interfaces such as the electrical connector 115, the refrigerant input port 113, the refrigerant output port 114, the coolant input port 111, and the coolant output port 112, which are connected to these components, are preferably arranged in a concentrated manner on the front surface 110 (that is, a surface closer to the motor room) of the housing 101 of the battery pack 100. One of the reasons why these interfaces are preferably arranged in a concentrated manner on the front surface 110 of the housing 101 of the battery pack 100 is that due to an increase in the size of the battery pack 100 along with an increase in the capacity of the battery pack 100, the width of the battery pack 100 becomes close to the width of the vehicle body 2, and it is difficult to arrange these interfaces on a side surface of the housing 101 of the battery pack 100. When the driving inverter, the compressor 141, the condenser 142, the liquid tank 132, the liquid pump 131, and the like are stored in a motor room (engine room) at a rear side of the vehicle body 2, the above interfaces may be arranged in a concentrated manner on a rear surface of the housing 101 instead of the front surface 110 of the housing 101 of the battery pack 100.

Since an area of the front surface 110 of the battery pack 100 is relatively small, these interfaces are arranged close to one another (for example, within a predetermined area). When the coolant input port 111 or the coolant output port 112 and the electrical connector 115 are arranged adjacent to each other, for example, there is a risk as follows. That is, when the coolant leaks from the coolant input pipe 121 or the coolant output pipe 122 due to a collision of the vehicle 1, deterioration of components, or the like, there is a risk that the leaked coolant may be splashed on the adjacent electrical connector 115 (or an electrical cable connected to the electrical connector 115), and an electrical leakage may occur.

Therefore, in the first interface arrangement, the refrigerant input port 113 is arranged between the coolant input port 111 and the electrical connector 115, and the refrigerant output port 114 is arranged between the coolant output port 112 and the electrical connector 115, as shown in FIG. 5.

According to the first interface arrangement, since the refrigerant input port 113 is present between the coolant input port 111 and the electrical connector 115, it is possible to reduce a risk that the coolant leaked from the coolant input pipe 121 is splashed on the electrical connector 115 (or an electrical cable connected to the electrical connector 115) and an electric leakage occurs. Similarly, according to the first interface arrangement, since the refrigerant output port 114 is present between the coolant output port 112 and the electrical connector 115, it is possible to reduce a risk that the coolant leaked from the coolant output pipe 122 is splashed on the electrical connector 115 (or an electrical cable connected to the electrical connector 115) and an electric leakage occurs.

FIG. 5 shows an example in which the coolant output port 112, the refrigerant output port 114, the electrical connector 115, the refrigerant input port 113, and the coolant input port 111 are arranged in this order from the left in the drawing on the front surface 110 of the battery pack 100, but the first interface arrangement is not limited to the arrangement shown in FIG. 5. For example, the first interface arrangement may be an arrangement in which the refrigerant input port 113 and the refrigerant output port 114 shown in FIG. 5 are interchanged. The first interface arrangement may be an arrangement in which the coolant input port 111 and the coolant output port 112 shown in FIG. 5 are interchanged. That is, the first interface arrangement may be the following arrangement in addition to the arrangement shown in FIG. 5.

The coolant output port 112, the refrigerant input port 113, the electrical connector 115, the refrigerant output port 114, and the coolant input port 111 are arranged in this order from the left in the drawing on the front surface 110 of the battery pack 100.

The coolant input port 111, the refrigerant output port 114, the electrical connector 115, the refrigerant input port 113, and the coolant output port 112 are arranged in this order from the left in the drawing on the front surface 110 of the battery pack 100.

The coolant output port 112, the refrigerant output port 114, the electrical connector 115, the refrigerant input port 113, and the coolant input port 111 are arranged in this order from the left in the drawing on the front surface 110 of the battery pack 100.

<Second Interface Arrangement>

Figure 6:
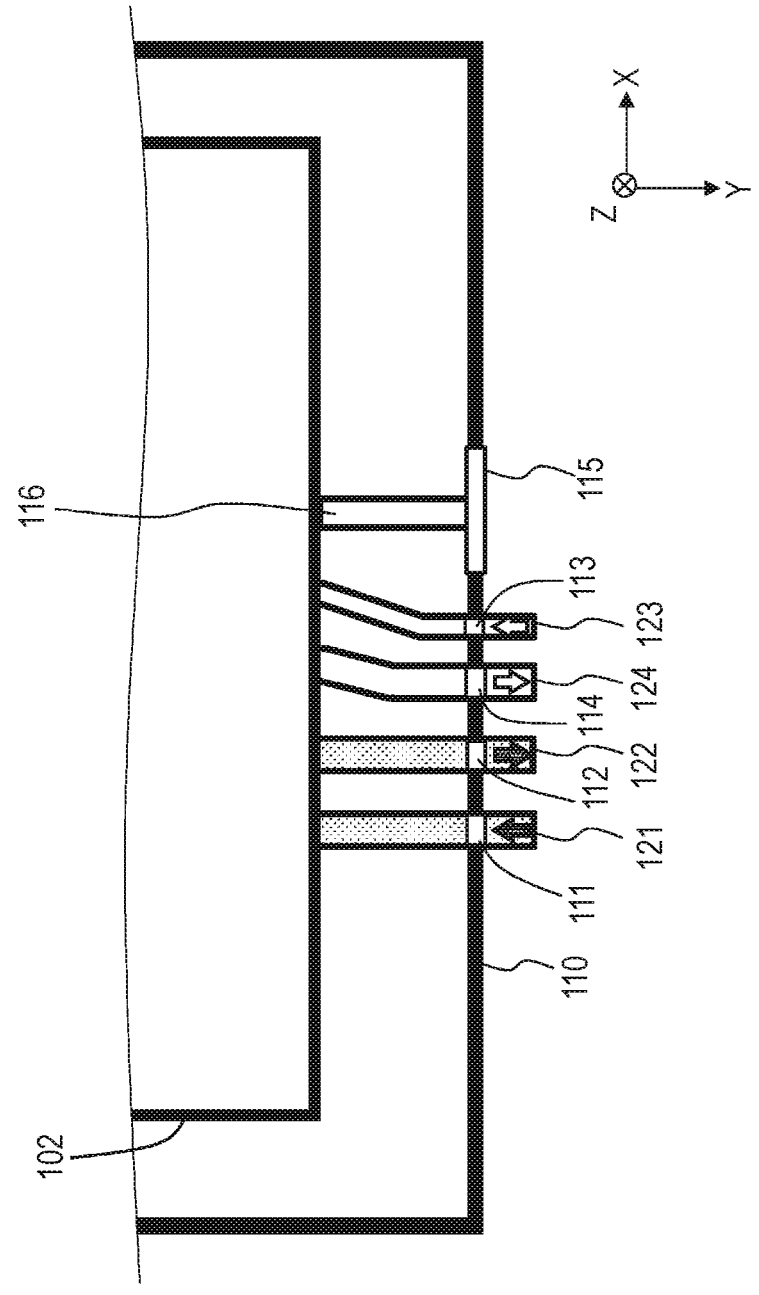
FIG. 6 is a diagram showing an example of a second interface arrangement according to the first embodiment.

FIG. 6 is a diagram showing an example of a second interface arrangement according to the first embodiment.

In the second interface arrangement, the refrigerant input port 113 and the refrigerant output port 114 are arranged between the electrical connector 115 and the coolant input port 111 as well as the coolant output port 112, as shown in FIG. 6.

According to the second interface arrangement, since the refrigerant input port 113 and the refrigerant output port 114 are present between the electrical connector 115 and the coolant input port 111 as well as the coolant output port 112, it is possible to reduce a risk that the coolant leaked from the coolant input pipe 121 or the coolant output pipe 122 is splashed on the electrical connector 115 (or an electrical cable connected to the electrical connector 115) and an electric leakage occurs.

FIG. 6 shows an example in which the coolant input port 111, the coolant output port 112, the refrigerant output port 114, the refrigerant input port 113, and the electrical connector 115 are arranged in this order from the left in the drawing on the front surface 110 of the battery pack 100, but the second interface arrangement is not limited to the arrangement shown in FIG. 5.

For example, the second interface arrangement may be an arrangement in which the refrigerant input port 113 and the refrigerant output port 114 shown in FIG. 6 are interchanged. The second interface arrangement may be an arrangement in which the coolant input port 111 and the coolant output port 112 shown in FIG. 6 are interchanged. That is, the second interface arrangement may be the following arrangement in addition to the arrangement shown in FIG. 6.

The coolant input port 111, the coolant output port 112, the refrigerant input port 113, the refrigerant output port 114, and the electrical connector 115 are arranged in this order from the left in the drawing on the front surface 110 of the battery pack 100.

The coolant output port 112, the coolant input port 111, the refrigerant output port 114, the refrigerant input port 113, and the electrical connector 115 are arranged in this order from the left in the drawing on the front surface 110 of the battery pack 100.

The coolant output port 112, the coolant input port 111, the refrigerant input port 113, the refrigerant output port 114, and the electrical connector 115 are arranged in this order from the left in the drawing on the front surface 110 of the battery pack 100.

Configuration Examples of Coolant Layer and Refrigerant Layer

Next, some configuration examples of the coolant layer 200 and the refrigerant layer 300 in the case where the first interface arrangement or the second interface arrangement described above is provided will be described.

First Configuration Example

Figure 7:
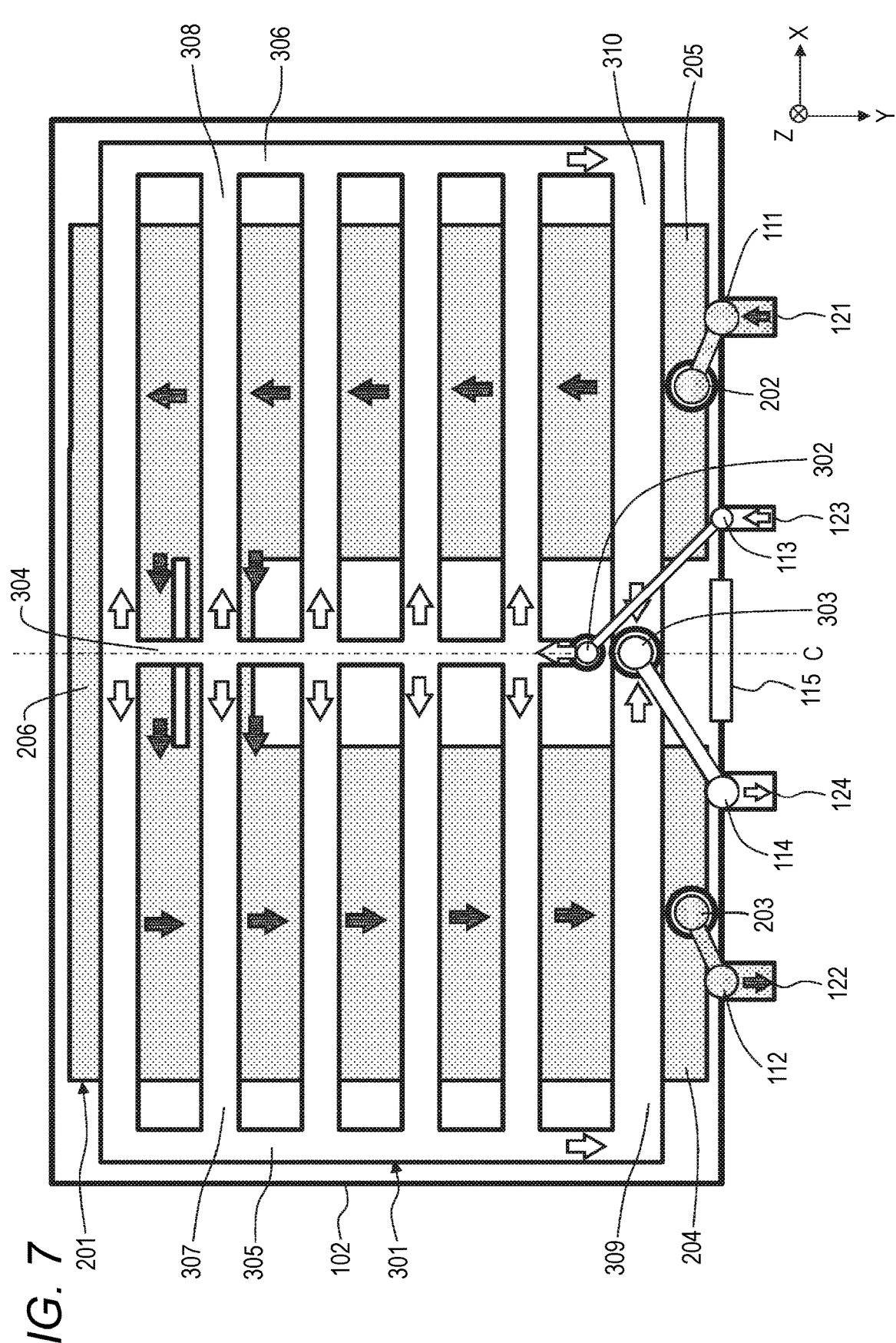
FIG. 7 is a diagram showing a first configuration example of a coolant layer and a refrigerant layer in a case where the first interface arrangement according to the first embodiment is provided.

FIG. 7 is a diagram showing a first configuration example of the coolant layer 200 and the refrigerant layer 300 in the case where the first interface arrangement according to the first embodiment is provided.

In the first interface arrangement, for example, the electrical connector 115 is arranged on a virtual center line C extending in the front-rear direction and dividing the heat exchange plate 102 into left and right parts as shown in FIG. 7. In addition, the refrigerant input port 113 is arranged to the right of the electrical connector 115, and the refrigerant output port 114 is arranged to the left of the electrical connector 115. In addition, the coolant input port 111 is arranged to the right of the refrigerant input port 113, and the coolant output port 112 is arranged to the left of the refrigerant output port 114.

The coolant layer 200 includes a coolant passage 201 through which the coolant flows. The coolant passage 201 includes a coolant passage inlet 202 to which the coolant is input, and a coolant passage outlet 203 from which the coolant is output. A coolant input pipe 121 partially including the coolant input port 111 is connected to the coolant passage inlet 202. A coolant output pipe 122 partially including the coolant output port 112 is connected to the coolant passage outlet 203.

The refrigerant layer 300 includes a refrigerant passage 301 through which the refrigerant flows. The refrigerant passage 301 includes a refrigerant passage inlet 302 to which the refrigerant is input, and a refrigerant passage outlet 303 from which the refrigerant is output. A refrigerant input pipe 123 partially including the refrigerant input port 113 is connected to the refrigerant passage inlet 302. A refrigerant output pipe 124 partially including the refrigerant output port 114 is connected to the refrigerant passage outlet 303.

As the coolant input pipe 121 and the coolant output pipe 122, thin and flexible resin pipes or hoses may be used. On the other hand, as the refrigerant input pipe 123 and the refrigerant output pipe 124, metal pipes or high-pressure compatible hoses are used so as to withstand high-pressure two-phase gas-liquid gas flowing through the pipes. That is, the refrigerant input pipe 123 and the refrigerant output pipe 124 have a lower degree of freedom in pipe arrangement than the coolant input pipe 121 and the coolant output pipe 122.

Therefore, the refrigerant passage inlet 302 and the refrigerant passage outlet 303 may be arranged in a concentrated manner in the vicinity of the refrigerant input port 113 and the refrigerant output port 114 (for example, within a processing distance). For example, the refrigerant passage inlet 302 and the refrigerant passage outlet 303 may be arranged within a width of less than 10% of an entire width (width in the left-right direction) of the heat exchange plate 102 with the center line C as the center. Alternatively, the refrigerant passage inlet 302 and the refrigerant passage outlet 303 may be arranged within a width of less than 10% of an entire width (width in the left-right direction) of the battery pack 100 with the center line C as the center. As shown in FIG. 7, the refrigerant passage inlet 302 and the refrigerant passage outlet 303 may be provided on the front side.

Accordingly, since the distance between the refrigerant input port 113 and the refrigerant passage inlet 302 is shortened, it is easy to arrange the refrigerant input pipe 123 that connects the refrigerant input port 113 and the refrigerant passage inlet 302. Similarly, it is also easy to arrange the refrigerant output pipe 124 that connects the refrigerant output port 114 and the refrigerant passage outlet 303.

Next, configurations of the refrigerant passage 301 and the coolant passage 201 shown in FIG. 7 will be described.

First, the configuration of the refrigerant passage 301 will be described. The refrigerant passage 301 includes a central refrigerant passage 304 that extends rearward from the refrigerant passage inlet 302 provided on the center line C, a left refrigerant passage 305 that is located to the left of the central refrigerant passage 304 and that is parallel to the central refrigerant passage 304, and a right refrigerant passage 306 that is located to the right of the central refrigerant passage 304 and that is parallel to the central refrigerant passage 304.

The refrigerant passage 301 further includes a plurality of left branched refrigerant passages 307 that connect the central refrigerant passage 304 and the left refrigerant passage 305, and a plurality of right branched refrigerant passages 308 that connect the central refrigerant passage 304 and the right refrigerant passage 306. The refrigerant passage 301 further includes a left front refrigerant passage 309 that connects the left refrigerant passage 305 and the refrigerant passage outlet 303, and a right front refrigerant passage 310 that connects the refrigerant passage outlet 303 and the right refrigerant passage 306, the left front refrigerant passage 309 and the right front refrigerant passage 310 being provided in front of the refrigerant passage inlet 302 on the center line C. The plurality of left branched refrigerant passages 307 may be parallel to one another. The plurality of right branched refrigerant passages 308 may be parallel to one another.

The refrigerant input from the refrigerant passage inlet 302 passes through the central refrigerant passage 304, the plurality of left branched refrigerant passages 307, the left refrigerant passage 305, and the left front refrigerant passage 309, and is output from the refrigerant passage outlet 303, as indicated by white arrows in FIG. 7. Similarly, the refrigerant input from the refrigerant passage inlet 302 passes through the central refrigerant passage 304, the plurality of right branched refrigerant passages 308, the right refrigerant passage 306, and the right front refrigerant passage 310, and is output from the refrigerant passage outlet 303.

Next, the configuration of the coolant passage 201 will be described. The coolant passage 201 includes a left coolant passage 204 that has a predetermined width so as to intersect (for example, orthogonal to) the plurality of left branched refrigerant passages 307 and that extends in the front-rear direction, a right coolant passage 205 that has a predetermined width so as to intersect (for example, orthogonal to) the plurality of right branched refrigerant passages 308 and that extends in the front-rear direction, and at least one rear coolant passage 206 that connects the left coolant passage 204 and the right coolant passage 205 at the rear side. The at least one rear coolant passage 206 may overlap the at least one left branched refrigerant passage 307 and the at least one right branched refrigerant passage 308. The coolant passage 201 may intersect 60% or more of areas of the left branched refrigerant passage 307 and the right branched refrigerant passage 308.

The coolant passage inlet 202 is provided at a front side of the right coolant passage 205. The coolant passage outlet 203 is provided at a front side of the left coolant passage 204.

The coolant input from the coolant passage inlet 202 passes through the right coolant passage 205, the rear coolant passage 206, and the left coolant passage 204, and is output from the coolant passage outlet 203, as indicated by shaded arrows in FIG. 7. At this time, the coolant is cooled as follows by the refrigerant flowing through the refrigerant passage 301.

The coolant flowing through the right coolant passage 205 is cooled by the refrigerant flowing through the plurality of right branched refrigerant passages 308 that intersect the right coolant passage 205. The coolant flowing through the left coolant passage 204 is cooled by the refrigerant flowing through the plurality of left branched refrigerant passages 307 that intersect the left coolant passage 204. The coolant flowing through the rear coolant passage 206 is cooled by the refrigerant flowing through the left branched refrigerant passages 307 and the right branched refrigerant passages 308 that overlap the rear coolant passage 206.

As shown in FIG. 7, the left refrigerant passage 305 may not overlap the left coolant passage 204, and the right refrigerant passage 306 may not overlap the right coolant passage 205. Alternatively, the left refrigerant passage 305 may overlap the left coolant passage 204, and the right refrigerant passage 306 may overlap the right coolant passage 205. The central refrigerant passage 304 may not overlap the left coolant passage 204 and the right coolant passage 205.

It is difficult to keep the division of the refrigerant uniform under all operation conditions. That is, there may be a difference in the amount of the refrigerant flowing through each of the plurality of right branched refrigerant passages 308. Therefore, a temperature difference occurs between the plurality of right branched refrigerant passages 308. On the other hand, according to the configuration shown in FIG. 7, the coolant flowing through the right coolant passage 205 is cooled by the refrigerant flowing through the plurality of right branched refrigerant passages 308 that intersect the right coolant passage 205. The same applies to the left branched refrigerant passage 307 and the left coolant passage 204. Therefore, the temperature of the coolant flowing through the coolant passage 201 is made uniform. Accordingly, the battery module group 103GP arranged on the coolant layer 200 is cooled at high speed and uniformly (without deviation) by the coolant by which the temperature in the coolant layer 200 is made uniform.

Second Configuration Example

Figure 8:
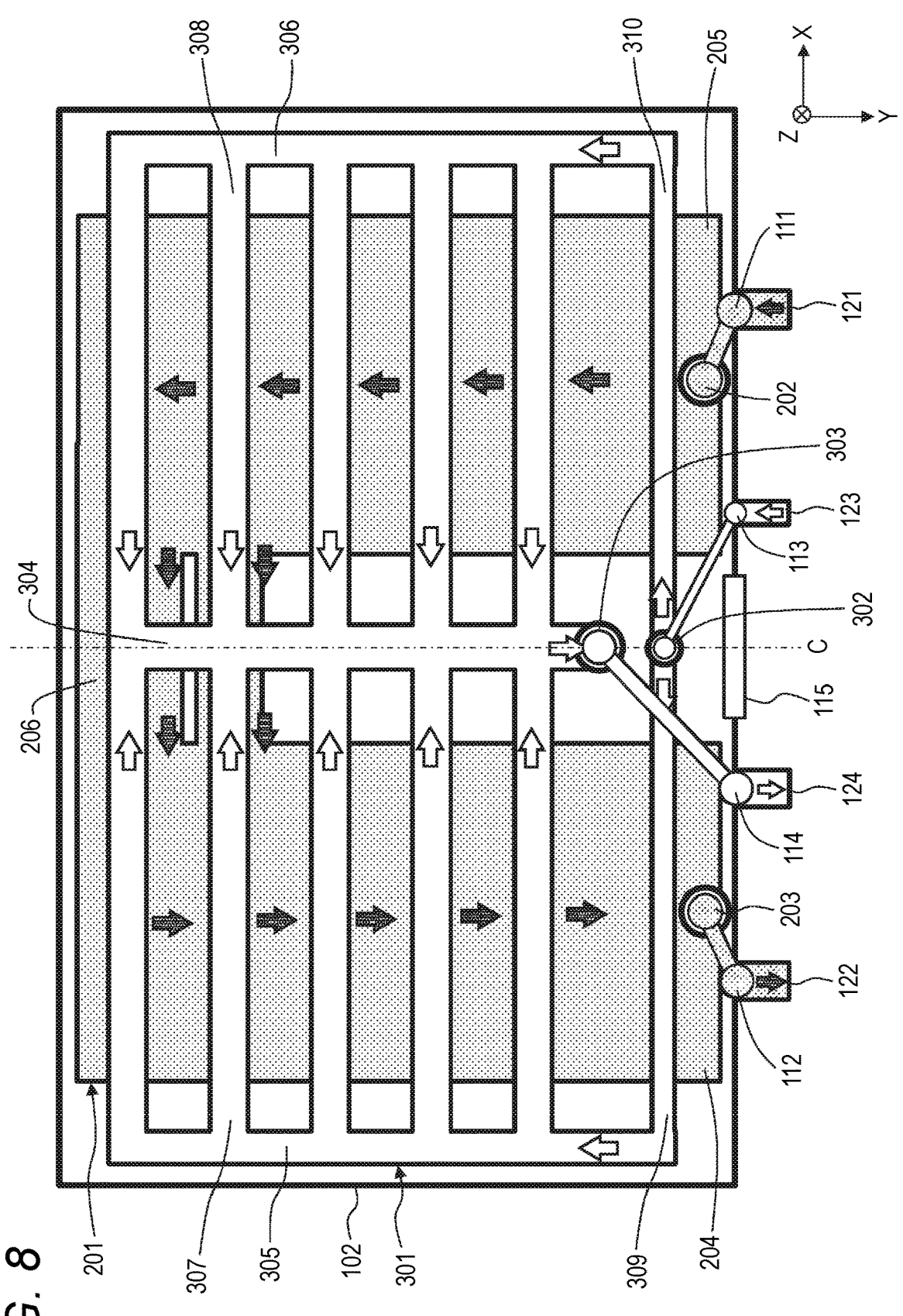
FIG. 8 is a diagram showing a second configuration example of the coolant layer and the refrigerant layer in a case where the first interface arrangement according to the first embodiment is provided.

FIG. 8 is a diagram showing a second configuration example of the coolant layer 200 and the refrigerant layer 300 in the case where the first interface arrangement according to the first embodiment is provided.

The second configuration example shown in FIG. 8 is obtained by interchanging the refrigerant passage inlet 302 and the refrigerant passage outlet 303 in the configuration including the refrigerant passage 301 and the coolant passage 201 similar to those of the first configuration example shown in FIG. 7.

In this case, the refrigerant input from the refrigerant passage inlet 302 passes through the left front refrigerant passage 309, the left refrigerant passage 305, the plurality of left branched refrigerant passages 307, and the central refrigerant passage 304, and is output from the refrigerant passage outlet 303, as indicated by white arrows in FIG. 8. Similarly, the refrigerant input from the refrigerant passage inlet 302 passes through the right front refrigerant passage 310, the right refrigerant passage 306, the plurality of right branched refrigerant passages 308, and the central refrigerant passage 304, and is output from the refrigerant passage outlet 303.

The coolant passage 201 shown in FIG. 8 may have the same configuration as that of the coolant passage 201 shown in FIG. 7.

In the second configuration example shown in FIG. 8, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

Third Configuration Example

Figure 9:
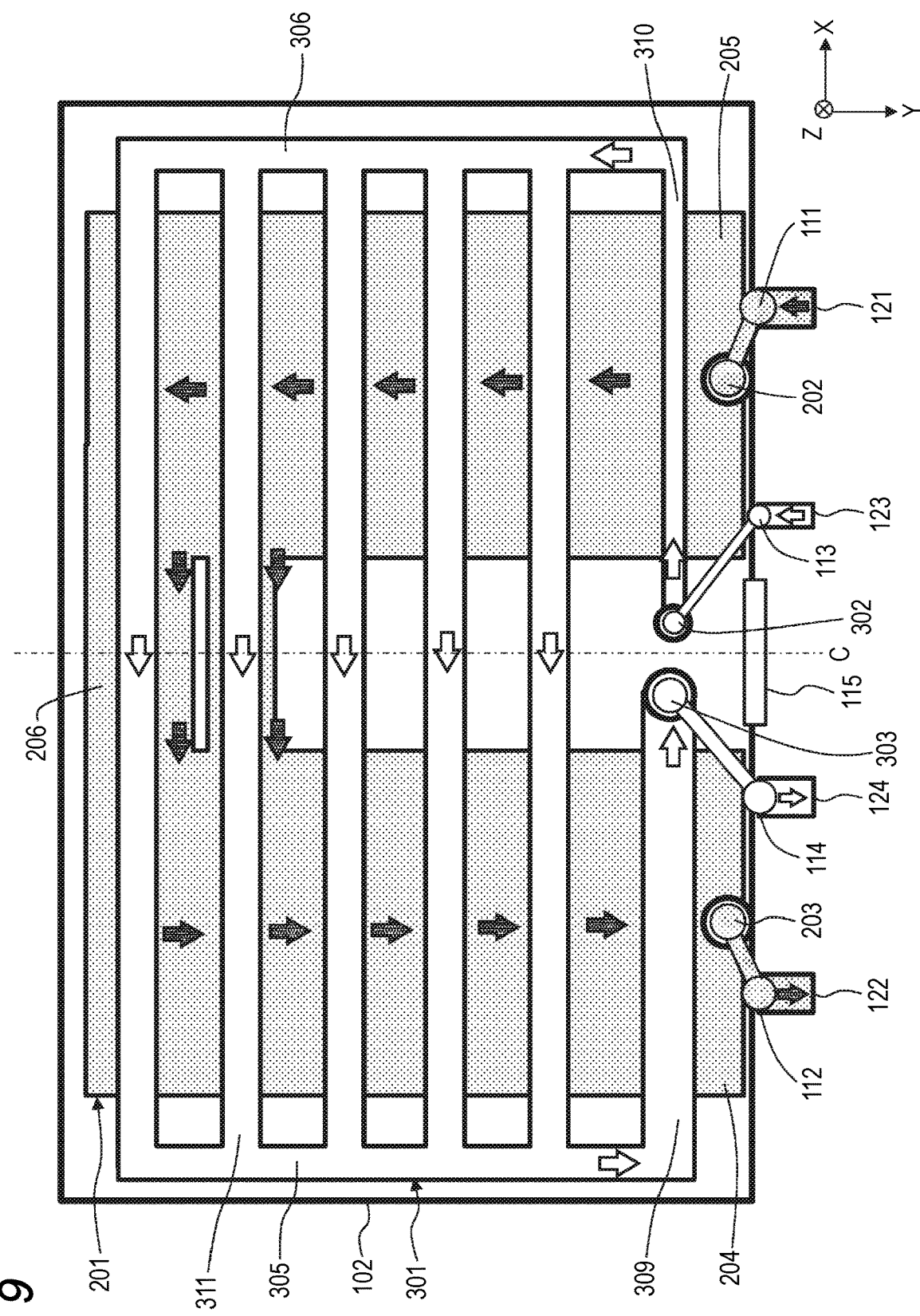
FIG. 9 is a diagram showing a third configuration example of the coolant layer and the refrigerant layer in a case where the first interface arrangement according to the first embodiment is provided.

FIG. 9 is a diagram showing a third configuration example of the coolant layer 200 and the refrigerant layer 300 in the case where the first interface arrangement according to the first embodiment is provided.

A refrigerant passage according to the third configuration example shown in FIG. 9 includes the refrigerant passage inlet 302 to the right of the center line C and the refrigerant passage outlet 303 to the left of the center line C.

The refrigerant passage 301 further includes the right front refrigerant passage 310 that extends rightward from the refrigerant passage inlet 302, the left front refrigerant passage 309 that extends leftward from the refrigerant passage outlet 303, the right refrigerant passage 306 that is connected to the right front refrigerant passage 310 and that extends rearward, the left refrigerant passage 305 that is connected to the left front refrigerant passage 309 and that extends rearward, and a plurality of branched refrigerant passages 311 that connect the right refrigerant passage 306 and the left refrigerant passage 305. The plurality of branched refrigerant passages 311 may be parallel to one another.

The refrigerant input from the refrigerant passage inlet 302 passes through the right front refrigerant passage 310, the right refrigerant passage 306, the plurality of branched refrigerant passages 311, the left refrigerant passage 305, and the left front refrigerant passage 309, and is output from the refrigerant passage outlet 303, as indicated by white arrows in FIG. 9.

The coolant passage 201 shown in FIG. 9 may have the same configuration as that of the coolant passage 201 shown in FIG. 7. That is, the right coolant passage 205 and the left coolant passage 204 may intersect (for example, orthogonal to) the plurality of branched refrigerant passages 311, and the at least one rear coolant passage 206 may overlap the at least one branched refrigerant passage 311.

In the third configuration example shown in FIG. 9, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

Fourth Configuration Example

Figure 10:
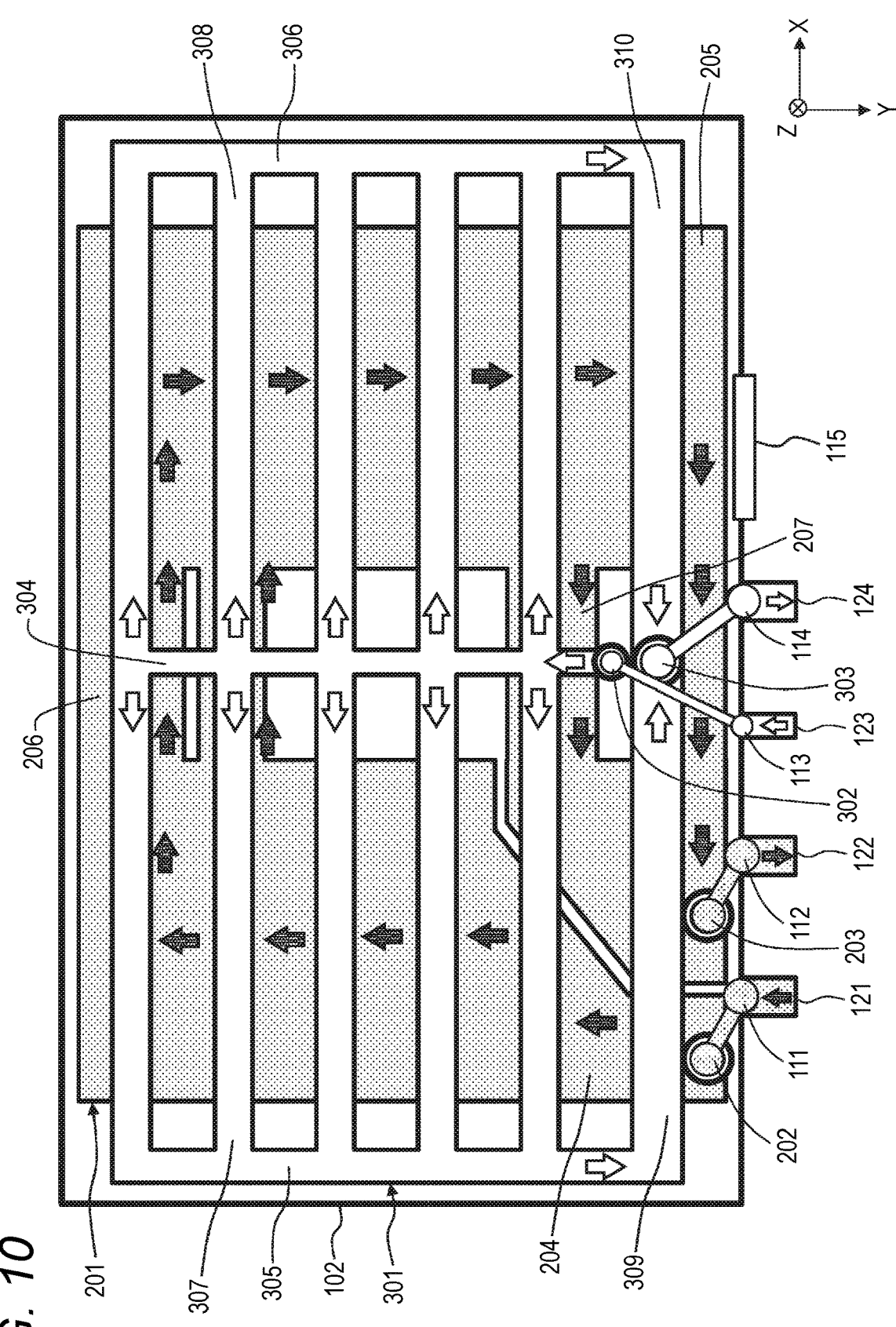
FIG. 10 is a diagram showing a fourth configuration example of a coolant layer and a refrigerant layer in a case where the second interface arrangement according to the first embodiment is provided.

FIG. 10 is a diagram showing a fourth configuration example of the coolant layer 200 and the refrigerant layer 300 in the case where the second interface arrangement according to the first embodiment is provided.

The refrigerant passage 301 according to the fourth configuration example shown in FIG. 10 may have the same configuration as the refrigerant passage 301 shown in FIG. 7.

The coolant passage 201 shown in FIG. 10 includes the left coolant passage 204 that extends in the front-rear direction so as to intersect the plurality of left branched refrigerant passages 307, the right coolant passage 205 that extends in the front-rear direction so as to intersect the plurality of right branched refrigerant passages 308, the at least one rear coolant passage 206 that connects the left coolant passage 204 and the right coolant passage 205 on a rear side, and at least one front coolant passage 207 that extends leftward from the right coolant passage 205 on a front side. The at least one rear coolant passage 206 may overlap the at least one left branched refrigerant passage 307 and the at least one right branched refrigerant passage 308. The at least one front coolant passage 207 may overlap the at least one left branched refrigerant passage 307 and the at least one right branched refrigerant passage 308.

The coolant passage inlet 202 may be provided in front of the left coolant passage 204, and the coolant passage outlet 203 may be provided at a front left side of the front coolant passage 207.

The coolant input from the coolant passage inlet 202 passes through the left coolant passage 204, the rear coolant passage 206, the right coolant passage 205, and the front coolant passage 207, and is output from the coolant passage outlet 203, as indicated by shaded arrows in FIG. 10.

In the fourth configuration example shown in FIG. 10, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

In FIG. 10, the refrigerant output port 114 and the refrigerant output pipe 124 may be provided on a right side of the electrical connector 115.

Fifth Configuration Example

Figure 11:
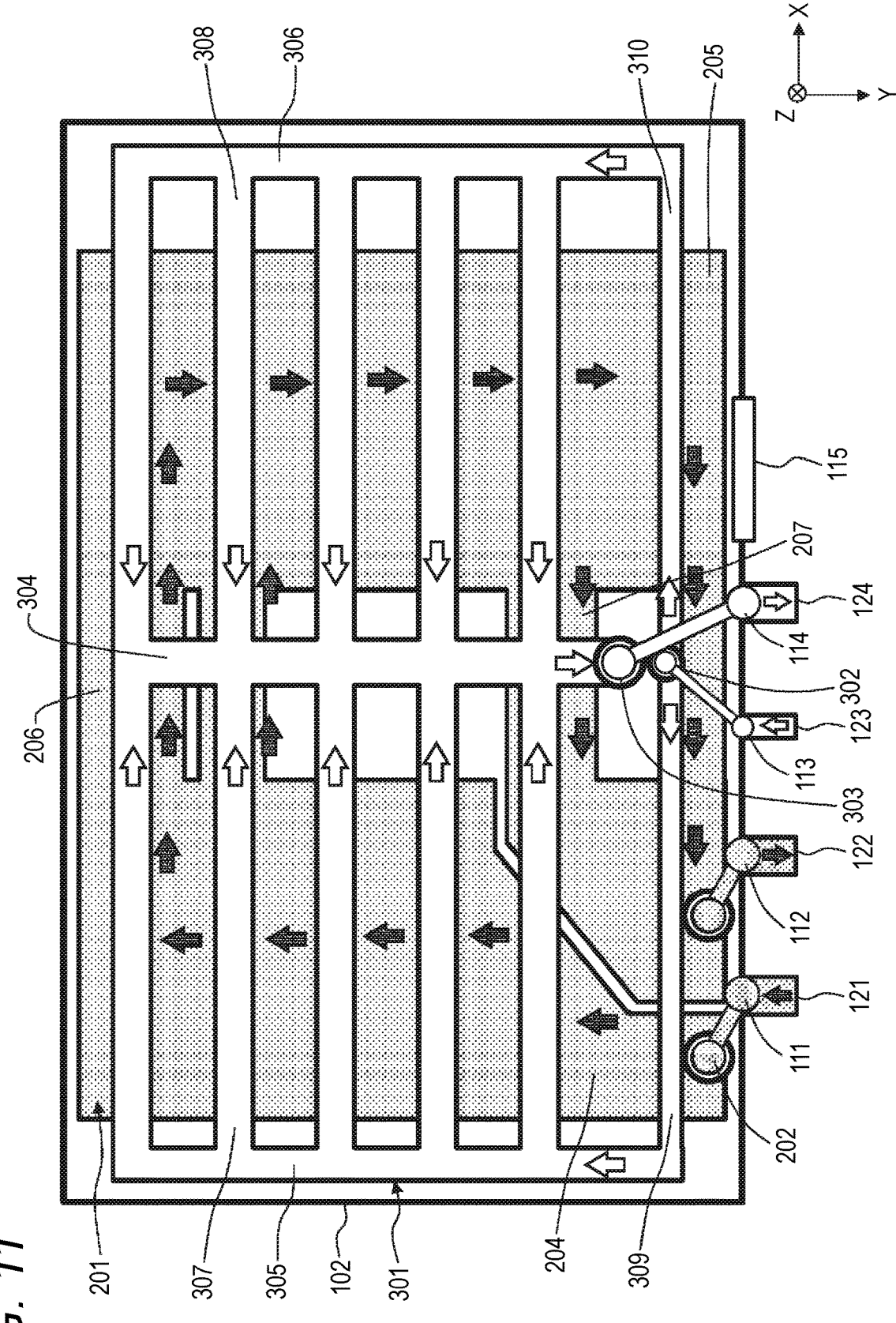
FIG. 11 is a diagram showing a fifth configuration example of the coolant layer and the refrigerant layer in a case where the second interface arrangement according to the first embodiment is provided.

FIG. 11 is a diagram showing a fifth configuration example of the coolant layer 200 and the refrigerant layer 300 in the case where the second interface arrangement according to the first embodiment is provided.

The fifth configuration example shown in FIG. 11 is obtained by interchanging the refrigerant passage inlet 302 and the refrigerant passage outlet 303 in the configuration including the refrigerant passage 301 and the coolant passage 201 similar to those of the fourth configuration example shown in FIG. 10.

In this case, the refrigerant input from the refrigerant passage inlet 302 passes through the left front refrigerant passage 309, the left refrigerant passage 305, the plurality of left branched refrigerant passages 307, and the central refrigerant passage 304, and is output from the refrigerant passage outlet 303, as indicated by white arrows in FIG. 11. Similarly, the refrigerant input from the refrigerant passage inlet 302 passes through the right front refrigerant passage 310, the right refrigerant passage 306, the plurality of right branched refrigerant passages 308, and the central refrigerant passage 304, and is output from the refrigerant passage outlet 303.

The coolant passage 201 shown in FIG. 11 may have the same configuration as that of the coolant passage 201 shown in FIG. 10.

In the fifth configuration example, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

In FIG. 11, the refrigerant output port 114 and the refrigerant output pipe 124 may be provided to the right of the electrical connector 115.

Sixth Configuration Example

Figure 12:
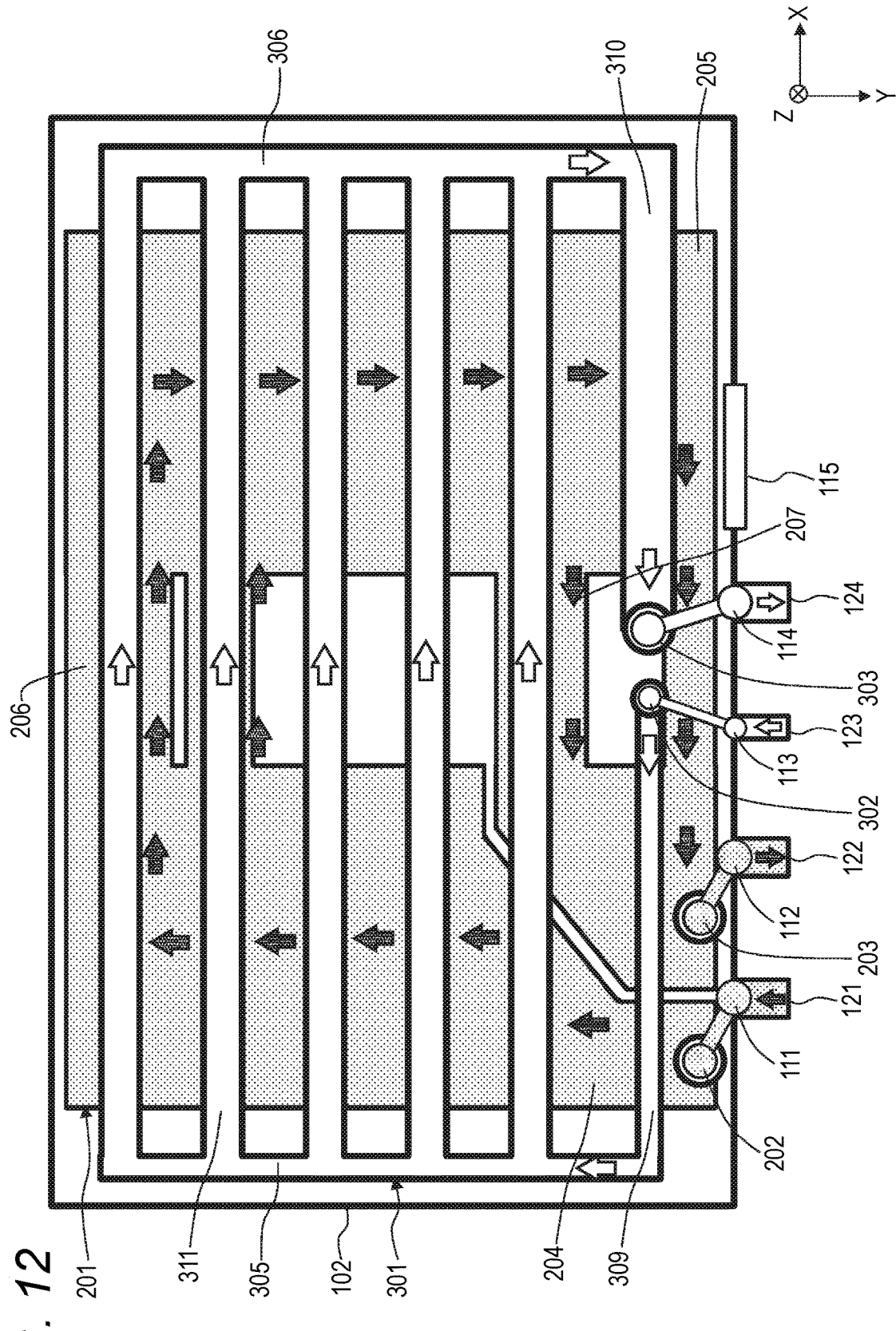
FIG. 12 is a diagram showing a sixth configuration example of the coolant layer and the refrigerant layer in a case where the second interface arrangement according to the first embodiment is provided.

FIG. 12 is a diagram showing a sixth configuration example of the coolant layer 200 and the refrigerant layer 300 in the case where the second interface arrangement according to the first embodiment is provided.

A refrigerant passage according to the sixth configuration example shown in FIG. 12 has a configuration in which the refrigerant passage inlet 302 and the refrigerant passage outlet 303 of the refrigerant passage 301 shown in FIG. 9 are interchanged. The refrigerant input from the refrigerant passage inlet 302 passes through the left front refrigerant passage 309, the left refrigerant passage 305, the plurality of branched refrigerant passages 311, the right refrigerant passage 306, and the right front refrigerant passage 310, and is output from the refrigerant passage outlet 303, as indicated by white arrows in FIG. 12.

The coolant passage 201 according to the sixth configuration example shown in FIG. 12 may have the same configuration as the coolant passage 201 shown in FIG. 10.

In the sixth configuration example, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

In FIG. 12, the refrigerant output port 114 and the refrigerant output pipe 124 may be provided to the right of the electrical connector 115.

<Case where Member in which Refrigerant Input Pipe and Refrigerant Output Pipe are Integrated is Used>

From the viewpoint of reducing a space occupied by the refrigerant input pipe 123 and the refrigerant output pipe 124 in the battery pack 100, a member in which the refrigerant input pipe 123 and the refrigerant output pipe 124 are integrated (hereinafter, referred to as a "refrigerant pipe integration member") may be used. In this case, the refrigerant input port 113 and the refrigerant output port 114 are preferably arranged adjacent to each other so that the refrigerant pipe integration member can be connected. For example, when the refrigerant pipe integration member is used, the battery pack 100 may adopt the second interface arrangement in which the refrigerant input port 113 and the refrigerant output port 114 are adjacent to each other.

<Case where Battery Pack Includes Two Heat Exchange Plates>

Figure 13:
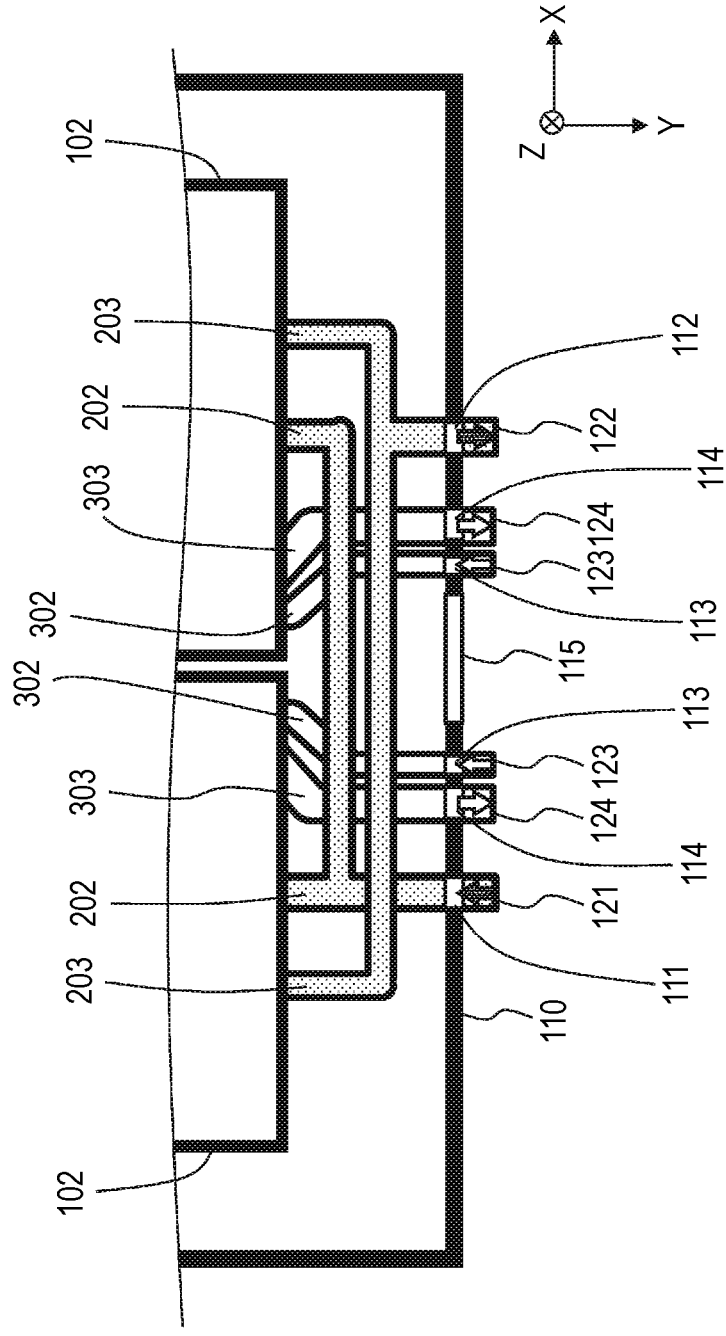
FIG. 13 is a diagram showing an example of the first interface arrangement in a case where the battery pack according to the first embodiment includes two heat exchange plates.
Figure 14:
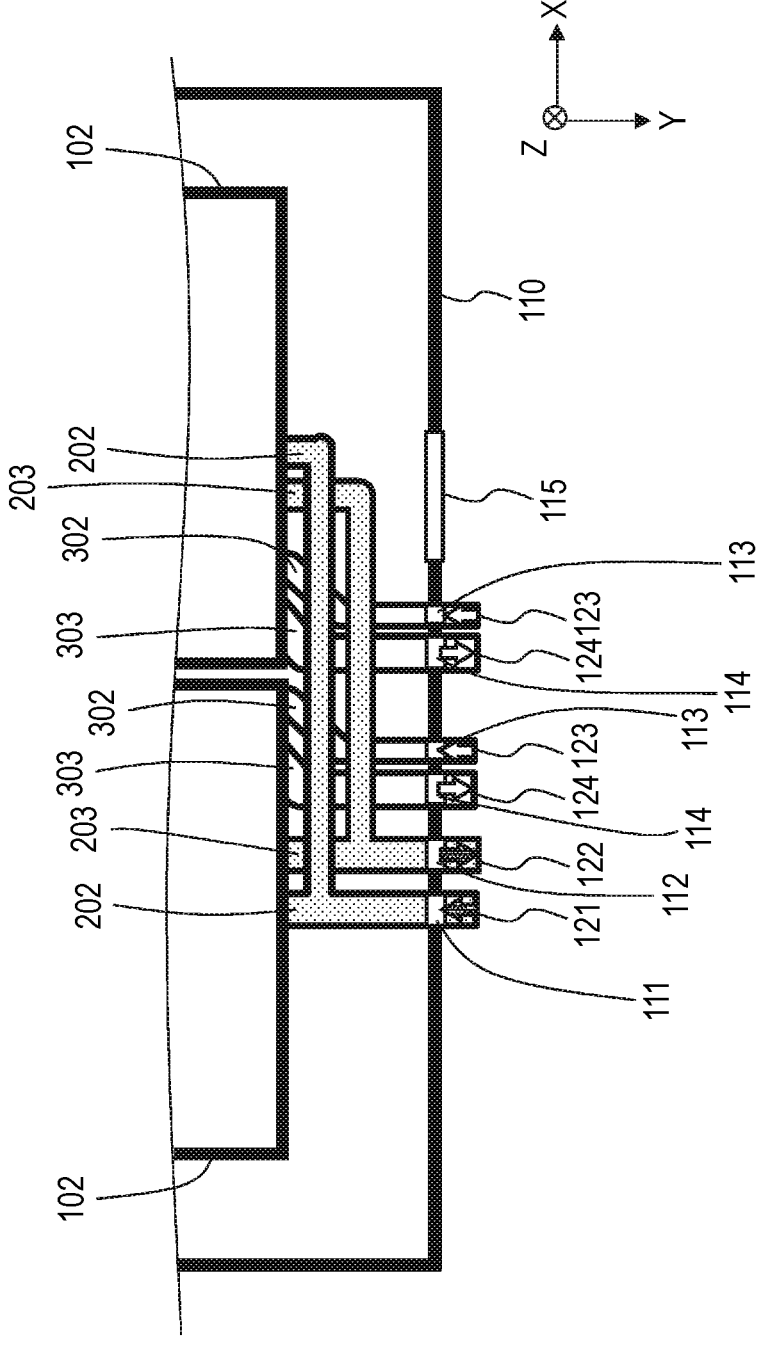
FIG. 14 is a diagram showing an example of the second interface arrangement in the case where the battery pack according to the first embodiment includes two heat exchange plates.

FIG. 13 is a diagram showing an example of the first interface arrangement in a case where the battery pack 100 according to the first embodiment includes two heat exchange plates 102. FIG. 14 is a diagram showing an example of the second interface arrangement in a case where the battery pack 100 according to the first embodiment includes two heat exchange plates 102.

In FIGS. 13 and 14, each of the two heat exchange plates 102 includes the refrigerant passage inlet 302, the refrigerant passage outlet 303, the coolant passage inlet 202, and the coolant passage outlet 203.

As described above, it is easy to impart flexibility to the coolant input pipe 121 and the coolant output pipe 122. Accordingly, one coolant input port 111 may be arranged on the front surface 110 of the battery pack 100, and the coolant input pipe 121 connected to the coolant input port 111 may be branched into two in the middle to be connected to the respective coolant passage inlets 202 of the two coolant layers 200. Similarly, one coolant output port 112 may be arranged on the front surface 110 of the battery pack 100, and the coolant output pipe 122 connected to the coolant output port 112 may be branched into two in the middle to be connected to the respective coolant passage outlets 203 of the two coolant layers 200. Accordingly, the number of ports can be reduced, and the space occupied by the coolant input pipe 121 and the coolant output pipe 122 in the battery pack 100 can be reduced.

On the other hand, as described above, it is difficult to impart sufficient flexibility to the refrigerant input pipe 123 and the refrigerant output pipe 124. Accordingly, the first refrigerant input port 113 and the first refrigerant output port 114 that are connected to the left refrigerant layer 300 as well as the second refrigerant input port 113 and the second refrigerant output port 114 that are connected to the right refrigerant layer 300 may be arranged on the front surface 110 of the battery pack 100. The first refrigerant input port 113 and the first refrigerant output port 114 may be arranged adjacent to each other. Similarly, the second refrigerant input port 113 and the second refrigerant output port 114 may be arranged adjacent to each other. The above refrigerant pipe integration member can be connected to the first refrigerant input port 113 and the first refrigerant output port 114 that are arranged adjacent to each other. Similarly, the above refrigerant pipe integration member can be connected to the second refrigerant input port 113 and the second refrigerant output port 114 that are arranged adjacent to each other.

Figure 15:
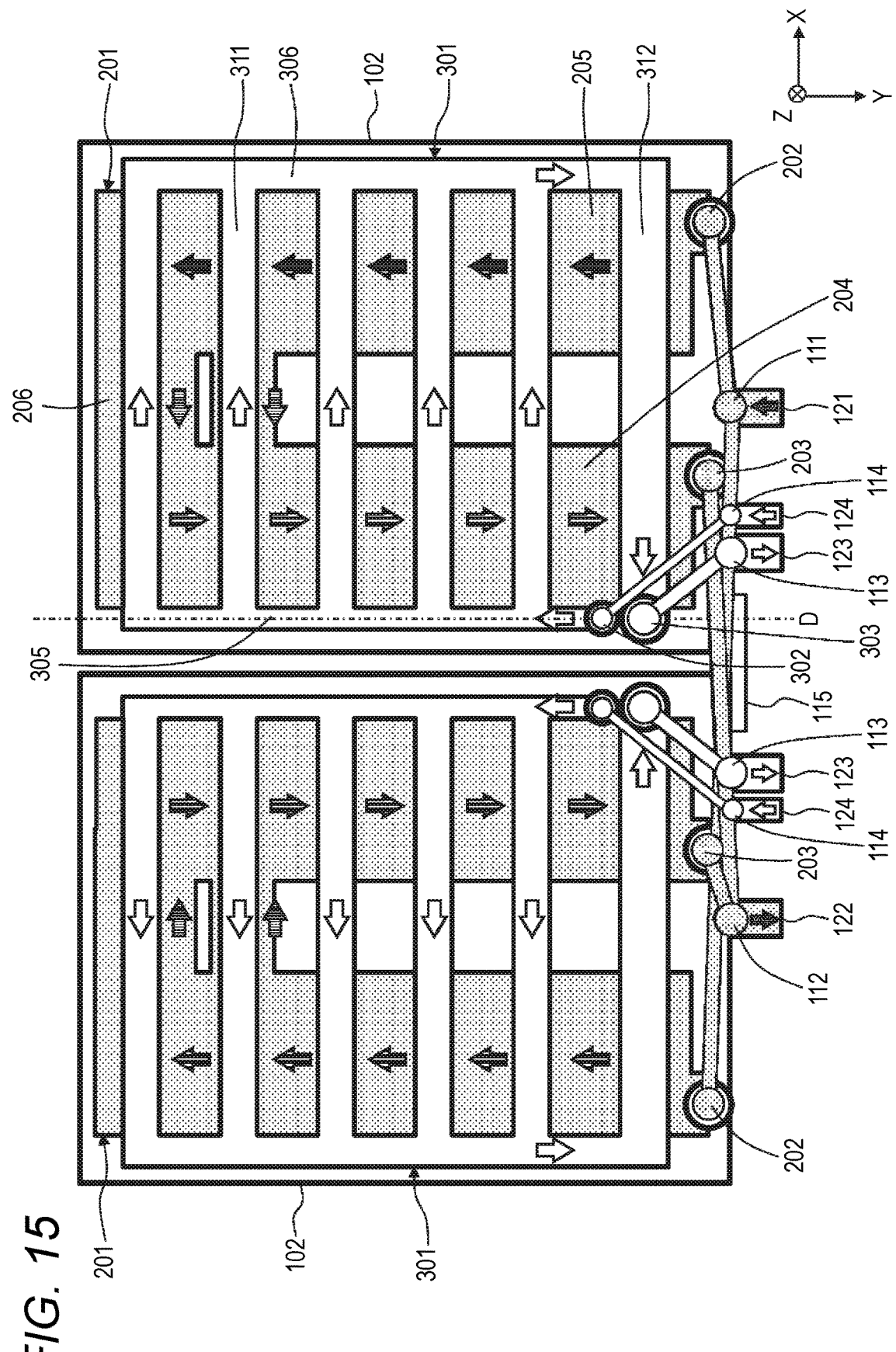
FIG. 15 is a diagram showing a configuration example of a coolant layer and a refrigerant layer in a case where two heat exchange plates according to the first embodiment are provided.

FIG. 15 is a diagram showing a configuration example of the coolant layer 200 and the refrigerant layer 300 in a case where the two heat exchange plates 102 according to the first embodiment are provided. FIG. 15 shows an example of a case where the first interface arrangement is adopted.

First, the right heat exchange plate 102 will be described. The refrigerant passage 301 includes the refrigerant passage inlet 302 and the refrigerant passage outlet 303 on a left end line D that extends in the front-rear direction along a left end of the right heat exchange plate 102. The refrigerant passage outlet 303 is located in front of the refrigerant passage inlet 302.

The refrigerant passage 301 further includes the left refrigerant passage 305 that extends rearward from the refrigerant passage inlet 302, the right refrigerant passage 306 that is located to the right of the left refrigerant passage 305 and that is parallel to the left refrigerant passage 305, the plurality of branched refrigerant passages 311 that connect the left refrigerant passage 305 and the right refrigerant passage 306, and the front refrigerant passage 312 that connects the refrigerant passage outlet 303 and the right refrigerant passage 306. The plurality of branched refrigerant passages 311 may be parallel to one another.

The refrigerant input from the refrigerant passage inlet 302 passes through the left refrigerant passage 305, the plurality of branched refrigerant passages 311, the right refrigerant passage 306, and the front refrigerant passage 312, and is output from the refrigerant passage outlet 303, as indicated by white arrows in FIG. 15.

The coolant passage 201 may have the same configuration as that of the first configuration example shown in FIG. 7. That is, the right coolant passage 205 and the left coolant passage 204 may intersect the plurality of branched refrigerant passages 311. The at least one rear coolant passage 206 may overlap the at least one branched refrigerant passage 311.

The configuration of the refrigerant passage 301 and the coolant passage 201 in the left heat exchange plate 102 may be a configuration in which the refrigerant passage 301 and the coolant passage 201 in the right heat exchange plate 102 described above are horizontally inverted.

In FIG. 15, the coolant input pipe 121 which branches from one coolant input port 111 to the coolant passage inlets 202 of the left and right coolant passages 201 may be used. Further, in FIG. 15, the coolant output pipe 122 which branches from one coolant output port 112 to the coolant passage outlets 203 of the left and right coolant passages 201 may be used. Accordingly, the space occupied by the coolant input pipe 121 and the coolant output pipe 122 in the battery pack 100 can be reduced.

With such a configuration, the coolant flowing through the coolant passage 201 is also uniformly cooled by the refrigerant flowing through the refrigerant passage 301 in each of the right heat exchange plate 102 and the left heat exchange plate 102. Accordingly, the battery module group 103GP arranged on the coolant layer 200 is cooled at high speed and uniformly (without deviation) by the coolant by which the temperature in the coolant layer 200 is made uniform.

<Case where Refrigerant Double Pipe is Used>

From the viewpoint of reducing the space occupied by the refrigerant input pipe 123 and the refrigerant output pipe 124, a double pipe (hereinafter, referred to as a "refrigerant double pipe") 125 in which the refrigerant input pipe 123 is inserted into the refrigerant output pipe 124 may be used.

Figure 16:
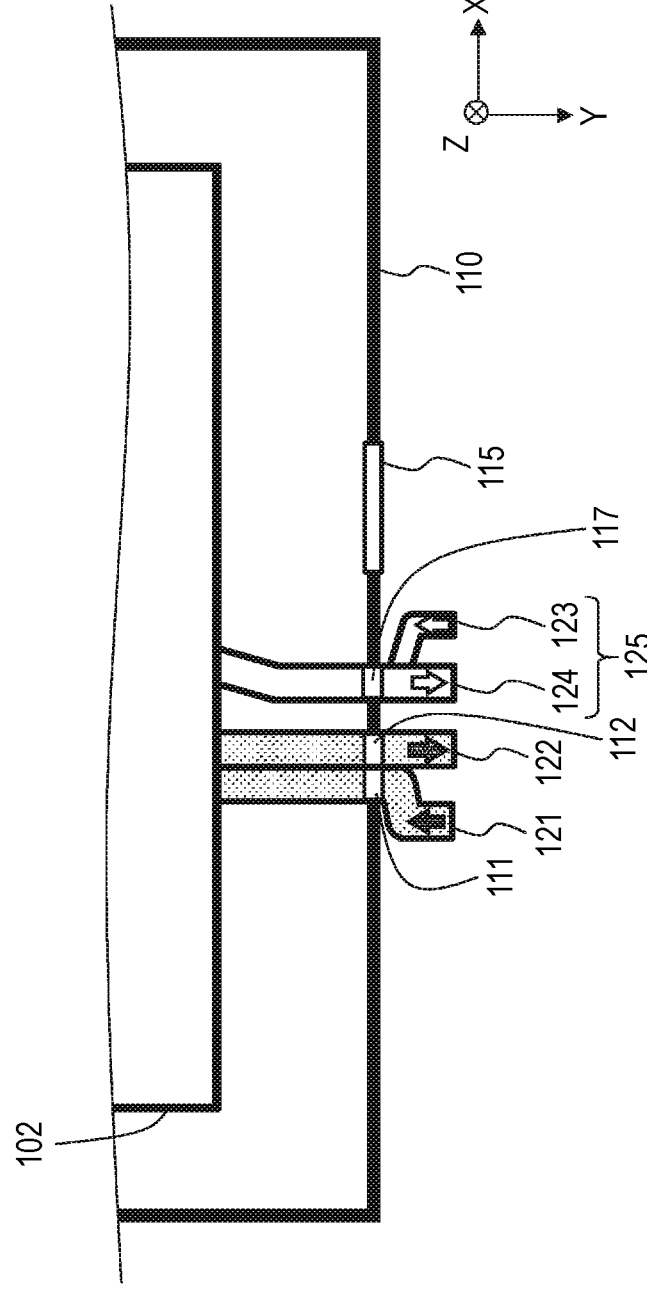
FIG. 16 is a diagram showing an example of the second interface arrangement in which a refrigerant double pipe according to the first embodiment is used.

FIG. 16 is a diagram showing an example of the second interface arrangement in which the refrigerant double pipe 125 according to the first embodiment is used.

In the second interface arrangement in which the refrigerant double pipe 125 is used, a refrigerant input/output port 117 in which the refrigerant input port 113 and the refrigerant output port 114 are integrated may be arranged on the front surface 110 of the battery pack 100. In this case, the refrigerant input/output port 117 may be a part of the refrigerant double pipe 125.

Accordingly, the number of ports can be reduced, and the space occupied by the refrigerant input pipe 123 and the refrigerant output pipe 124 in the battery pack 100 can be reduced.

When the battery pack 100 includes two heat exchange plates 102 as shown in FIG. 15, the refrigerant input/output ports 117 (that is, two refrigerant input/output ports 117) corresponding to the two respective heat exchange plates 102 may be arranged on the front surface 110 of the battery pack 100.

Figure 17:
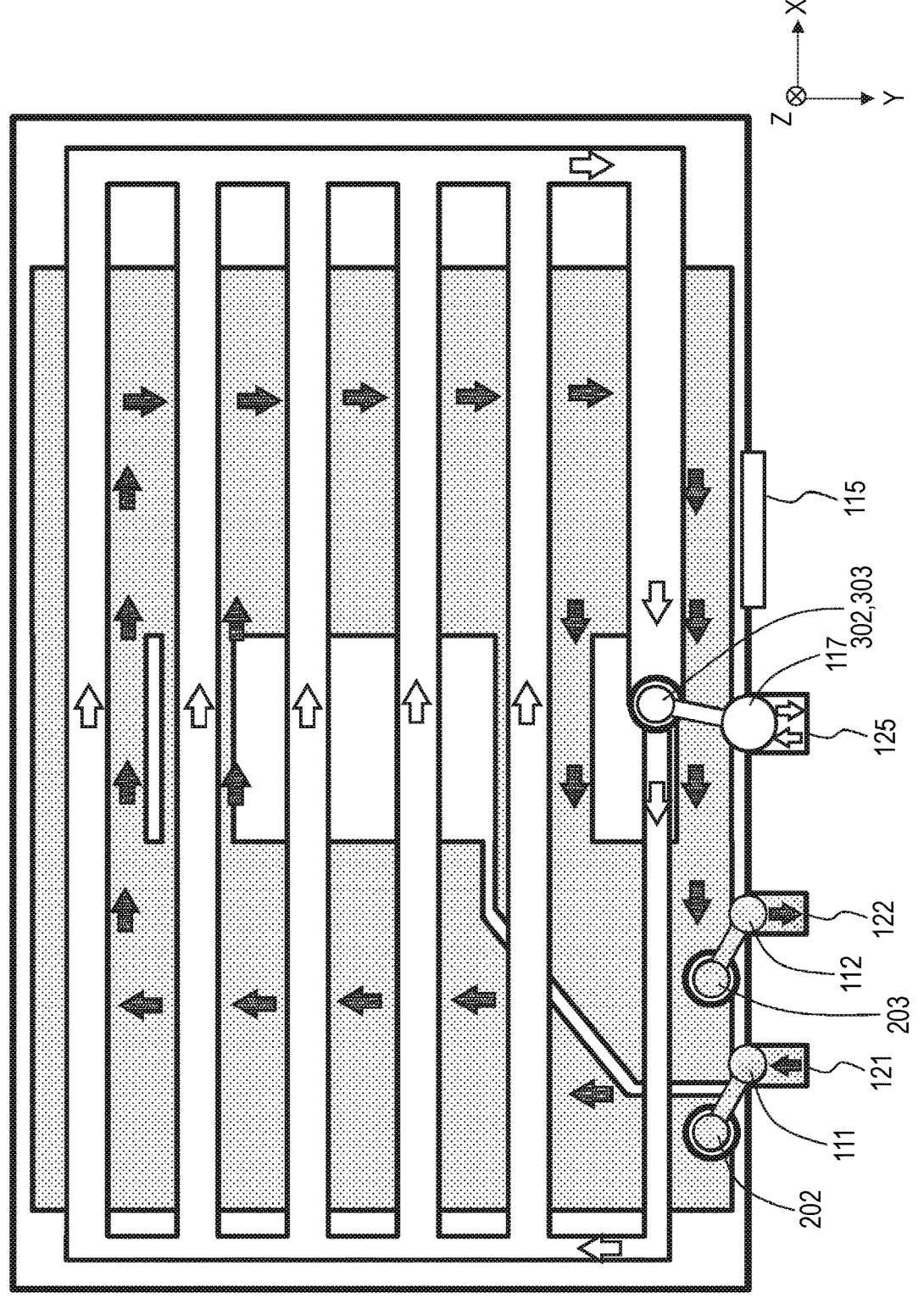
FIG. 17 is a diagram showing a configuration example of a heat exchange plate in a case where the refrigerant double pipe according to the first embodiment is used.

FIG. 17 is a diagram showing a configuration example of the heat exchange plate 102 in a case where the refrigerant double pipe 125 according to the first embodiment is used.

The refrigerant passage has a configuration in which the refrigerant passage inlet 302 and the refrigerant passage outlet 303 according to the sixth configuration example shown in FIG. 12 correspond to the refrigerant double pipe 125. The coolant passage 201 has the same configuration as that of the sixth configuration example shown in FIG. 12.

With such a configuration, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

Figure 18:
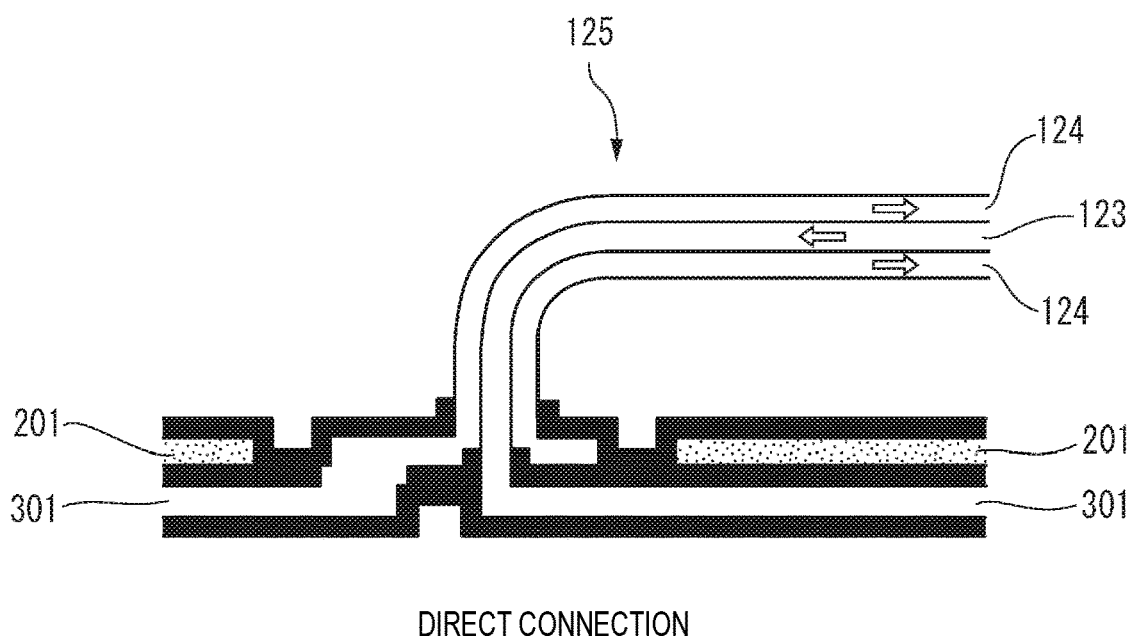
FIG. 18 is a diagram showing an example of a connection portion in a case where the refrigerant double pipe according to the first embodiment is directly connected to a refrigerant passage.

FIG. 18 is a diagram showing an example of a connection portion in a case where the refrigerant double pipe 125 according to the first embodiment is directly connected to the refrigerant passage 301.

As shown in FIG. 18, the refrigerant double pipe 125 may be connected to the refrigerant passage inlet 302 and the refrigerant passage outlet 303 by directly inserting the refrigerant double pipe 125 into the refrigerant passage 301 and performing brazing bonding. Accordingly, the space occupied by the refrigerant input pipe 123 and the refrigerant output pipe 124 in the battery pack 100 can be reduced.

Figure 19:
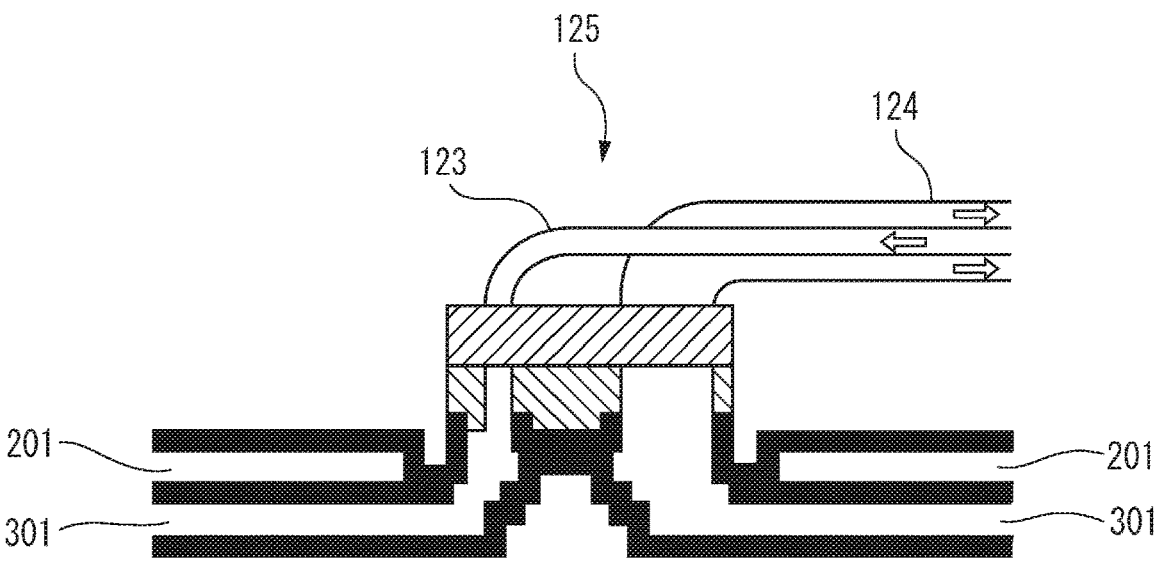
FIG. 19 is a diagram showing a connection portion in a case where the refrigerant double pipe according to the first embodiment is flange-connected to the refrigerant passage.
Figure 20:
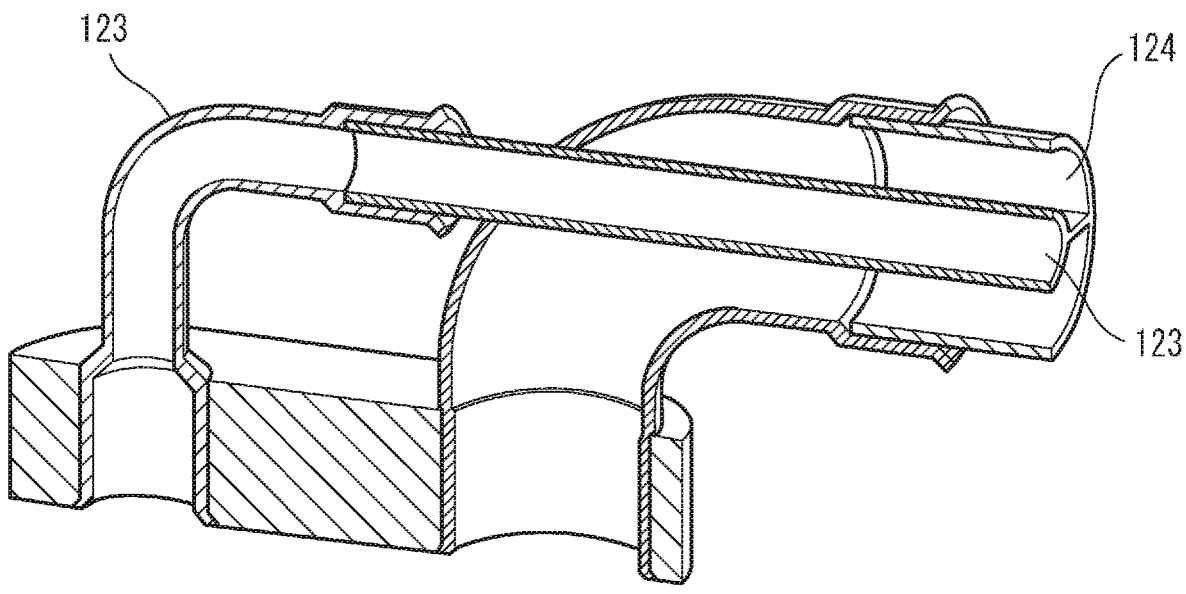
FIG. 20 is a cross-sectional perspective view showing a configuration of the refrigerant double pipe in the case of flange connection according to the first embodiment.

FIG. 19 is a diagram showing a connection portion in a case where the refrigerant double pipe 125 according to the first embodiment is flange-connected to the refrigerant passage 301. FIG. 20 is a cross-sectional perspective view showing a configuration of the refrigerant double pipe 125 in the case of flange-connection according to the first embodiment.

As shown in FIGS. 19 and 20, a connection flange may be provided at an end portion of the refrigerant double pipe 125, and the refrigerant double pipe 125 may be connected to the refrigerant passage inlet 302 or the refrigerant passage outlet 303 of the refrigerant passage 301, similarly to a general pipe. Accordingly, the space occupied by the refrigerant input pipe 123 and the refrigerant output pipe 124 in the battery pack 100 can be reduced.

<Case where Heat Insulating Material is Provided in Refrigerant Input Pipe and Refrigerant Output Pipe>

The refrigerant input pipe 123 and the refrigerant output pipe 124 are generally formed of a metal member. Therefore, the refrigerant input pipe 123 and the refrigerant output pipe 124 may be covered with a heat insulating material in the first interface arrangement (see FIG. 5). Alternatively, one of the refrigerant input pipe 123 and the refrigerant output pipe 124 which is closer to the electrical connector 115 or both of the refrigerant input pipe 123 and the refrigerant output pipe 124 may be covered with a heat insulating material in the second interface arrangement (see FIG. 6).

Accordingly, it is possible to prevent the metal member from being exposed in the vicinity of (for example, adjacent to) the electrical connector 115. That is, it is possible to avoid a risk that the metal member comes into contact with the electrical connector 115 due to a collision of the vehicle 1 or the like. In addition, it is possible to prevent dew condensation from occurring on the surfaces of the refrigerant input pipe 123 and the refrigerant output pipe 124. That is, it is possible to reduce a risk that water generated by dew condensation comes into contact with the electrical connector 115 and an electric leakage occurs in a case where the vehicle 1 collides or the like.

Second Embodiment

The vehicle 1 and the battery pack 100 according to a second embodiment will be described. In the second embodiment, the same components as those in the first embodiment are denoted by the same reference numerals, and the description thereof may be omitted.

The vehicle 1 according to the second embodiment may have the same configuration as that of the vehicle 1 described with reference to FIGS. 1A and 1B. The coolant circuit 130 and the refrigerant circuit 140 according to the second embodiment may have the same configurations as those of the coolant circuit 130 and the refrigerant circuit 140 described with reference to FIG. 4.

<Third Interface Arrangement>

Figure 21:
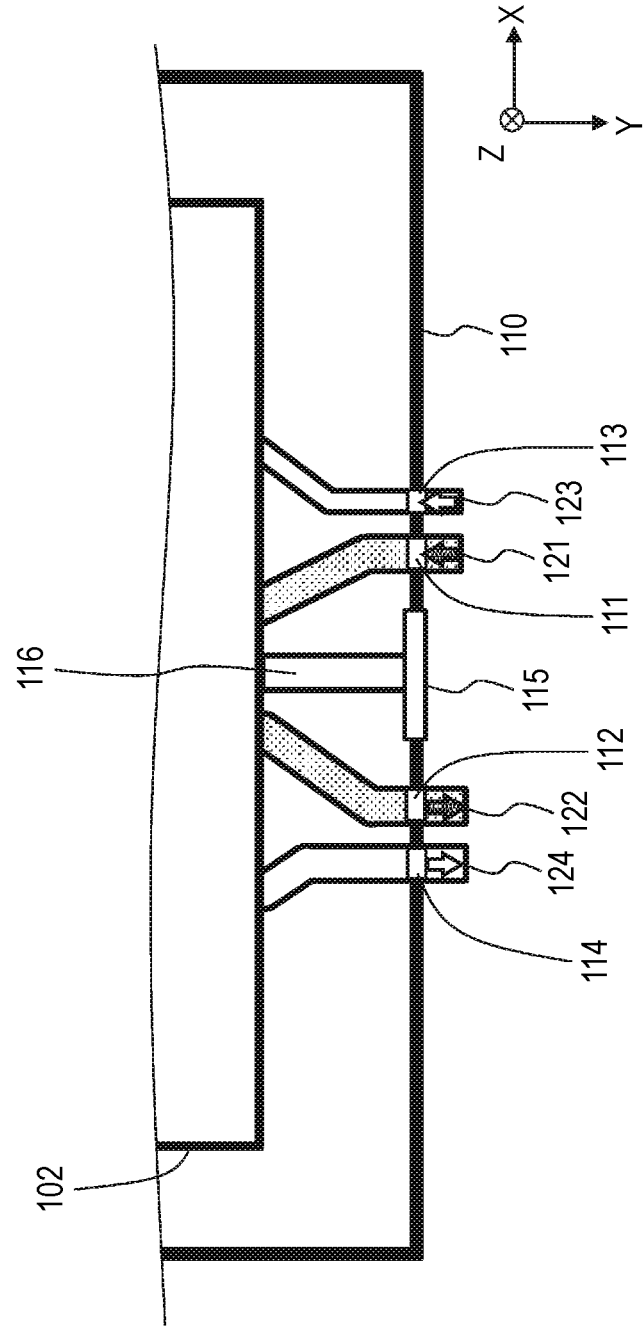
FIG. 21 is a diagram showing an example of a third interface arrangement according to a second embodiment.

FIG. 21 is a diagram showing an example of a third interface arrangement according to the second embodiment.

Since an area of the front surface 110 of the battery pack 100 is relatively small, the interfaces are arranged close to one another (for example, within a predetermined area). In general, the refrigerant input pipe 123 and the refrigerant output pipe 124 are made of conductive metal (for example, aluminum). Accordingly, in the battery pack 100, an insulating space is required between the bus bar 116 that connects the electrical connector 115 and the battery module group 103GP and the refrigerant input pipe 123 as well as the refrigerant output pipe 124.

On the other hand, the coolant input pipe 121 and the coolant output pipe 122 are often made of an insulating resin such as PA12 or PA612. That is, the insulation property of at least one of the coolant input pipe 121 (first pipe) and the coolant output pipe 122 (second pipe) is higher than the insulation property of at least one of the refrigerant input pipe 123 (third pipe) and the refrigerant output pipe 124 (fourth pipe). Accordingly, even when the coolant input pipe 121 and the coolant output pipe 122 are arranged close to (for example, adjacent to) the bus bar 116, the risk of occurrence of a short circuit is low.

Therefore, in the third interface arrangement according to the second embodiment, the coolant input port 111 is arranged between the refrigerant input port 113 and the electrical connector 115, and the coolant output port 112 is arranged between the refrigerant output port 114 and the electrical connector 115, as shown in FIG. 21. Accordingly, the ports can be arranged without the metal refrigerant input pipe 123 and the metal refrigerant output pipe 124 being close to (for example, not adjacent to) the bus bar 116.

FIG. 21 shows an example in which the refrigerant output port 114, the coolant output port 112, the electrical connector 115, the coolant input port 111, and the refrigerant input port 113 are arranged in this order from the left in the drawing on the front surface 110 of the battery pack 100, but the third interface arrangement is not limited to the arrangement shown in FIG. 21.

For example, the third interface arrangement may be an arrangement in which the refrigerant input port 113 and the refrigerant output port 114 shown in FIG. 21 are interchanged. The third interface arrangement may be an arrangement in which the coolant input port 111 and the coolant output port 112 shown in FIG. 21 are interchanged. That is, the third interface arrangement may be the following arrangement in addition to the arrangement shown in FIG. 21.

The refrigerant input port 113, the coolant output port 112, the electrical connector 115, the coolant input port 111, and the refrigerant output port 114 are arranged in this order from the left in the drawing on the front surface 110 of the battery pack 100.

The refrigerant output port 114, the coolant input port 111, the electrical connector 115, the coolant output port 112, and the refrigerant input port 113 are arranged in this order from the left in the drawing on the front surface 110 of the battery pack 100.

The refrigerant input port 113, the coolant input port 111, the electrical connector 115, the coolant output port 112, and the refrigerant output port 114 are arranged in this order from the left in the drawing on the front surface 110 of the battery pack 100.

<Fourth Interface Arrangement>

Figure 22:
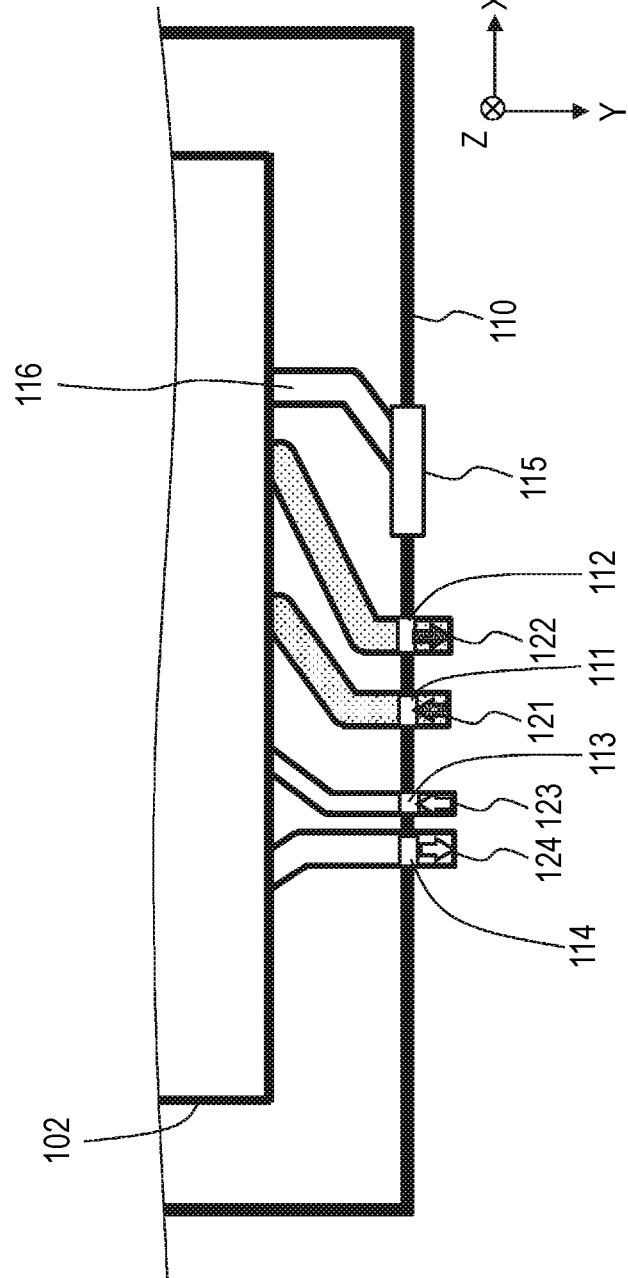
FIG. 22 is a diagram showing an example of a fourth interface arrangement according to the second embodiment.

FIG. 22 is a diagram showing an example of a fourth interface arrangement according to the second embodiment.

In the fourth interface arrangement, the coolant input port 111 and the coolant output port 112 are arranged between the electrical connector 115 and the refrigerant input port 113 as well as the refrigerant output port 114, as shown in FIG. 22. Accordingly, the ports can be arranged without the metal refrigerant input pipe 123 and the metal refrigerant output pipe 124 being close to the bus bar 116 (for example, without being adjacent to each other).

FIG. 22 shows an example in which the refrigerant output port 114, the refrigerant input port 113, the coolant input port 111, the coolant output port 112, and the electrical connector 115 are arranged in this order from the left in the drawing on the front surface 110 of the battery pack 100, but the fourth interface arrangement is not limited to the arrangement shown in FIG. 22.

For example, the fourth interface arrangement may be an arrangement in which the refrigerant input port 113 and the refrigerant output port 114 shown in FIG. 22 are interchanged. In addition, the fourth interface arrangement may be an arrangement in which the coolant input port 111 and the coolant output port 112 shown in FIG. 22 are interchanged. That is, the fourth interface arrangement may be the following arrangement in addition to the arrangement shown in FIG. 22.

The refrigerant input port 113, the refrigerant output port 114, the coolant input port 111, the coolant output port 112, and the electrical connector 115 are arranged in this order from the left in the drawing on the front surface 110 of the battery pack 100.

The refrigerant output port 114, the refrigerant input port 113, the coolant output port 112, the coolant input port 111, and the electrical connector 115 are arranged in this order from the left in the drawing on the front surface 110 of the battery pack 100.

The refrigerant input port 113, the refrigerant output port 114, the coolant output port 112, the coolant input port 111, and the electrical connector 115 are arranged in this order from the left in the drawing on the front surface 110 of the battery pack 100.

Configuration Examples of Coolant Layer and Refrigerant Layer

Next, some configuration examples of the coolant layer 200 and the refrigerant layer 300 in a case where the third interface arrangement or the fourth interface arrangement is provided will be described.

First Configuration Example

Figure 23:
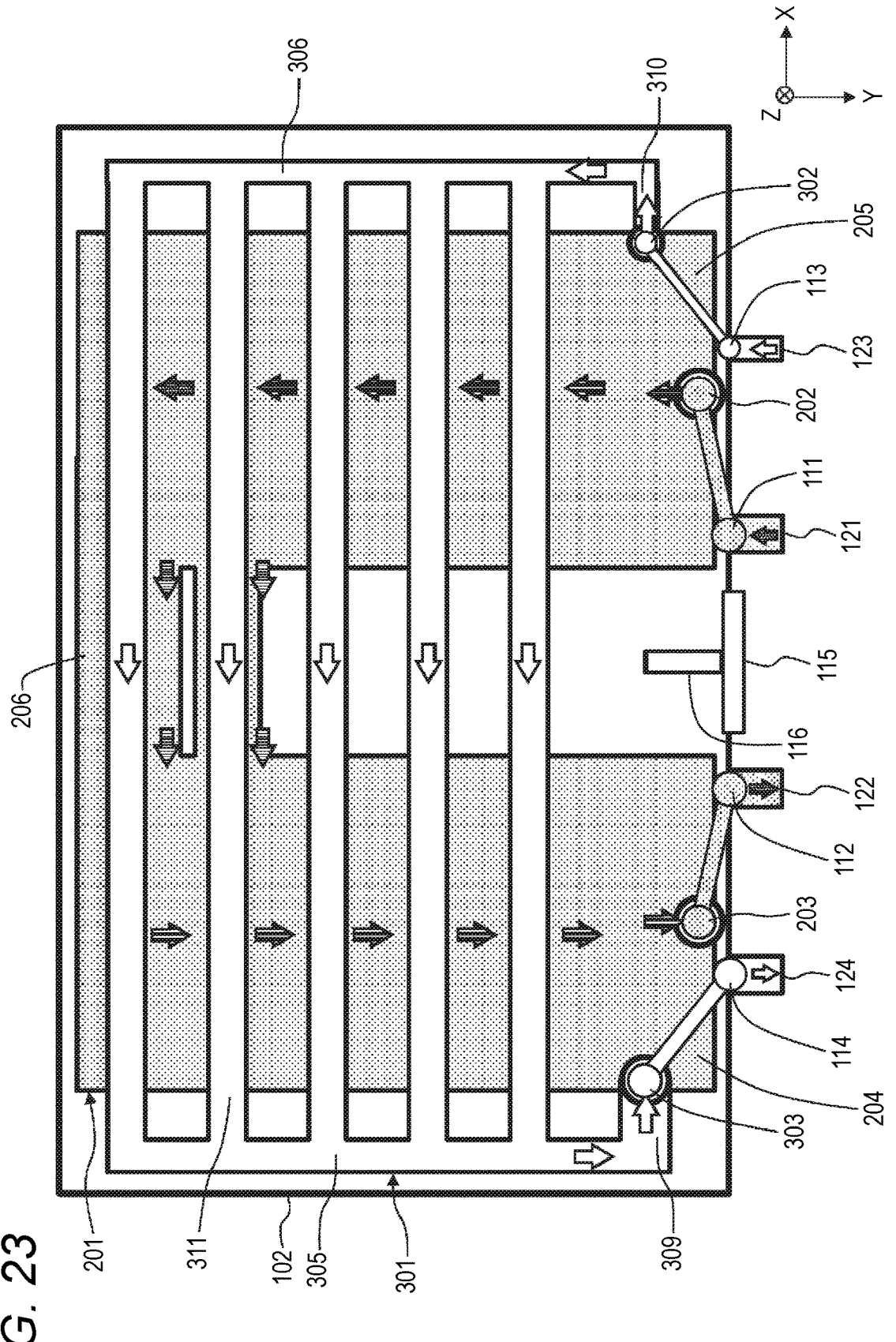
FIG. 23 is a diagram showing a first configuration example of a coolant layer and a refrigerant layer in a case where the third interface arrangement according to the second embodiment is provided.

FIG. 23 is a diagram showing a first configuration example of the coolant layer 200 and the refrigerant layer 300 in a case where the third interface arrangement according to the second embodiment is provided.

As the coolant input pipe 121 and the coolant output pipe 122, thin and flexible resin pipes or hoses may be used. On the other hand, as the refrigerant input pipe 123 and the refrigerant output pipe 124, metal pipes or high-pressure compatible hoses are used so as to withstand high-pressure two-phase gas-liquid gas flowing through the pipes. That is, the refrigerant input pipe 123 and the refrigerant output pipe 124 have a lower degree of freedom in pipe arrangement than the coolant input pipe 121 and the coolant output pipe 122.

Therefore, the refrigerant passage inlet 302 is provided in the vicinity of the refrigerant input port 113, and the refrigerant passage outlet 303 is provided in the vicinity of the refrigerant output port 114. In addition, the refrigerant passage inlet 302 may be provided at a position farther from the electrical connector 115 than the refrigerant input port 113, and the refrigerant passage outlet 303 may be provided at a position farther from the electrical connector 115 than the refrigerant output port 114.

Accordingly, since the distance between the refrigerant input port 113 and the refrigerant passage inlet 302 is shortened, it is easy to arrange the refrigerant input pipe 123 that connects the refrigerant input port 113 and the refrigerant passage inlet 302. Similarly, it is also easy to arrange the refrigerant output pipe 124 that connects the refrigerant output port 114 and the refrigerant passage outlet 303. In addition, the refrigerant input pipe 123 and the refrigerant output pipe 124 can be separated from the bus bar 116.

The coolant passage inlet 202 and the coolant passage outlet 203 may be arranged in a concentrated manner in the vicinity of the coolant input port 111 and the coolant output port 112. For example, the coolant passage inlet 202 and the coolant passage outlet 203 may be arranged within a width less than 25% of an entire width (width in the left-right direction) of the heat exchange plate 102 with the center line C as the center. Alternatively, the refrigerant passage inlet 302 and the refrigerant passage outlet 303 may be arranged within a width of less than 10% of an entire width (width in the left-right direction) of the battery pack 100 with the center line C as the center.

Next, the configurations of the refrigerant passage 301 and the coolant passage 201 shown in FIG. 23 will be described.

First, the refrigerant passage 301 will be described. The refrigerant passage 301 includes the refrigerant passage inlet 302 to the right of the refrigerant input port 113 and the refrigerant passage outlet 303 to the left of the refrigerant output port 114.

The refrigerant passage 301 further includes the right front refrigerant passage 310 that extends rightward from the refrigerant passage inlet 302, the left front refrigerant passage 309 that extends leftward from the refrigerant passage outlet 303, the right refrigerant passage 306 that is connected to the right front refrigerant passage 310 and that extends rearward, the left refrigerant passage 305 that is connected to the left front refrigerant passage 309 and that extends rearward, and the plurality of branched refrigerant passages 311 that connect the right refrigerant passage 306 and the left refrigerant passage 305. The plurality of branched refrigerant passages 311 may be parallel to one another.

The refrigerant input from the refrigerant passage inlet 302 passes through the right front refrigerant passage 310, the right refrigerant passage 306, the plurality of branched refrigerant passages 311, the left refrigerant passage 305, and the left front refrigerant passage 309, and is output from the refrigerant passage outlet 303.

Next, the coolant passage 201 will be described. The coolant passage 201 includes the left coolant passage 204 that extends in the front-rear direction so as to intersect (for example, orthogonal to) the plurality of branched refrigerant passages 311, the right coolant passage 205 that extends in the front-rear direction so as to intersect the plurality of branched refrigerant passages 311, and the at least one rear coolant passage 206 that connects the left coolant passage 204 and the right coolant passage 205 on a rear side. The at least one rear coolant passage 206 may overlap the at least one branched refrigerant passage 311. The coolant passage 201 may intersect 60% or more of an area of the branched refrigerant passage 311.

The coolant passage inlet 202 is provided at a front side of the right coolant passage 205, and the coolant passage outlet 203 is provided at a front side of the left coolant passage 204.

The coolant input from the coolant passage inlet 202 passes through the right coolant passage 205, the rear coolant passage 206, and the left coolant passage 204, and is output from the coolant passage outlet 203, as indicated by white arrows in FIG. 23. At this time, the coolant is cooled as follows by the refrigerant flowing through the refrigerant passage 301.

The coolant flowing through the right coolant passage 205 is cooled by the refrigerant flowing through the plurality of branched refrigerant passages 311 that intersect the right coolant passage 205. The coolant flowing through the left coolant passage 204 is cooled by the refrigerant flowing through the plurality of branched refrigerant passages 311 that intersect the left coolant passage 204. The coolant flowing through the rear coolant passage 206 is cooled by the refrigerant flowing through the branched refrigerant passage 311 that overlap the rear coolant passage 206.

As shown in FIG. 23, the left refrigerant passage 305 may not overlap the left coolant passage 204, and the right refrigerant passage 306 may not overlap the right coolant passage 205. Alternatively, the left refrigerant passage 305 may overlap the left coolant passage 204, and the right refrigerant passage 306 may overlap the right coolant passage 205.

It is difficult to keep the division of the refrigerant uniform under all operation conditions. That is, there is a difference in the amount of the refrigerant flowing through each of the plurality of branched refrigerant passages 311. Therefore, a temperature difference occurs between the plurality of branched refrigerant passages 311. On the other hand, according to the configuration shown in FIG. 23, the coolant flowing through the right coolant passage 205 is cooled by the refrigerant flowing through the plurality of branched refrigerant passages 311 that intersect the right coolant passage 205. The same applies to the left coolant passage 204. Therefore, the temperature of the coolant flowing through the coolant passage 201 is made uniform. Accordingly, the battery module group 103GP arranged on the coolant layer 200 is cooled at high speed and uniformly (without deviation) by the coolant by which the temperature in the coolant layer 200 is made uniform.

Second Configuration Example

Figure 24:
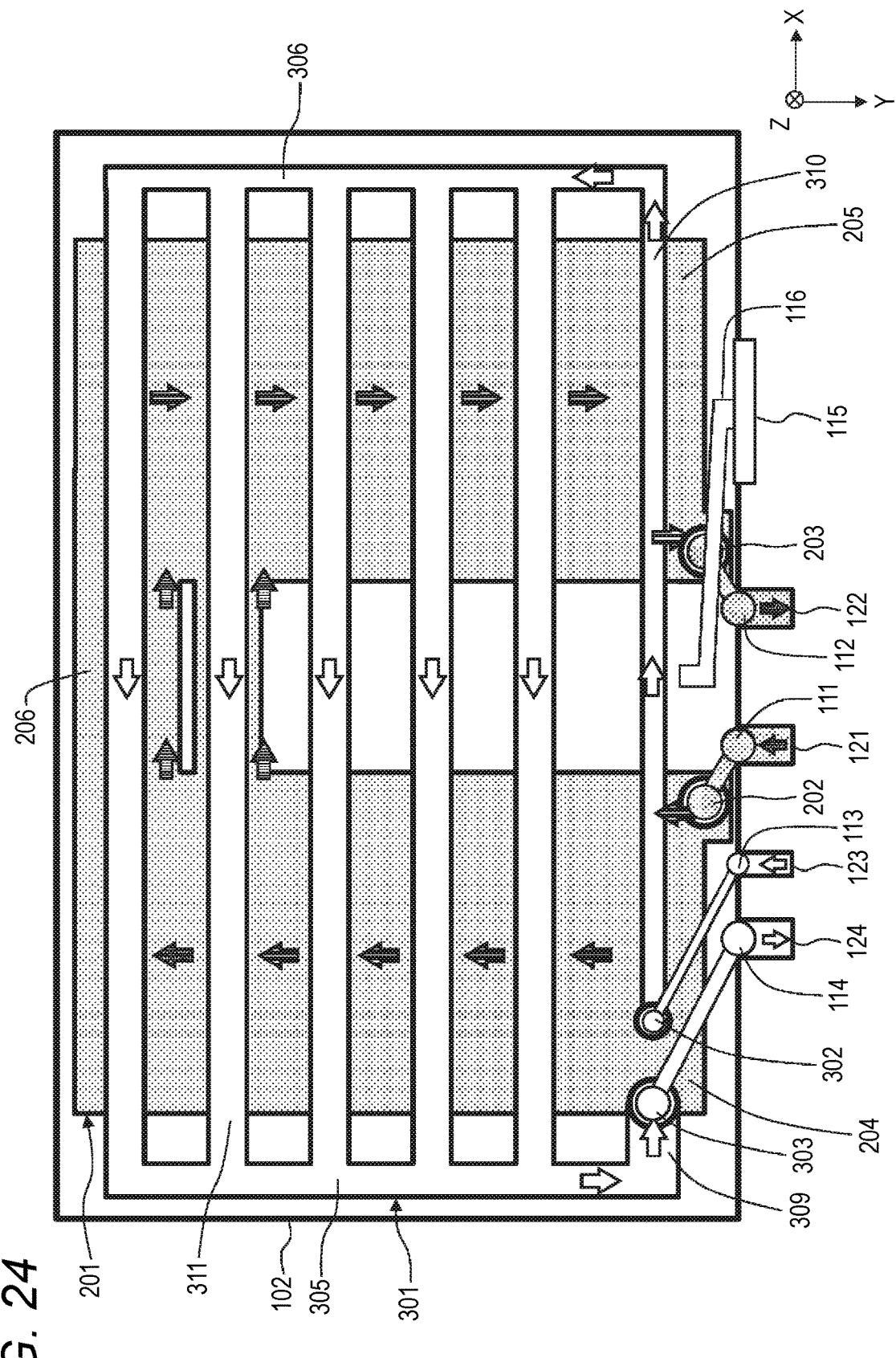
FIG. 24 is a diagram showing a second configuration example of a coolant layer and a refrigerant layer in a case where the fourth interface arrangement according to the second embodiment is provided.

FIG. 24 is a diagram showing a second configuration example of the coolant layer 200 and the refrigerant layer 300 in a case where the fourth interface arrangement according to the second embodiment is provided.

The refrigerant passage 301 shown in FIG. 24 includes the refrigerant passage inlet 302 to the left of the refrigerant input port 113 and the refrigerant passage outlet 303 to the left of the refrigerant output port 114.

The refrigerant passage 301 further includes the right front refrigerant passage 310 that extends rightward from the refrigerant passage inlet 302, the left front refrigerant passage 309 that extends leftward from the refrigerant passage outlet 303, the right refrigerant passage 306 that is connected to the right front refrigerant passage 310 and that extends rearward, the left refrigerant passage 305 that is connected to the left front refrigerant passage 309 and that extends rearward, and the plurality of branched refrigerant passages 311 that connect the right refrigerant passage 306 and the left refrigerant passage 305. The plurality of branched refrigerant passages 311 may be parallel to one another.

The coolant passage 201 shown in FIG. 24 may have the same configuration as that shown in FIG. 23. The coolant passage inlet 202 may be provided to the right front of the left coolant passage 204, and the coolant passage outlet 203 may be provided to the left front of the right coolant passage 205.

The coolant input from the coolant passage inlet 202 passes through the left coolant passage 204, the rear coolant passage 206, and the right coolant passage 205, and is output from the coolant passage outlet 203, as indicated by shaded arrows in FIG. 24.

In the second configuration example, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

In FIG. 24, the coolant output port 112 and the coolant output pipe 122 may be arranged to the right of the electrical connector 115.

<Case where Member in which Refrigerant Input Pipe and Refrigerant Output Pipe are Integrated is Used>

From the viewpoint of reducing the space occupied by the refrigerant input pipe 123 and the refrigerant output pipe 124, a member (refrigerant pipe integration member) in which the refrigerant input pipe 123 and the refrigerant output pipe 124 are integrated may be used. In this case, the refrigerant input port 113 and the refrigerant output port 114 are preferably arranged adjacent to each other so that the refrigerant pipe integration member can be connected. For example, when the refrigerant pipe integration member is used, the battery pack 100 may adopt the fourth interface arrangement in which the refrigerant input port 113 and the refrigerant output port 114 are adjacent to each other.

<Case where Battery Pack Includes Two Heat Exchange Plates>

Figure 25:
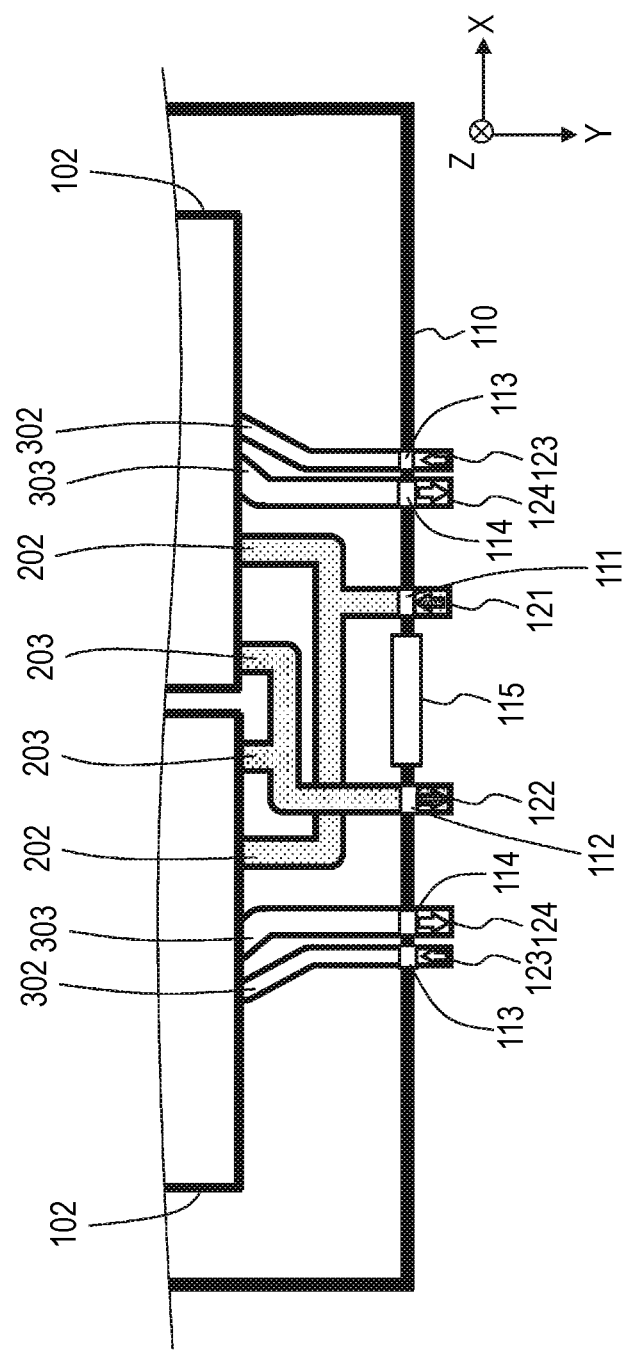
FIG. 25 is a diagram showing an example of the third interface arrangement in a case where a battery pack according to the second embodiment includes two heat exchange plates.
Figure 26:
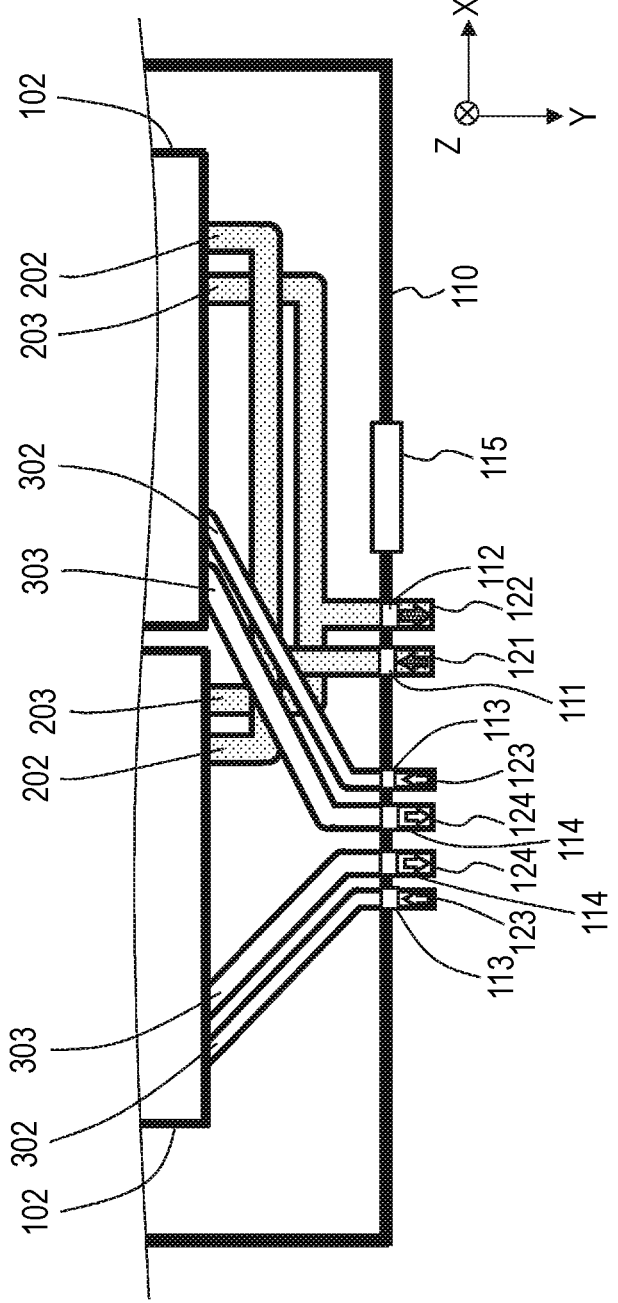
FIG. 26 is a diagram showing an example of the fourth interface arrangement in a case where the battery pack according to the second embodiment includes two heat exchange plates.

FIG. 25 is a diagram showing an example of the third interface arrangement in a case where the battery pack 100 according to the second embodiment includes two heat exchange plates 102. FIG. 26 is a diagram showing an example of the fourth interface arrangement in a case where the battery pack 100 according to the second embodiment includes two heat exchange plates 102.

In FIGS. 25 and 26, each of the two heat exchange plates 102 includes the refrigerant passage inlet 302, the refrigerant passage outlet 303, the coolant passage inlet 202, and the coolant passage outlet 203.

As described above, it is easy to impart flexibility to the coolant input pipe 121 and the coolant output pipe 122. Accordingly, one coolant input port 111 may be provided on the front surface 110 of the battery pack 100, and the coolant input pipe 121 connected to the coolant input port 111 may be branched into two in the middle to be connected to the respective coolant passage inlets 202 of the two coolant layers 200. Similarly, one coolant output port 112 may be arranged on the front surface 110 of the battery pack 100, and the coolant output pipe 122 connected to the coolant output port 112 may be branched into two in the middle to be connected to the respective coolant passage outlets 203 of the two coolant layers 200. Accordingly, the number of ports can be reduced, and the space occupied by the coolant input pipe 121 and the coolant output pipe 122 in the battery pack 100 can be reduced.

On the other hand, as described above, it is difficult to impart sufficient flexibility to the refrigerant input pipe 123 and the refrigerant output pipe 124. Accordingly, the first refrigerant input port 113 and the first refrigerant output port 114 that are connected to the left refrigerant layer 300 as well as the second refrigerant input port 113 and the second refrigerant output port 114 that are connected to the right refrigerant layer 300 may be arranged on the front surface 110 of the battery pack 100. The first refrigerant input port 113 and the first refrigerant output port 114 may be arranged adjacent to each other. Similarly, the second refrigerant input port 113 and the second refrigerant output port 114 may be arranged adjacent to each other. The above refrigerant pipe integration member can be connected to the first refrigerant input port 113 and the first refrigerant output port 114 that are arranged adjacent to each other. Similarly, the above refrigerant pipe integration member can be connected to the second refrigerant input port 113 and the second refrigerant output port 114 that are arranged adjacent to each other.

Figure 27:
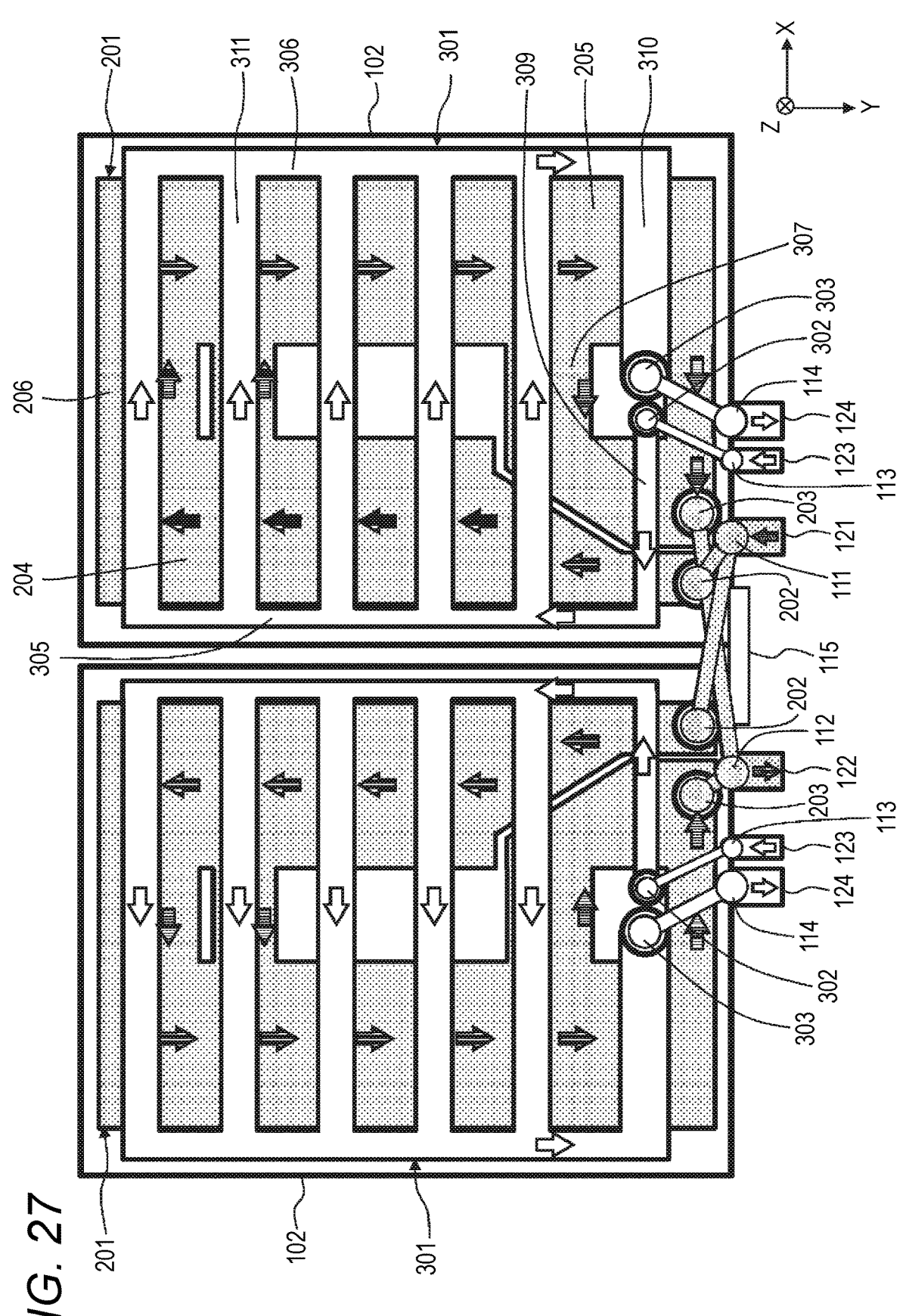
FIG. 27 is a diagram showing a configuration example of a coolant layer and a refrigerant layer in a case where two heat exchange plates according to the second embodiment are provided.

FIG. 27 is a diagram showing a configuration example of the coolant layer 200 and the refrigerant layer 300 in a case where two heat exchange plates 102 according to the second embodiment are provided. FIG. 27 shows an example of a case where the third interface arrangement is adopted.

First, the right heat exchange plate 102 will be described. The refrigerant passage 301 includes the refrigerant passage inlet 302 and the refrigerant passage outlet 303 in the vicinity of the center at a front side of the right heat exchange plate 102. The refrigerant passage inlet 302 is located to the left of the refrigerant passage outlet 303.

The refrigerant passage 301 further includes the left refrigerant passage 305 that extends in the front-rear direction at a left end of the right heat exchange plate 102, the right refrigerant passage 306 that extends in the front-rear direction at a right end of the right heat exchange plate 102, the plurality of branched refrigerant passages 311 that connect the left refrigerant passage 305 and the right refrigerant passage 306, the left front refrigerant passage 309 that connects the refrigerant passage inlet 302 and the left refrigerant passage 305, and the right front refrigerant passage 310 that connects the refrigerant passage outlet 303 and the right refrigerant passage 306. The plurality of branched refrigerant passages 311 may be parallel to one another.

The refrigerant input from the refrigerant passage inlet 302 passes through the left front refrigerant passage 309, the left refrigerant passage 305, the plurality of branched refrigerant passages 311, the right refrigerant passage 306, and the right front refrigerant passage 310, and is output from the refrigerant passage outlet 303, as indicated by white arrows in FIG. 27.

The coolant passage 201 includes the left coolant passage 204 that extends in the front-rear direction so as to intersect the plurality of branched refrigerant passages 311, the right coolant passage 205 that extends in the front-rear direction so as to intersect the plurality of branched refrigerant passages 311, the at least one rear coolant passage 206 that connects the left coolant passage 204 and the right coolant passage 205 on a rear side, and the front coolant passage 207 that extends leftward from the right coolant passage 205 on a front side. The at least one rear coolant passage 206 may overlap the at least one branched refrigerant passage 311. The front coolant passage 207 may overlap the left front refrigerant passage 309 and the right front refrigerant passage 310.

The coolant passage inlet 202 is provided in front of the left coolant passage 204, and the coolant passage outlet 203 is provided at a left end of the front coolant passage 207.

The coolant input from the coolant passage inlet 202 passes through the left coolant passage 204, the rear coolant passage 206, the right coolant passage 205, and the front coolant passage 207, and is output from the coolant passage outlet 203, as indicated by shaded arrows in FIG. 27.

The configuration of the refrigerant passage 301 and the coolant passage 201 in the left heat exchange plate 102 may be a configuration in which the refrigerant passage 301 and the coolant passage 201 in the right heat exchange plate 102 described above are horizontally inverted.

In FIG. 27, the coolant input pipe 121 which branches from one coolant input port 111 to the coolant passage inlets 202 of the left and right coolant passages 201 may be used. Further, in FIG. 27, the coolant output pipe 122 which branches from one coolant output port 112 to the coolant passage outlets 203 of the left and right coolant passages 201 may be used. Accordingly, the space occupied by the coolant input pipe 121 and the coolant output pipe 122 in the battery pack 100 can be reduced.

With such a configuration, the coolant flowing through the coolant passage 201 is also uniformly cooled by the refrigerant flowing through the refrigerant passage 301 in each of the right heat exchange plate 102 and the left heat exchange plate 102. Accordingly, the battery module group 103GP arranged on the coolant layer 200 is cooled at high speed and uniformly (without deviation) by the coolant by which the temperature in the coolant layer 200 is made uniform.

<Case where Refrigerant Double Pipe is Used>

From the viewpoint of reducing the space occupied by the refrigerant input pipe 123 and the refrigerant output pipe 124, a double pipe (refrigerant double pipe 125) in which the refrigerant input pipe 123 is inserted into the refrigerant output pipe 124 may be used.

Figure 28:
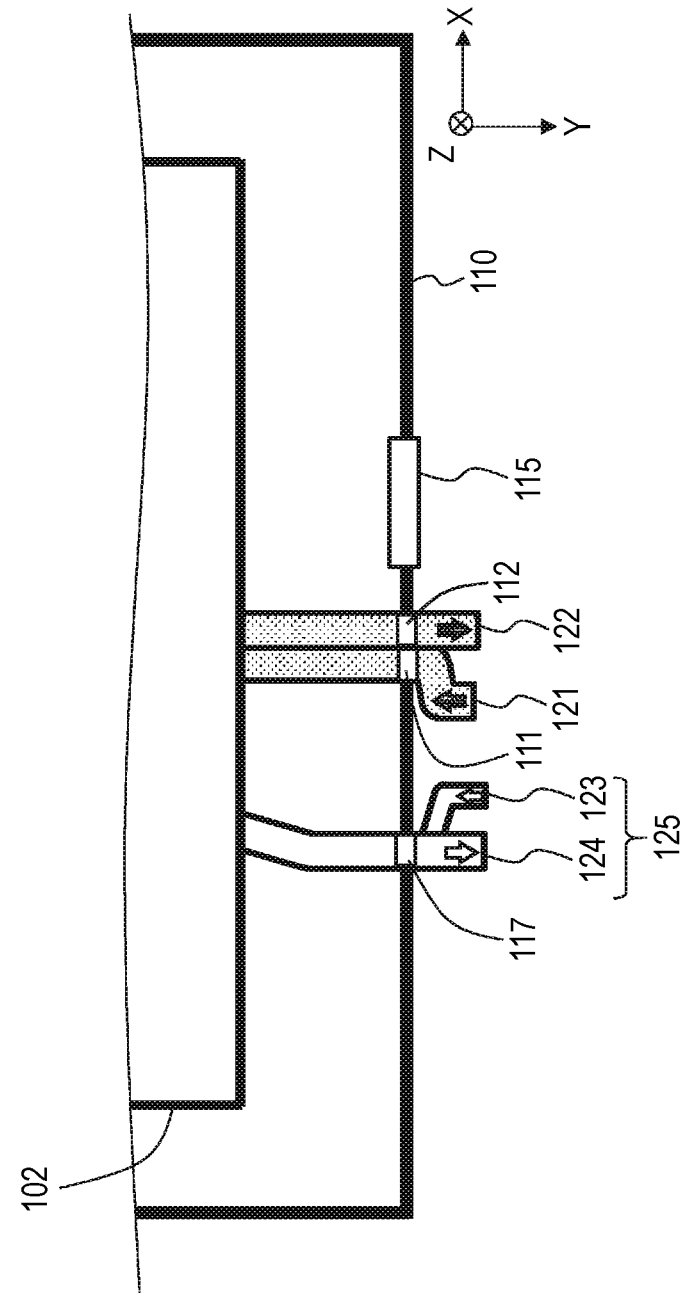
FIG. 28 is a diagram showing an example of the fourth interface arrangement in which a refrigerant double pipe according to the second embodiment is used.

FIG. 28 is a diagram showing an example of the fourth interface arrangement in which the refrigerant double pipe 125 according to the second embodiment is used.

In the fourth interface arrangement in which the refrigerant double pipe 125 is used, the refrigerant input/output port 117 in which the refrigerant input port 113 and the refrigerant output port 114 are integrated may be arranged on the front surface 110 of the battery pack 100. In this case, the refrigerant input/output port 117 may be a part of the refrigerant double pipe 127.

Accordingly, the number of ports can be reduced, and the space occupied by the refrigerant input pipe 123 and the refrigerant output pipe 124 in the battery pack 100 can be reduced.

When the battery pack 100 includes two heat exchange plates 102 as shown in FIG. 27, the refrigerant input/output ports 117 (that is, two refrigerant input/output ports 117) corresponding to the two heat exchange plates 102, respectively, may be arranged on the front surface 110 of the battery pack 100.

Figure 29:
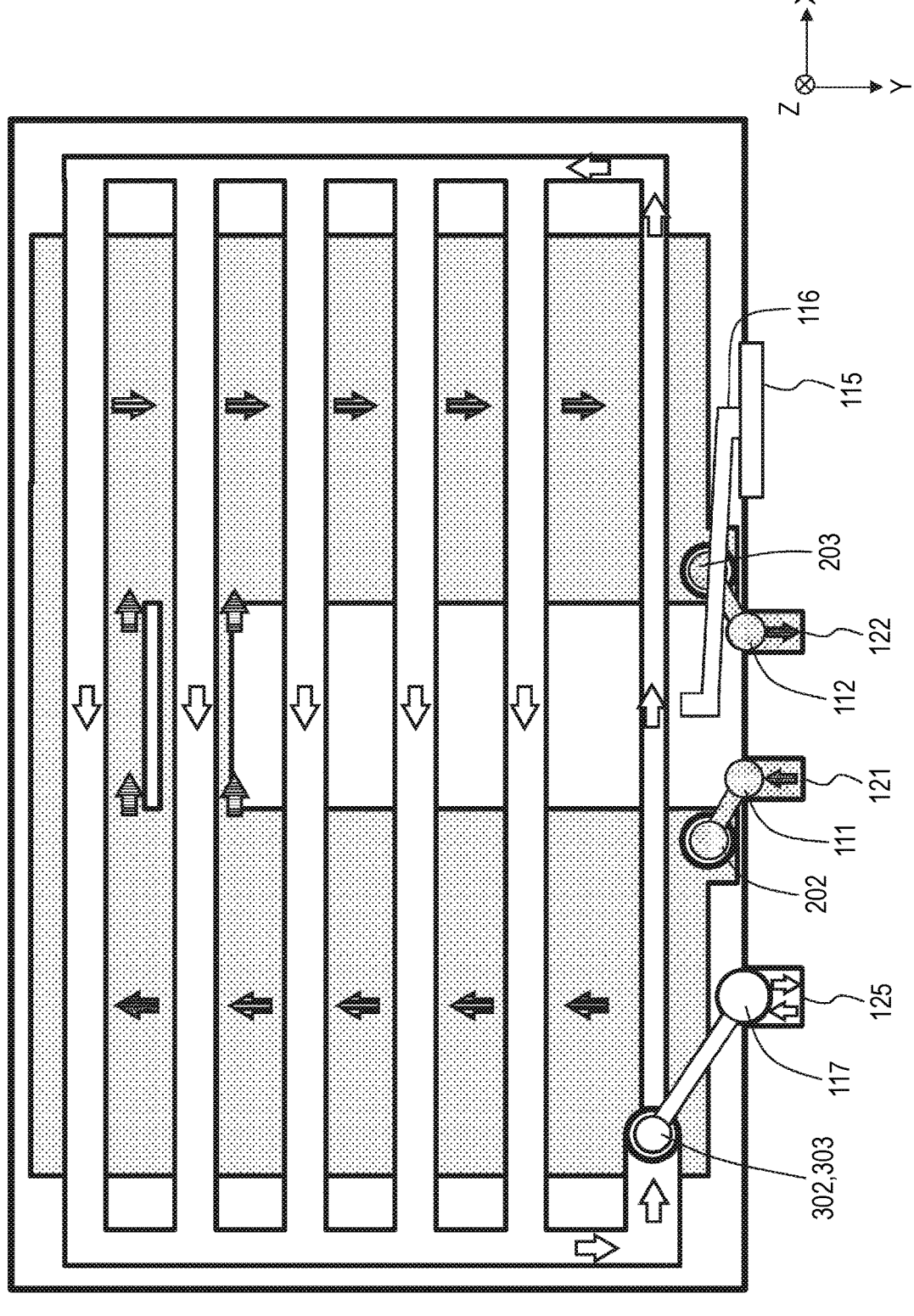
FIG. 29 is a diagram showing a configuration example of the heat exchange plate in a case where the refrigerant double pipe according to the second embodiment is used.

FIG. 29 is a diagram showing a configuration example of the heat exchange plate 102 in a case where the refrigerant double pipe 125 according to the second embodiment is used.

The refrigerant passage 301 has a configuration in which the refrigerant passage inlet 302 and the refrigerant passage outlet 303 according to the configuration example shown in FIG. 24 correspond to the refrigerant double pipe 125. The coolant passage 201 has the same configuration as that of the configuration example shown in FIG. 24.

With such a configuration, the coolant flowing through the coolant passage 201 is also uniformly cooled by the refrigerant flowing through the refrigerant passage 301. Accordingly, the battery module group 103GP arranged on the coolant layer 200 is cooled at high speed and uniformly (without deviation) by the coolant by which the temperature in the coolant layer 200 is made uniform.

The refrigerant double pipe 125 may be connected to the refrigerant passage 301 by the method described in FIG. 18 or FIG. 19 of the first embodiment.

Third Embodiment

The vehicle 1 and the battery pack 100 according to a third embodiment will be described. In the third embodiment, the same components as those in the first embodiment are denoted by the same reference numerals, and the description thereof may be omitted.

As described in the first embodiment, the vehicle 1 according to the third embodiment includes the vehicle body 2, the first wheels 3a, the second wheels 3b, the electric motor 4, the battery module group 103GP including the plurality of battery modules 103, the battery pack 100, the coolant layer 200, and the refrigerant layer 300. Next, battery pack 100 according to the third embodiment will be described.

<Configuration of Battery Pack>

Figure 30A:
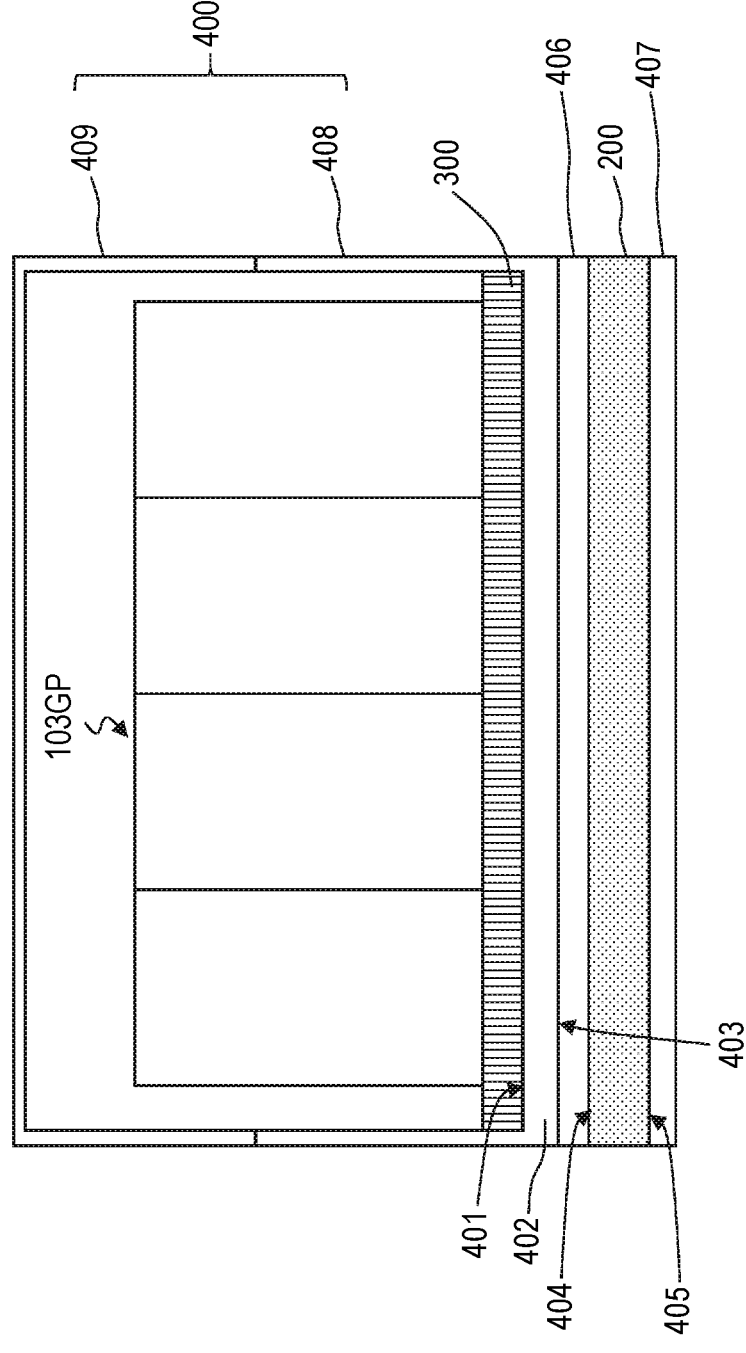
FIG. 30A is a schematic diagram showing a first example of a configuration of a battery pack according to a third embodiment.
Figure 30B:
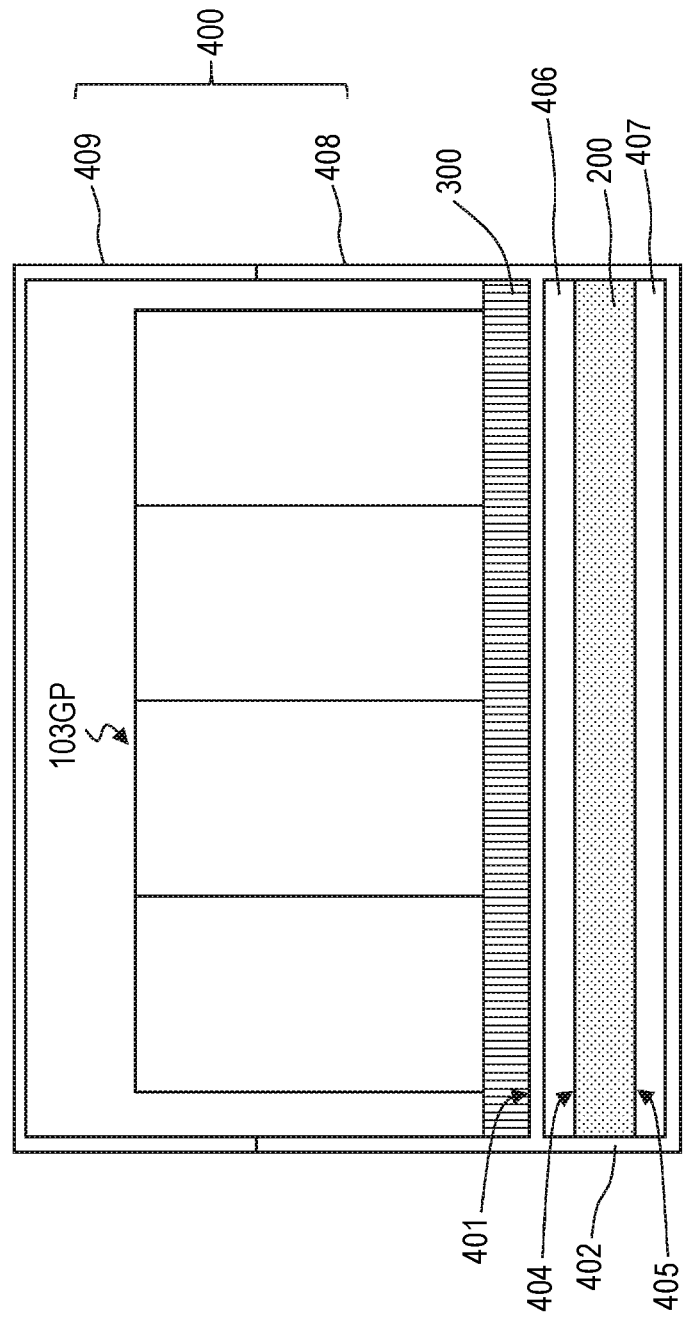
FIG. 30B is a schematic diagram showing a second example of the configuration of the battery pack according to the third embodiment.

FIG. 30A is a schematic diagram showing a first example of the configuration of the battery pack 100 according to the third embodiment. FIG. 30B is a schematic diagram showing a second example of the configuration of the battery pack 100 according to the third embodiment.

The battery pack 100 includes a housing 400 that stores the battery module group 103GP. The housing 400 has a predetermined inner surface 401. The predetermined inner surface 401 is, for example, an inner bottom surface of the housing 400.

The battery module group 103GP, the coolant layer 200, and the refrigerant layer 300 are arranged along the predetermined inner surface 401 of the housing 400. Here, the coolant layer 200 is arranged outside the predetermined inner surface 401 of the housing 400 and inside the vehicle body 2.

When the coolant layer 200 is damaged due to an accident of the vehicle 1 or the like, the coolant may leak from the coolant layer 200. When the leaked coolant is splashed to the battery module group 103GP, a short circuit may occur. According to the configuration of the present disclosure, the battery module group 103GP is stored in the housing 400, and the coolant layer 200 is arranged outside the predetermined inner surface 401 of the housing 400. Accordingly, even when the coolant leaks from the coolant layer 200, the leaked coolant is not splashed to the battery module group 103GP which is stored in the housing 400. Therefore, the safety in a case where the coolant layer 200 is damaged is improved.

At least a part of the refrigerant layer 300 may be arranged between the battery module group 103GP and the coolant layer 200.

As shown in FIG. 30A, the housing 400 of the battery pack 100 may include a planar member 402 having a predetermined thickness on the predetermined inner surface 401 of the housing 400. The planar member 402 may have a predetermined outer surface 403 that is opposite to the predetermined inner surface 401 of the housing 400 and that extends along the predetermined inner surface 401 of the housing 400. As shown in FIG. 30A, the coolant layer 200 may be arranged along the outer surface 403 of the planar member 402, outside the housing 400, and inside the vehicle body 2.

Alternatively, as shown in FIG. 30B, the housing 400 of the battery pack 100 may include the planar member 402 having a predetermined thickness on the predetermined inner surface 401 of the housing 400. The coolant layer 200 may be provided inside the planar member 402.

The coolant layer 200 includes a first surface 404 and a second surface 405 opposite to the first surface 404. The first surface 404 of the coolant layer 200 is arranged between the refrigerant layer 300 and the second surface 405 of the coolant layer 200.

The battery pack 100 may include a first adjacent member 406 arranged adjacent to the first surface 404 of the coolant layer 200. The first adjacent member 406 may be arranged between the refrigerant layer 300 and the first surface 404 of the coolant layer 200, and may be arranged adjacent to the refrigerant layer 300.

The battery pack 100 may include a second adjacent member 407 arranged adjacent to the second surface 405 of the coolant layer 200.

A first thermal conductivity of the first adjacent member 406 may be higher than a second thermal conductivity of the second adjacent member 407. Accordingly, it is possible to efficiently perform heat exchange among the coolant layer 200, the refrigerant layer 300, and the battery module group 103GP. The first adjacent member 406 may have a planar shape. Examples of the first adjacent member 406 include a heat transfer sheet.

The housing 400 of the battery pack 100 may be sealed. Accordingly, the coolant leaked from the coolant layer 200 can be prevented from entering the housing 400. Alternatively, the housing 400 may not be sealed. For example, a part of an upper portion of the housing 400 may be opened.

The housing 400 of the battery pack may include a first housing member 408 and a second housing member 409. In this case, the first housing member 408 may include the predetermined inner surface 401 of the housing 400 described above. The battery module group 103GP may be arranged between the first housing member 408 and the second housing member 409.

Next, a specific configuration example of the above battery pack 100 will be described.

First Configuration Example

Figure 31:
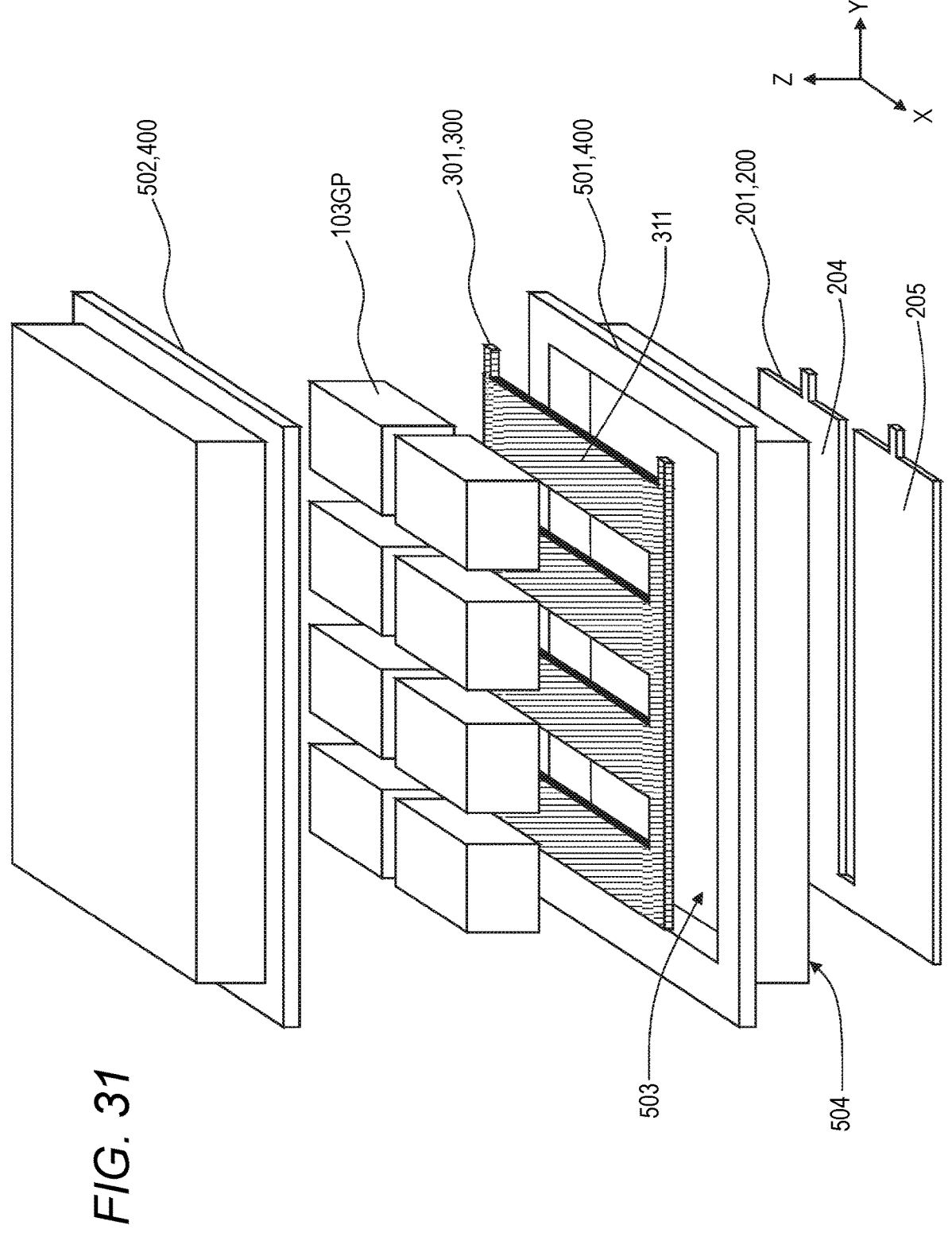
FIG. 31 is an exploded perspective view showing a first configuration example of the battery pack according to the third embodiment.
Figure 32:
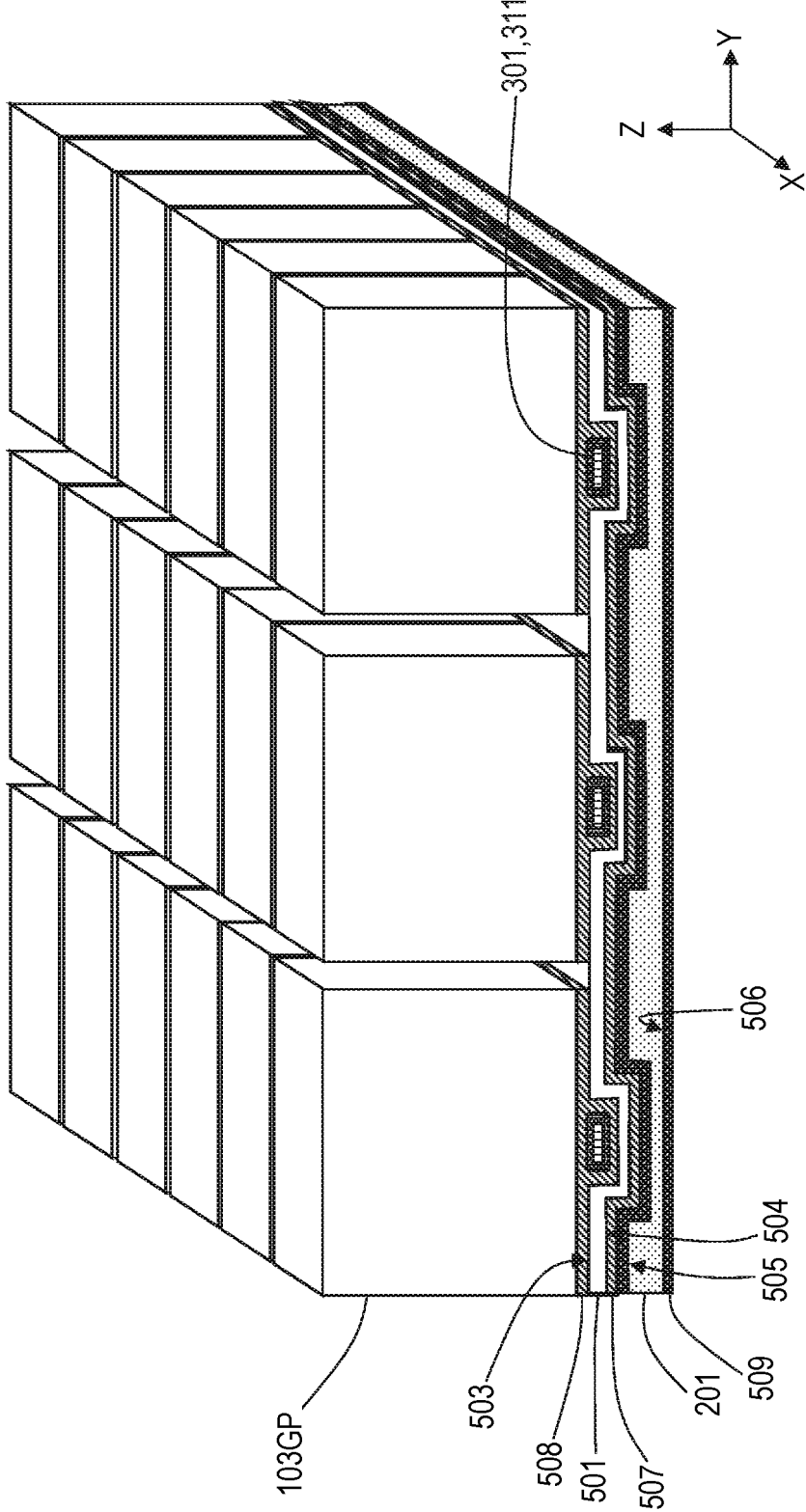
FIG. 32 is a diagram showing a cross section of a coolant layer and a refrigerant layer 300 in the first configuration example of the battery pack according to the third embodiment.

FIG. 31 is an exploded perspective view showing a first configuration example of the battery pack 100 according to the third embodiment. FIG. 32 is a diagram showing a cross section of the coolant layer 200 and the refrigerant layer 300 in the first configuration example of the battery pack 100 according to the third embodiment.

The battery pack 100 includes a box-shaped housing 400 having a hollow interior. The housing 400 includes a lower cover 501 constituting a lower half of the housing 400 and an upper cover 502 constituting an upper half of the housing 400. The lower cover 501 is an example of the first housing member 408, and the upper cover 502 is an example of the second housing member 409. The lower cover 501 may be made of, for example, iron.

The refrigerant passage 301 constituting the refrigerant layer 300 and the battery module group 103GP are stored in the housing 400. The refrigerant passage 301 constituting the refrigerant layer 300 is arranged along an inner bottom surface (hereinafter, referred to as an "inner bottom surface") 503 of the lower cover 501. The inner bottom surface 503 is an example of the predetermined inner surface 401 of the housing 400 described above. The battery module group 103GP is arranged on the refrigerant passage 301. The refrigerant passage 301 may be made of, for example, aluminum.

The coolant passage 201 constituting the coolant layer 200 is arranged along an outer bottom surface (hereinafter, referred to as an "outer bottom surface") 504 of the lower cover 501. The coolant passage 201 may be made of, for example, iron. Alternatively, the coolant passage 201 may be made of resin.

A portion of the lower cover 501, which is sandwiched between the inner bottom surface 503 and the outer bottom surface 504 and which has a predetermined thickness, is an example of the planar member 402 described above. As shown in FIG. 32, the planar member 402 may have a shape in which a portion through which the refrigerant passage 301 passes is recessed.

In this way, by storing the battery module group 103GP in the housing 400 and arranging the coolant layer 200 along the outer bottom surface 504 of the lower cover 501, even when the coolant leaks from the coolant passage 201, the leaked coolant is not splashed to the battery module group 103GP stored in the housing 400.

As shown in FIG. 31, the coolant passage 201 and the refrigerant passage 301 may have a configuration as shown in FIG. 9. That is, flows of the coolant in the left coolant passage 204 and the right coolant passage 205 that constitute the coolant passage 201 and flows of the refrigerant in the branched refrigerant passages 311 that constitute the refrigerant passage 301 may be orthogonal to each other. Accordingly, the battery module group 103GP can be uniformly cooled.

As shown in FIG. 32, a first heat transfer sheet 507 may be provided between the outer bottom surface 504 of the lower cover 501 and an upper surface 505 of the coolant passage 201. The upper surface 505 of the coolant passage 201 is an example of the first surface 404 of the coolant layer 200 described above. A lower surface 506 of the coolant passage 201 is an example of the second surface 405 of the coolant layer 200 described above. The first heat transfer sheet 507 is an example of the first adjacent member 406 described above. The coolant passage 201 may be arranged on a predetermined support member 509. The support member 509 is an example of the second adjacent member 407 described above. A first thermal conductivity of the first heat transfer sheet 507 may be higher than a second thermal conductivity of the support member 509. Accordingly, it is possible to efficiently perform heat exchange between the coolant passage 201 and the lower cover 501.

As shown in FIG. 32, a second heat transfer sheet 508 may be provided between the refrigerant passage 301 and the inner bottom surface 503 of the lower cover 501. In addition, as shown in FIG. 32, the second heat transfer sheet 508 may also be provided between the lower surface of the battery module group 103GP and the inner bottom surface 503 of the lower cover 501 as well as the upper surface 505 of the refrigerant passage 301. Accordingly, it is possible to efficiently perform heat exchange between the lower cover 501 and the coolant passage 301 as well as between the refrigerant passage 301 and the battery module group 103GP.

According to this configuration, the refrigerant flowing through the refrigerant passage 301 cools the battery module group 103GP via the second heat transfer sheet 508. The refrigerant flowing through the refrigerant passage 301 further cools the coolant flowing through the coolant passage 201 via the second heat transfer sheet 508, the lower cover 501, and the first heat transfer sheet 507. The coolant flowing through the coolant passage 201 cools the battery module group 103GP via the first heat transfer sheet 507, the lower cover 501, and the second heat transfer sheet 508. Therefore, the battery module group 103GP can be cooled at high speed and uniformly as compared with a case of being cooled by only the refrigerant or only the coolant.

Figure 33:
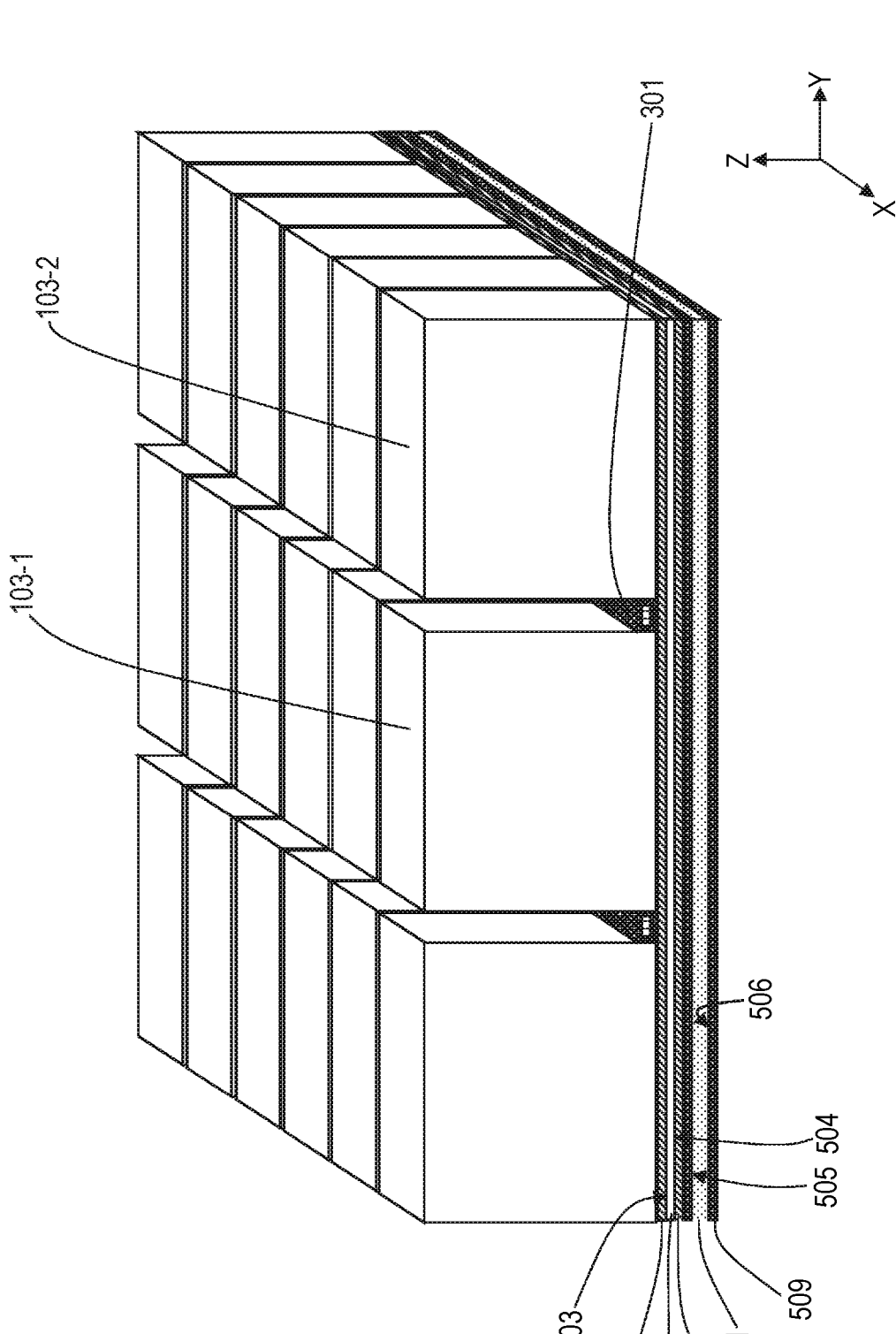
FIG. 33 is a diagram showing a cross section of a coolant layer and a refrigerant layer in a modification of the first configuration of the battery pack according to the third embodiment.

FIG. 33 is a diagram showing a cross section of the coolant layer 200 and the refrigerant layer 300 in a modification of the first configuration of the battery pack 100 according to the third embodiment.

FIG. 33 is different from FIG. 32 in that at least a part of the refrigerant passage 301 constituting the refrigerant layer 300 is arranged between a first battery module 103-1 and a second battery module 103-2 that constitute the battery module group 103GP.

That is, the second heat transfer sheet 508 is provided between the inner bottom surface 503 of the lower cover 501 and the lower surface of the battery module group 103GP. The branched refrigerant passages 311 constituting the refrigerant passage 301 may be arranged along a gap between the first battery module 103-1 and the second battery module 103-2 on the second heat transfer sheet 508.

A portion of the lower cover 501, which is sandwiched between the inner bottom surface 503 and the outer bottom surface 504 and which has a predetermined thickness, is an example of the planar member 402 described above. As shown in FIG. 33, the planar member 402 may have a shape without unevenness. Alternatively, the coolant passage 201 may be provided inside the planar member 402.

According to this configuration, the refrigerant flowing through the branched refrigerant passages 311 cools the first battery module 103-1 and the second battery module 103-2, which are adjacent to each other. The refrigerant further cools the coolant flowing through the coolant passage 201 via the second heat transfer sheet 508, the lower cover 501, and the first heat transfer sheet 507. The coolant flowing through the coolant passage 201 cools the lower surface of the battery module group 103GP via the first heat transfer sheet 507, the lower cover 501, and the second heat transfer sheet 508. Therefore, the battery module group 103GP can be cooled at high speed and uniformly as compared with a case of being cooled by only the refrigerant or only the coolant.

Second Configuration Example

Figure 34:
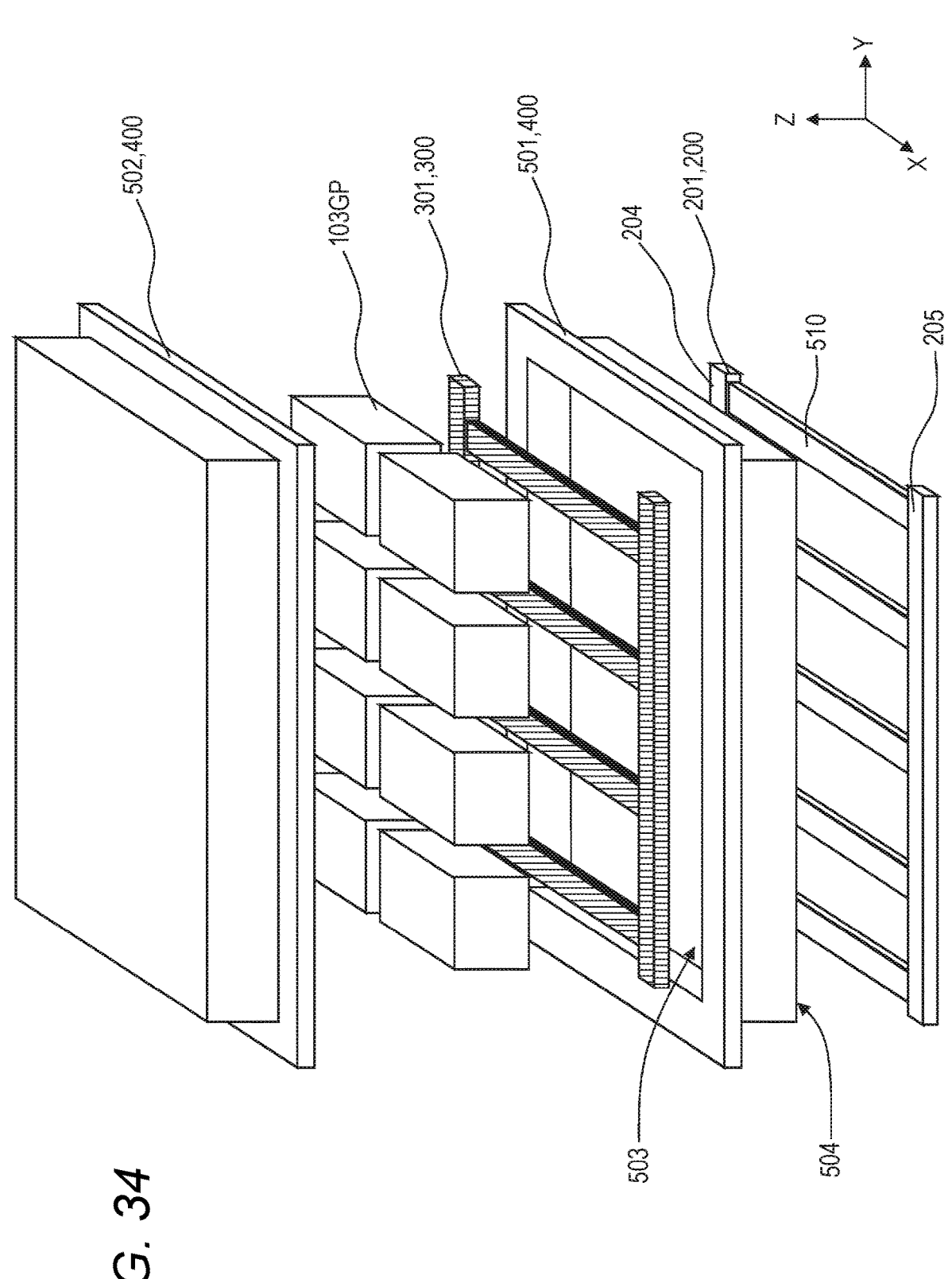
FIG. 34 is an exploded perspective view showing a second configuration example of the battery pack according to the third embodiment.
Figure 35:
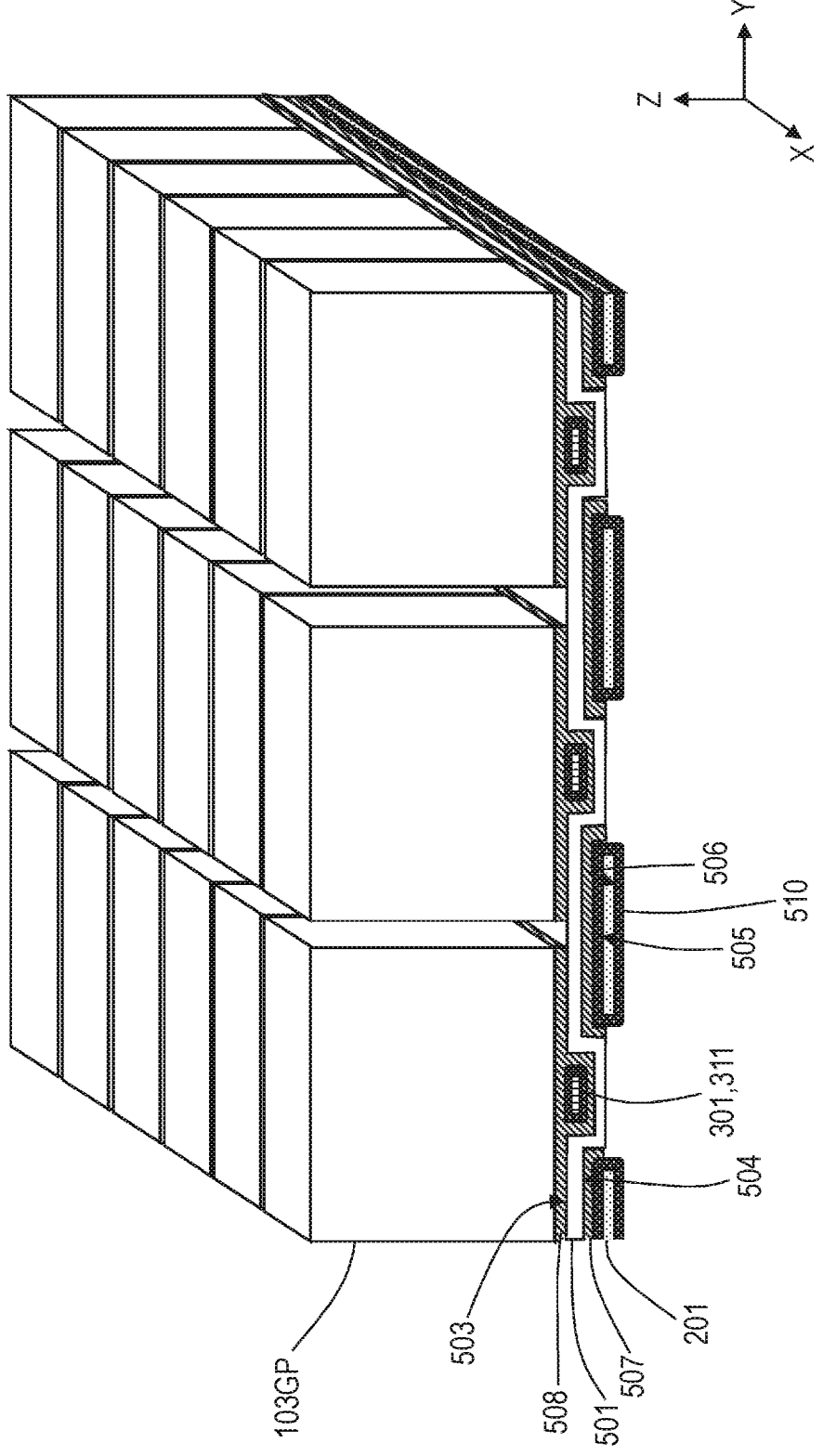
FIG. 35 is a diagram showing a cross section of a coolant layer and a refrigerant layer in the second configuration example of the battery pack according to the third embodiment.

FIG. 34 is an exploded perspective view showing a second configuration example of the battery pack 100 according to the third embodiment. FIG. 35 is a diagram showing a cross section of the coolant layer 200 and the refrigerant layer 300 in the second configuration example of the battery pack 100 according to the third embodiment.

The second configuration example shown in FIGS. 34 and 35 is different from the first configuration example shown in FIGS. 31 and 32 in the configuration of the coolant passage 201. That is, the coolant passage 201 according to the second configuration example includes the left coolant passage 204 that extends in the front-rear direction on a left side, the right coolant passage 205 that extends in the front-rear direction on a right side, and the plurality of branched coolant passages 510 that connect the right coolant passage 205 and the left coolant passage 204. In this case, flows of the coolant in the left coolant passage 204 and the right coolant passage 205 that constitute the coolant passage 201 and flows of the coolant in the branched refrigerant passages 311 that constitute the refrigerant passage 301 may be in the same direction or in the opposite direction.

According to this configuration, the refrigerant flowing through the refrigerant passage 301 and the coolant flowing through the coolant passage 201 also cool the battery module group 103GP, similarly to the first configuration example. Therefore, the battery module group 103GP can be cooled at high speed and uniformly as compared with a case of being cooled by only the refrigerant or only the coolant.

Third Configuration Example

Figure 36:
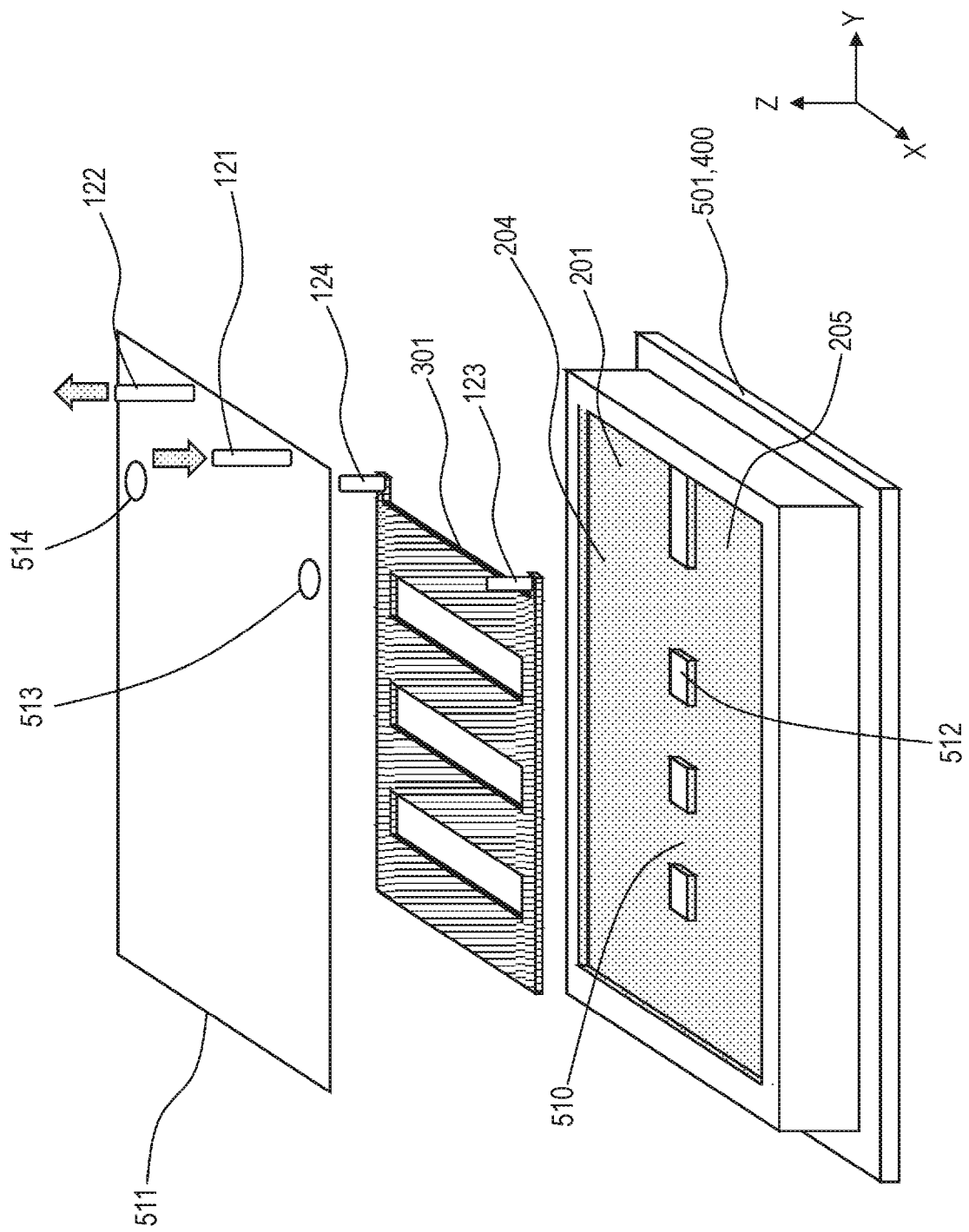
FIG. 36 is an exploded perspective view showing a third configuration example of the battery pack according to the third embodiment.

FIG. 36 is an exploded perspective view showing a third configuration example of the battery pack 100 according to the third embodiment. In FIG. 36, the drawing of the upper cover 502 and the battery module group 103GP is omitted.

In the third configuration example, a liquid cover 511 having the same size as the inner bottom surface 503 is provided with a gap of a predetermined height from above toward the inner bottom surface 503 of the lower cover 501. A wall 512 for forming a flow path of the coolant is provided on the inner bottom surface 503 of the lower cover 501 so that a space formed by the liquid cover 511 and the inner bottom surface 503 of the lower cover 501 functions as the coolant passage 201. For example, the wall 512 is provided on the inner bottom surface 503 of the lower cover 501 so as to form branched coolant passages 510 that connect the left coolant passage 204 and the right coolant passage 205.

In addition, the refrigerant passage 301 is arranged in the space formed by the liquid cover 511 and the inner bottom surface 503 of the lower cover 501.

The coolant input pipe 121 and the coolant output pipe 122 that are connected to the coolant passage 201 may be connected to the liquid cover 511. Accordingly, the coolant input through the coolant input pipe 121 flows through the coolant passage 201 formed by the inner bottom surface 503 of the lower cover 501, the liquid cover 511, and the wall 512, and is output from the coolant output pipe 122.

The liquid cover 511 may be provided with a refrigerant input pipe through hole 513 and a refrigerant output pipe through hole 514 for allowing the refrigerant input pipe 123 and the refrigerant output pipe 124 that are connected to the refrigerant passage 301 to pass therethrough, respectively.

Although not shown in FIG. 36, the battery module group 103GP may be arranged on the liquid cover 511. The lower cover 501 and the liquid cover 511 in FIG. 36 may be elements constituting the planar member 402 described above. That is, the coolant layer 200 and the refrigerant layer 300 may be provided inside the planar member 402.

According to this configuration, the coolant flowing through the coolant layer 200 is cooled by the refrigerant flowing through the refrigerant layer 300. Therefore, the battery module group 103GP arranged on the liquid cover 511 can be cooled at high speed and uniformly by the coolant flowing through the coolant passage 201 as compared with a case of being cooled only by the refrigerant or only by the coolant.

Fourth Embodiment

The vehicle 1 and the battery pack 100 according to a fourth embodiment will be described. In the fourth embodiment, the same components as those in the first embodiment are denoted by the same reference numerals, and the description thereof may be omitted.

Background of Present Embodiment

JP5983534B2 discloses a vehicle battery temperature control system including a temperature control fluid heat exchange portion through which cooling water flows, a refrigerant heat exchange portion through which a refrigerant flows, and a battery, in which the refrigerant heat exchange portion is arranged on the temperature control fluid heat exchange portion, and the battery is arranged on the refrigerant heat exchange unit. The vehicle battery temperature control system cools the battery by the refrigerant flowing through the refrigerant heat exchange portion while performing heat exchange between the cooling water flowing through the temperature control fluid heat exchange portion and the refrigerant flowing through the refrigerant heat exchange portion.

In a case of the above configuration, the refrigerant has a large variation in temperature due to a change in saturation temperature caused by a pressure loss, and due to a flow and distribution bias of the gas-liquid two-phase refrigerant in the refrigerant heat exchange portion. Accordingly, the variation in the temperature of the battery cooled by the refrigerant is also large.

JP5983534B2 does not specify thicknesses of the refrigerant heat exchange portion and the temperature control fluid heat exchange portion. When the thickness of the refrigerant heat exchange portion is larger than the thickness of the temperature control fluid heat exchange portion, a capacity of the refrigerant becomes relatively large, and thus an amount of a compressor lubricating oil retained in the refrigerant heat exchange portion increases. Therefore, the compressor lubricating oil is insufficient in the compressor, and the compressor may be burned.

Hereinafter, as the fourth embodiment, the vehicle 1 and the battery pack 100 that solve the above problem will be disclosed. As described in the first embodiment, the vehicle 1 according to the fourth embodiment includes the vehicle body 2, the first wheels 3a, the second wheels 3b, the electric motor 4, the battery module group 103GP including the plurality of battery modules 103, the battery pack 100, the coolant layer 200, and the refrigerant layer 300.

Configuration Example of Battery Pack

Figure 37:
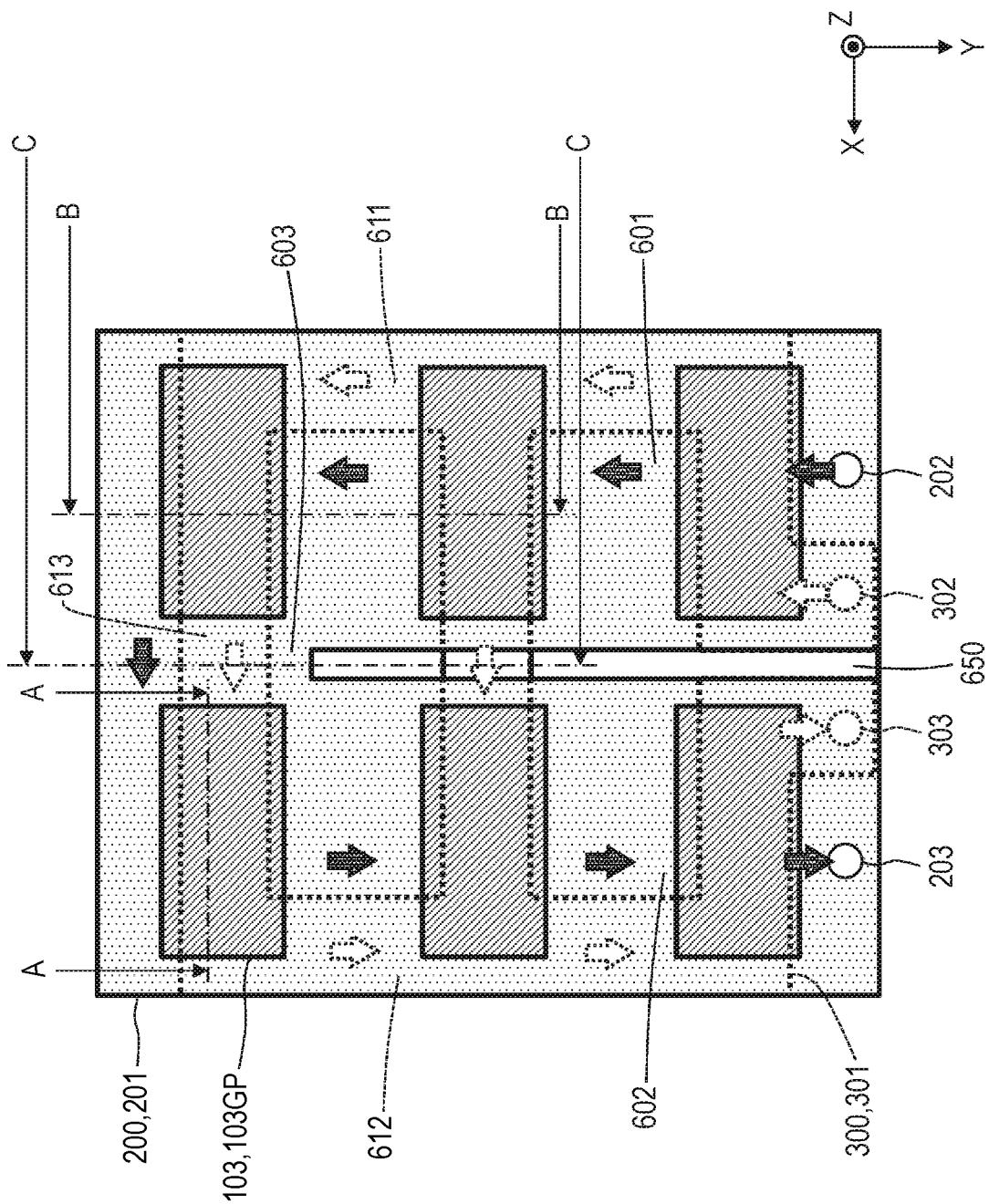
FIG. 37 is a plan view showing a configuration example of a battery pack according to a fourth embodiment.

FIG. 37 is a plan view (that is, a top view) showing a configuration example of the battery pack 100 according to the fourth embodiment.

The refrigerant layer 300 includes a first refrigerant passage 611 that extends rearward (in the negative direction of the Y axis), a second refrigerant passage 612 that is arranged parallel to the first refrigerant passage 611, and at least one third refrigerant passage 613 that connects the first refrigerant passage 611 and the second refrigerant passage 612. In addition, the refrigerant passage inlet 302, which is an inlet of the refrigerant, is provided in front of the first refrigerant passage 611, and the refrigerant passage outlet 303, which is an outlet of the refrigerant, is provided in front of the second refrigerant passage 612. The refrigerant flows in from the refrigerant passage inlet 302, passes through the first refrigerant passage 611, the third refrigerant passage 613, and the second refrigerant passage 612, and flows out from the refrigerant passage outlet 303, as indicated by white arrows in FIG. 37.

The coolant layer 200 includes a first coolant passage 601 that extends rearward (in the negative direction of the Y axis), a second coolant passage 602 that is arranged substantially parallel to the first coolant passage 601, and a third coolant passage 603 that connects the first coolant passage 601 and the second coolant passage 602 at a rear side. In addition, the coolant passage inlet 202, which is an inlet of the coolant, is provided in front of the first coolant passage 601, and the coolant passage outlet 203, which is an outlet of the coolant, is provided in front of the second coolant passage 602. The coolant flows in from the coolant passage inlet 202, passes through the first coolant passage 601, the third coolant passage 603, and the second coolant passage 602, and flows out from the coolant passage outlet 203, as indicated by shaded arrows in FIG. 37.

The coolant layer 200 is arranged on the refrigerant layer 300. The battery module group 103GP is arranged on the coolant layer 200. That is, the coolant flowing through the coolant layer 200 performs heat exchange with the refrigerant flowing through the refrigerant layer 300, and the coolant cools the battery module group 103GP.

First Configuration Example

Figure 38:
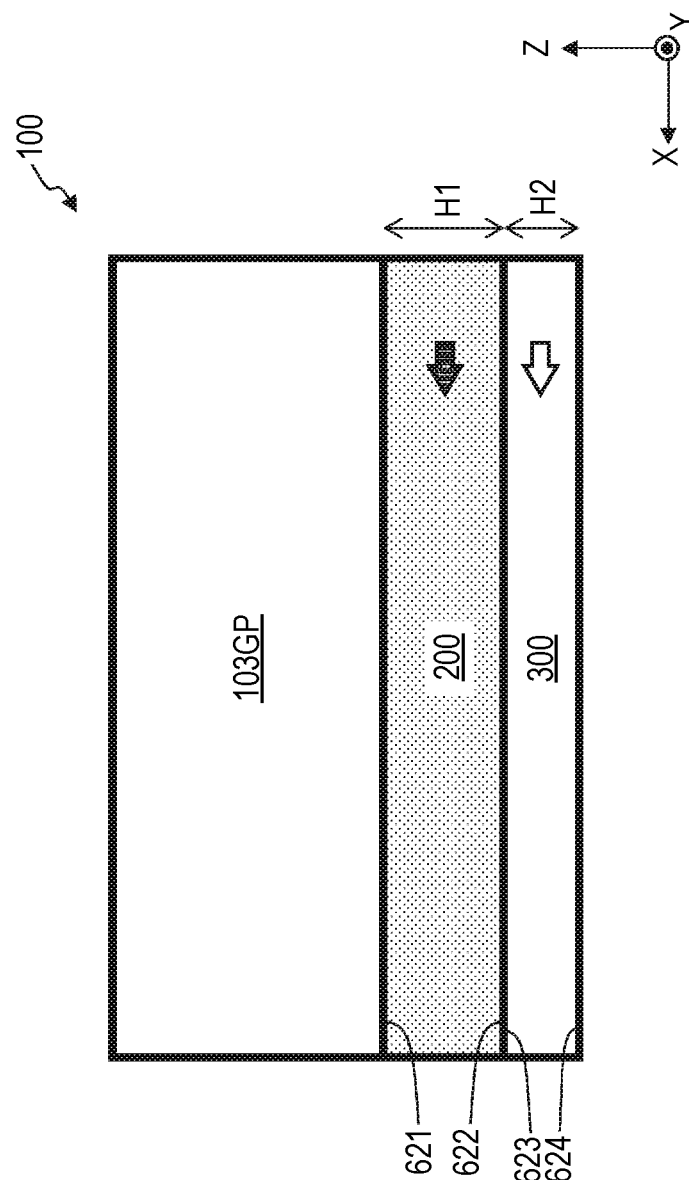
FIG. 38 is a cross-sectional view showing a first configuration example of the battery pack according to the fourth embodiment.

FIG. 38 is a cross-sectional view showing a first configuration example of the battery pack 100 according to the fourth embodiment. The cross-sectional view in FIG. 38 shows a cross section taken along a line A-A in FIG. 37. The cross-sectional view shown in FIG. 38 is not limited to the cross section taken along the line A-A in FIG. 37. For example, when the battery pack 100 includes the refrigerant passage 301 that extends linearly from the refrigerant passage inlet 302 toward the refrigerant passage outlet 303, and the coolant passage 201 that extends linearly from the coolant passage inlet 202 toward the coolant passage outlet 203 along the refrigerant passage 301, the cross-sectional view shown in FIG. 38 may show a cross section obtained by cutting the refrigerant passage 301 and the coolant passage 201 along the extending direction.

As shown in FIG. 38, the coolant layer 200 includes a first surface 621 and a second surface 622 opposite to the first surface 621. The refrigerant layer 300 includes a third surface 623 and a fourth surface 624 opposite to the third surface 623. The first surface 621 of the coolant layer 200 is closer to the battery module group 103GP than the second surface 622 of the coolant layer 200. The third surface 623 of the refrigerant layer 300 is closer to the battery module group 103GP than the fourth surface 624 of the refrigerant layer 300. The battery module group 103GP is arranged along the first surface 621 of the coolant layer 200. At least a part of the coolant layer 200 is arranged between the refrigerant layer 300 and the battery module group 103GP in a plan view (that is, when viewed from above).

According to this configuration, since the coolant flowing through the coolant layer 200 diffuses the temperature transmitted from the refrigerant flowing through the refrigerant layer 300, the variation in temperature of the coolant layer 200 is reduced. Accordingly, the variation in the temperature of the battery module group 103GP cooled by the coolant layer 200 is reduced.

A flow path cross-sectional area of a cross section of the coolant layer 200 orthogonal to a direction in which the coolant flows may be larger than a flow path cross-sectional area of a cross section of the refrigerant layer 300 orthogonal to a direction in which the refrigerant flows. A distance H1 between the first surface 621 and the second surface 622 of the coolant layer 200 may be larger than a distance H2 between the third surface 623 and the fourth surface 624 of the refrigerant layer 300.

According to this configuration, since a volume of the refrigerant layer 300 is smaller than a volume of the coolant layer 200, a capacity of the refrigerant is also relatively small. Accordingly, the amount of the compressor lubricating oil retained in the refrigerant layer 300 is also reduced. Therefore, the compressor lubricating oil is not insufficient in the compressor 141, and the compressor 141 can be prevented from being burned.

Second Configuration Example

Figure 39:
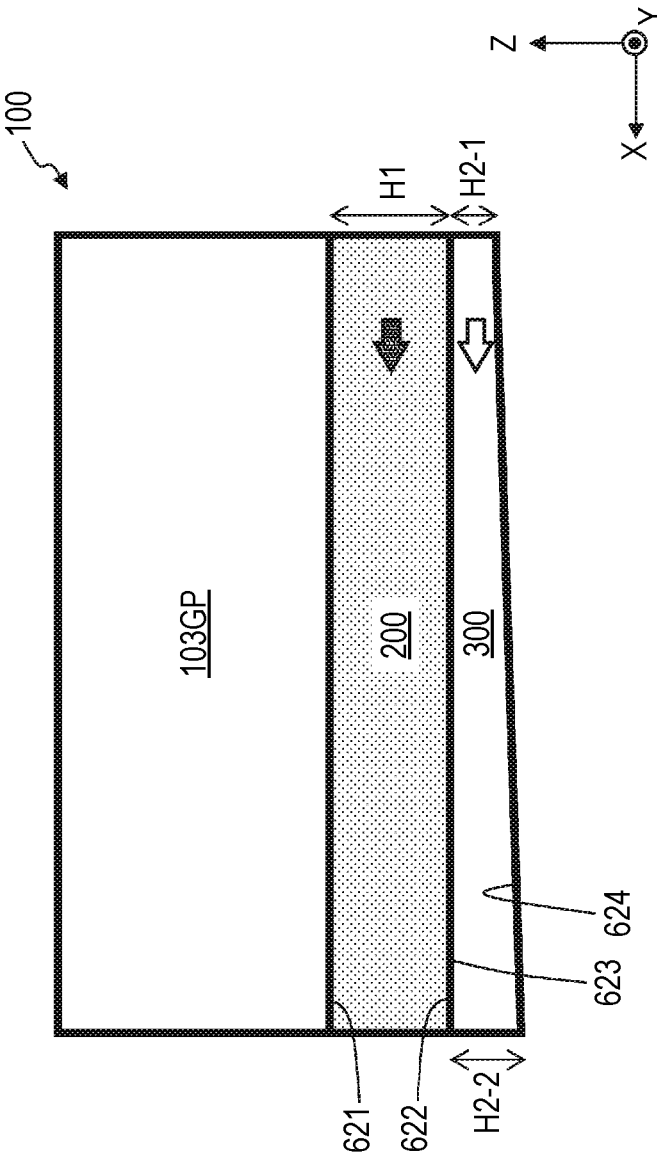
FIG. 39 is a cross-sectional view showing a second configuration example of the battery pack according to the fourth embodiment.

FIG. 39 is a cross-sectional view showing a second configuration example of the battery pack 100 according to the fourth embodiment. The cross-sectional view in FIG. 39 shows a cross section taken along a line A-A in FIG. 37. However, the cross-sectional view shown in FIG. 39 is not limited to the cross section taken along the line A-A in FIG. 37. For example, when the battery pack 100 includes the refrigerant passage 301 that extends linearly from the refrigerant passage inlet 302 toward the refrigerant passage outlet 303, and the coolant passage 201 that extends linearly from the coolant passage inlet 202 toward the coolant passage outlet 203 along the coolant passage 301, the cross-sectional view shown in FIG. 39 may show a cross section obtained by cutting the refrigerant passage 301 and the coolant passage 201 along the extending direction.

As shown in FIG. 37, the refrigerant layer 300 may include the refrigerant passage inlet 302 through which the refrigerant enters the refrigerant layer 300, and the refrigerant passage outlet 303 through which the refrigerant exits from the refrigerant layer 300. As shown in FIG. 39, a first distance H2-1 between the third surface 623 and the fourth surface 624 on a side closer to the refrigerant passage inlet 302 may be smaller than a second distance H2-2 between the third surface 623 and the fourth surface 624 on a side closer to the refrigerant passage outlet 303. The first distance H2-1 closer to the refrigerant passage inlet 302 and the second distance H2-2 closer to the refrigerant passage outlet 303 may be determined based on an expansion coefficient of the volume when the refrigerant changes from liquid to gas.

According to this configuration, the flow velocity of the refrigerant in the entire refrigerant passage 301 becomes uniform. Accordingly, the compressor lubricating oil is less likely to stay in the refrigerant layer 300. In addition, the pressure loss of the refrigerant can be reduced.

Third Configuration Example

Figure 40:
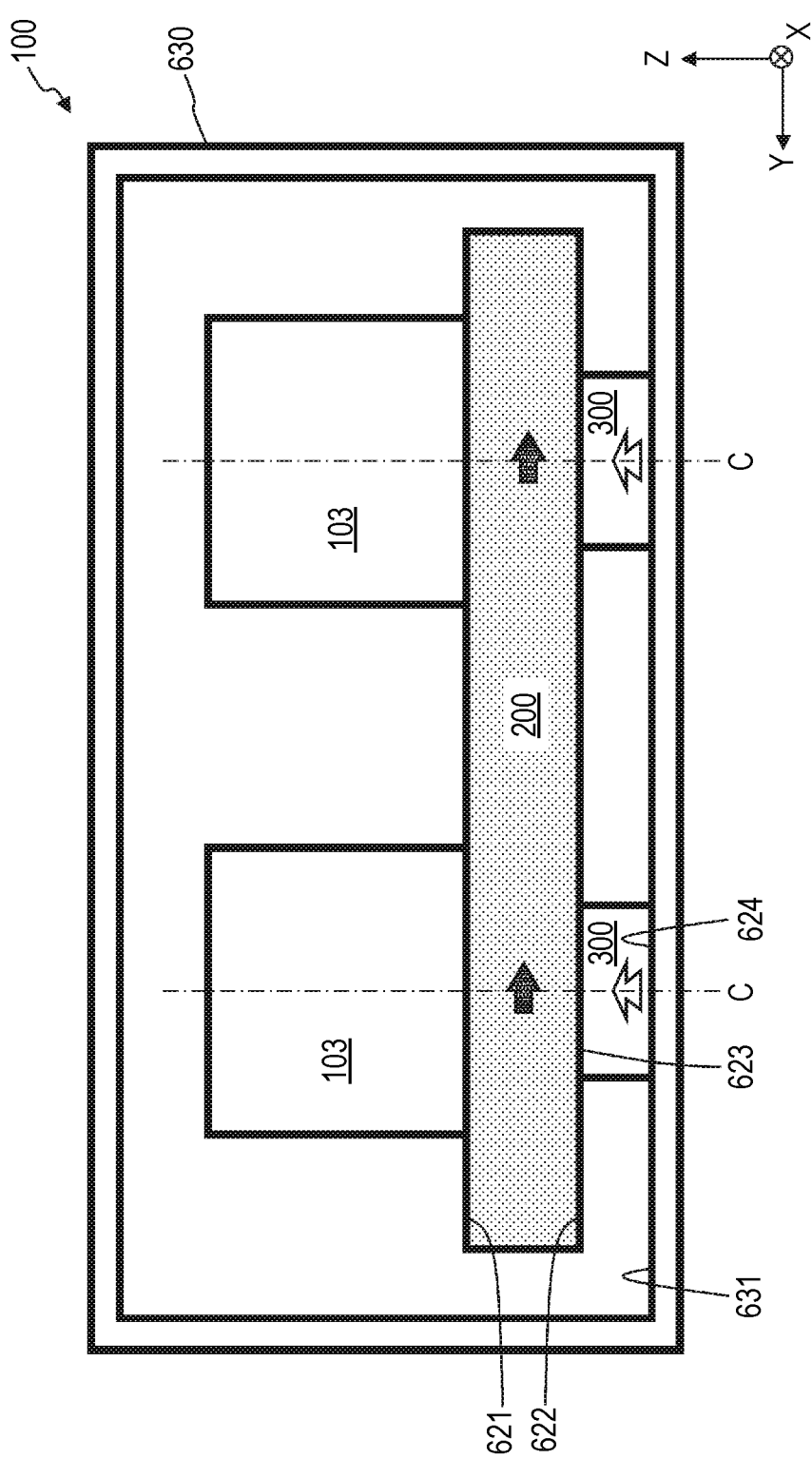
FIG. 40 is a cross-sectional view showing a third configuration example of the battery pack according to the fourth embodiment.

FIG. 40 is a cross-sectional view showing a third configuration example of the battery pack 100 according to the fourth embodiment. The cross-sectional view in FIG. 40 shows a cross section taken along a line B-B in FIG. 37. White arrows shown in FIG. 40 indicate that the refrigerant flows from a near side to a far side on the paper surface.

As shown in FIG. 40, the refrigerant layer 300 may not be arranged on the entire surface of the coolant layer 200, but may be arranged along a portion to be cooled (for example, the battery module 103). According to this configuration, it is possible to increase or decrease a cooling capacity for a cooling target by adjusting an arrangement position of the refrigerant layer 300. In FIG. 40, the plurality of battery modules 103 are arranged on the coolant layer 200, but the battery module group 103GP may be arranged on the coolant layer 200, and the refrigerant layer 300 may be arranged along a portion to be cooled.

As shown in FIG. 40, the refrigerant layer 300 may be arranged such that a center line C in a vertical direction of the battery module 103 and a center line C in a vertical direction of the refrigerant layer 300 coincide with each other in a YZ plane. According to this configuration, since the refrigerant layer 300 is arranged directly below the battery module 103, the battery module 103 can be efficiently cooled through the coolant layer 200.

Fourth Configuration Example

Figure 41:
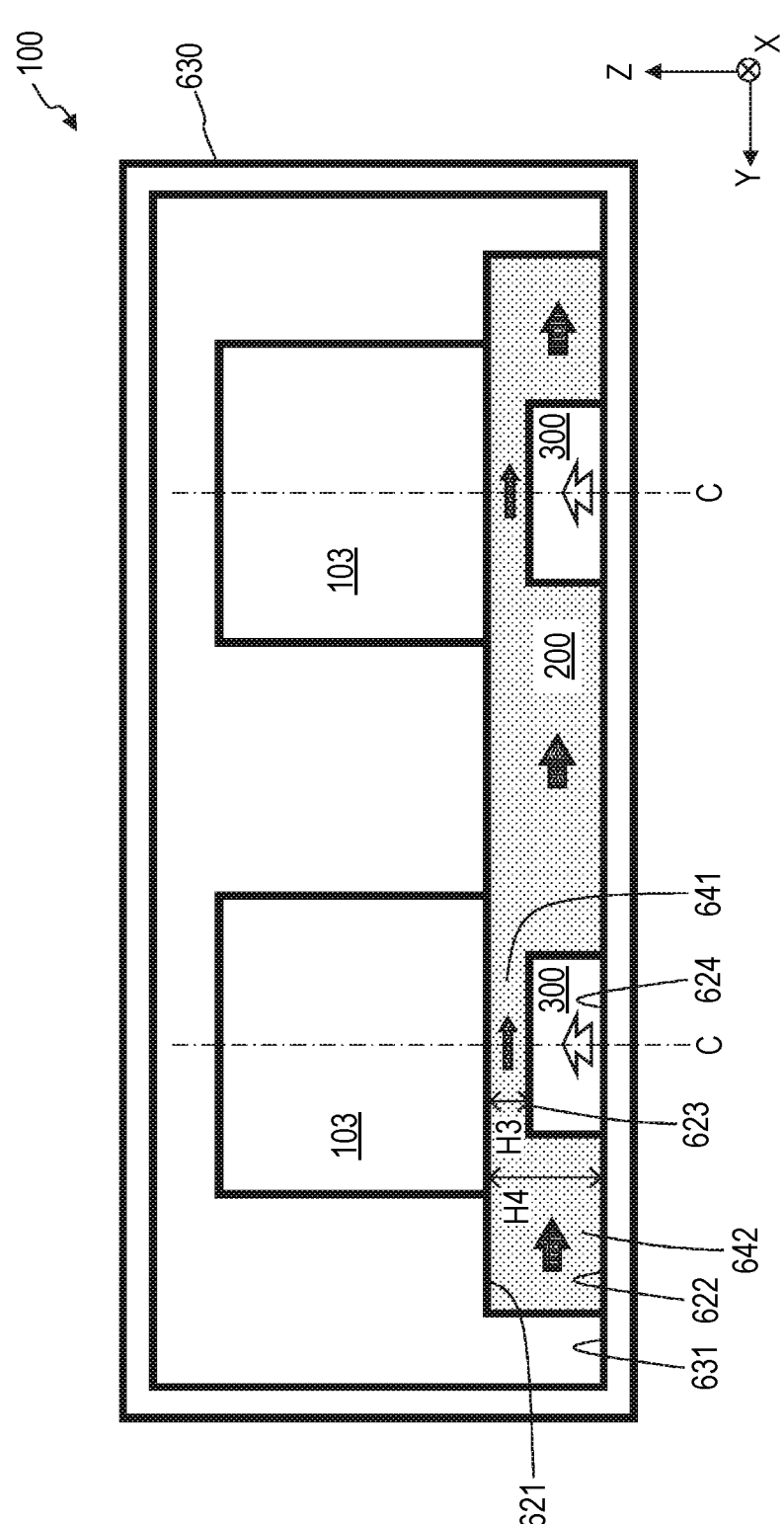
FIG. 41 is a cross-sectional view showing a fourth configuration example of the battery pack according to the fourth embodiment.

FIG. 41 is a cross-sectional view showing a fourth configuration example of the battery pack 100 according to the fourth embodiment. The cross-sectional view in FIG. 41 shows the cross section taken along the line B-B in FIG. 37. White arrows shown in FIG. 41 indicate that the refrigerant flows from a near side to a far side on the paper surface.

As shown in FIG. 41, at least a part of the third surface 623 of the refrigerant layer 300 may be arranged between the first surface 621 of the coolant layer 200 and the second surface 622 of the coolant layer 200. The fourth surface 624 corresponding to at least a part of the third surface 623 of the refrigerant layer 300 may extend along the second surface 622 of the coolant layer 200. At least a part of the inner surface 631 of the housing 630 of the battery pack 100 may be arranged along the second surface 622 of the coolant layer 200.

In a case of the configuration shown in FIG. 40, a height (thickness) of the housing 630 of the battery pack 100 is determined by a sum of heights (thicknesses) of the refrigerant layer 300, the coolant layer 200, and the battery module 103. On the other hand, in a case of the configuration shown in FIG. 41, since the refrigerant layer 300 is included in the coolant layer 200, the height (thickness) of the housing 630 of the battery pack 100 is determined by a sum of the heights (thicknesses) of the coolant layer 200 and the battery module 103. Accordingly, according to the configuration shown in FIG. 41, the height (thickness) of the housing 630 of the battery pack 100 can be reduced as compared with the configuration shown in FIG. 40.

In addition, in the case of the configuration shown in FIG. 40, deflection may occur in a portion of the second surface 622 of the coolant layer 200 that is not supported by the third surface 623 of the refrigerant layer 300. On the other hand, according to the configuration shown in FIG. 41, since a contact surface between the second surface 622 of the coolant layer 200 and the housing 630 (inner surface 631) of the battery pack 100 is increased, deflection does not occur in the second surface 622 of the coolant layer 200.

As shown in FIG. 41, a first distance H3 of a first flow path 641 through which the coolant flows between at least a part of the third surface 623 of the refrigerant layer 300 and the first surface 621 of the coolant layer 200 may be smaller than a second distance H4 of the second flow path 642 through which the coolant flows between the first surface 621 and the second surface 622 of the coolant layer 200. Similarly to the third configuration example, the refrigerant layer 300 may be arranged such that the center line C in the vertical direction of the battery module and the center line C in the vertical direction of the refrigerant layer 300 coincide with each other in the YZ plane. That is, one of the battery modules 103 constituting the battery module group 103GP may be arranged corresponding to the first flow path 641.

According to this configuration, since the first flow path 641 is narrower than the second flow path 642, a speed of the coolant flowing through the first flow path 641 is higher than a speed of the coolant flowing through the second flow path 642. Accordingly, in the first flow path 641 located immediately below the battery module 103, heat exchange among the battery module 103, the coolant, and the refrigerant can be promoted, and the battery module 103 can be efficiently cooled.

Fifth Configuration Example

Figure 42:
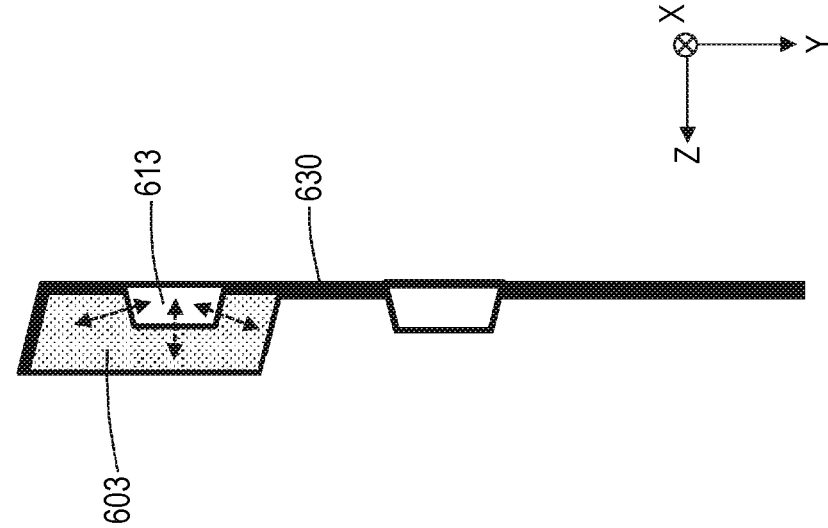
FIG. 42 is a cross-sectional view showing a fifth configuration example of the battery pack according to the fourth embodiment.
Figure 43:
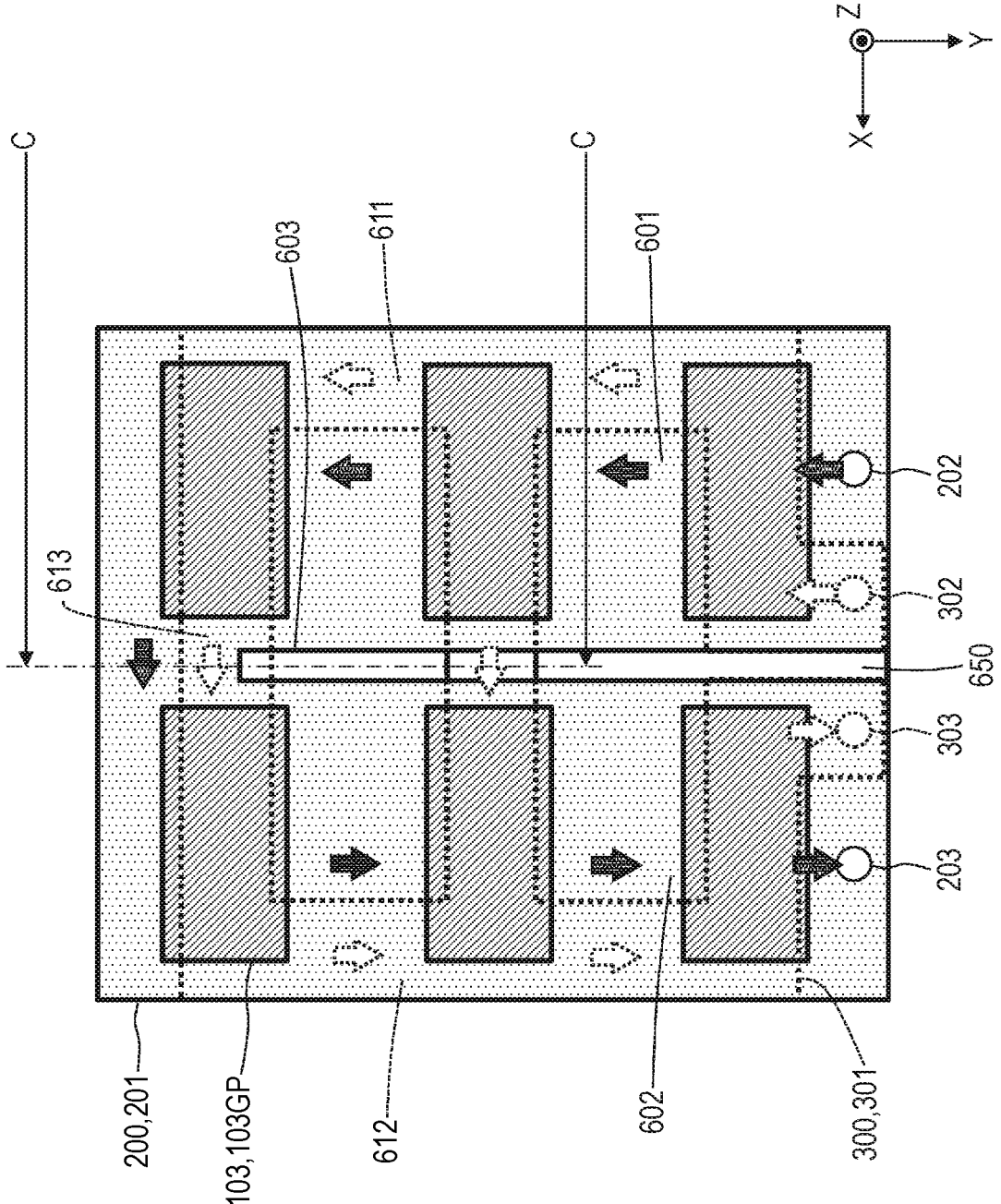
FIG. 43 is a plan view showing a configuration example of a battery pack for comparison with FIG. 42.
Figure 44:
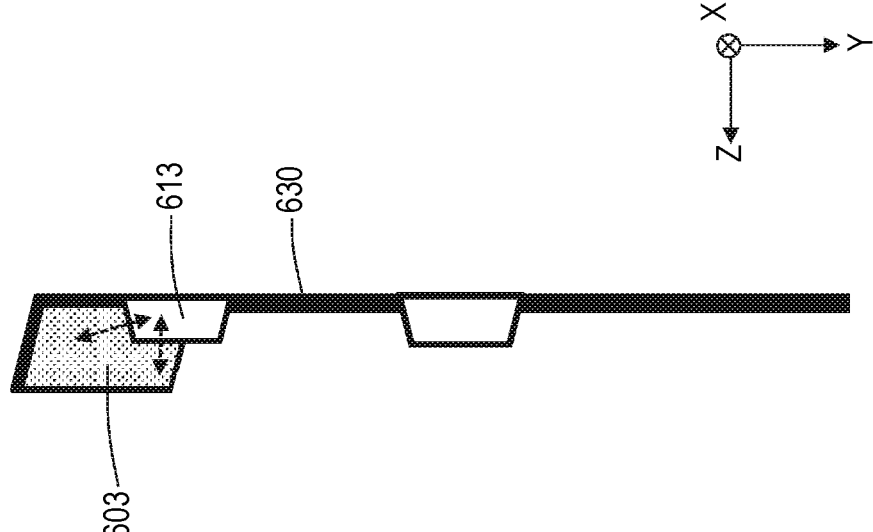
FIG. 44 is a cross-sectional view of the battery pack for comparison with FIG. 42.

FIG. 42 is a cross-sectional view showing a fifth configuration example of the battery pack 100 according to the fourth embodiment. The cross-sectional view in FIG. 42 shows a cross section taken along a C-C line in FIG. 37. FIG. 43 is a plan view showing a configuration example of the battery pack 100 for comparison with FIG. 37. FIG. 44 is a cross-sectional view of the battery pack 100 for comparison with FIG. 42. The cross-sectional view in FIG. 44 shows a cross section taken along a C-C line in the plan view of FIG. 43.

As shown in FIGS. 43 and 44, in a case of a configuration in which at least a part of the third refrigerant passage 613 in the refrigerant layer 300 is exposed from the third coolant passage 603 in the coolant layer 200, heat exchange between the refrigerant and the coolant is not performed in the exposed portion.

On the other hand, FIG. 42 shows a configuration in which the third coolant passage 603 in the coolant layer 200 includes the third refrigerant passage 613 in the refrigerant layer 300. In other words, FIG. 42 shows a configuration in which a partition wall 650 for constituting the U-shaped coolant passage 201 is provided so as to avoid the third coolant passage 613 which is farthest from the coolant passage inlet 302 or the refrigerant passage outlet 303.

According to this configuration, since a contact area between the refrigerant and the coolant is larger than that in FIGS. 43 and 44, it is possible to efficiently perform heat exchange between the refrigerant and the coolant.

Example of Combination of Configurations

The configuration shown in FIG. 38 or the configuration shown in FIG. 39 may be applied to the battery pack 100 shown in FIG. 37. Alternatively, the configuration shown in FIG. 38 may be applied to a part of the battery pack 100 shown in FIG. 37, and the configuration shown in FIG. 39 may be applied to another part of the battery pack 100 shown in FIG. 37.

The configuration shown in FIG. 40 or the configuration shown in FIG. 41 may be applied to the battery pack 100 shown in FIG. 37. In addition, the configuration shown in FIG. 38 or the configuration shown in FIG. 39 may be further applied to the battery pack 100 to which the configuration shown in FIG. 40 or the configuration shown in FIG. 41 is applied. Alternatively, the configuration shown in FIG. 38 may be applied to a part of the battery pack 100 to which the configuration shown in FIG. 40 or the configuration shown in FIG. 41 is applied, and the configuration shown in FIG. 39 may be applied to another part of the battery pack 100 to which the configuration shown in FIG. 40 or the configuration shown in FIG. 41 is applied.

The configuration shown in FIG. 41 and the configuration shown in FIG. 42 may be applied to the battery pack 100 shown in FIG. 37. Alternatively, the configuration shown in FIG. 41 and the configuration shown in FIG. 44 may be applied to the battery pack 100 shown in FIG. 37.

Although the embodiments have been described above with reference to the accompanying drawings, the present disclosure is not limited to such an example. It will be apparent to those skilled in the art that various changes, modifications, substitutions, additions, deletions, and equivalents can be conceived within the scope of the claims, and it should be understood that such changes, modifications, substitutions, additions, deletions, and equivalents also belong to the technical scope of the present disclosure. Components in the above-mentioned embodiments may be combined as desired within a range not departing from the spirit of the invention.

The present application is based on Japanese Patent Application No. 2020-162731 filed on Sep. 28, 2020, and the contents thereof are incorporated herein by reference. In addition, the present application is based on Japanese Patent Application No. 2020-162732 filed on Sep. 28, 2020, and the contents thereof are incorporated herein by reference. In addition, the present application is based on Japanese Patent Application No. 2020-162733 filed on Sep. 28, 2020, and the contents thereof are incorporated herein by reference. In addition, the present application is based on Japanese Patent Application No. 2020-169909 filed on Oct. 7, 2020, and the contents thereof are incorporated herein by reference.

<A-1>

A vehicle including:

a heat exchange plate that has a first surface and a second surface opposite to the first surface, the heat exchange plate including a coolant layer configured to allow a coolant to circulate between the first surface and the second surface, and a refrigerant layer configured to allow a refrigerant to circulate between the first surface and the second surface;

a battery module group including a plurality of battery modules, the battery module group being arranged along the first surface of the heat exchange plate;

a battery pack including a housing configured to store the heat exchange plate and the battery module group;

a vehicle body configured to store the battery pack;

a first wheel and a second wheel that are coupled to the vehicle body; and an electric motor configured to drive at least the first wheel using power supplied from the battery module group, wherein the housing of the battery pack includes:

a coolant input portion configured to allow the coolant to be input from an outside of the battery pack to the coolant layer;

a coolant output portion configured to allow the coolant to be output from the coolant layer to the outside of the battery pack;

a refrigerant input portion configured to allow the refrigerant to be input from the outside of the battery pack to the refrigerant layer;

a refrigerant output portion configured to allow the refrigerant to be output from the refrigerant layer to the outside of the battery pack; and a power input/output portion configured to input or output power between the battery module group and the outside of the battery pack, wherein the housing of the battery pack has a predetermined side in a plan view, wherein the coolant input portion, the coolant output portion, the refrigerant input portion, the refrigerant output portion, and the power input/output portion are arranged on the predetermined side, and wherein at least one of the refrigerant input portion and the refrigerant output portion is arranged between the power input/output portion and at least one of the coolant input portion and the coolant output portion.

<A-2>

The vehicle according to A-1, wherein the refrigerant input portion is arranged between the coolant input portion and the power input/output portion, and wherein the refrigerant output portion is arranged between the coolant output portion and the power input/output portion.

<A-3>

The vehicle according to A-1, wherein the refrigerant input portion and the refrigerant output portion are arranged between: the power input/output portion; and the coolant input portion and the coolant output portion.

<A-4>

The vehicle according to any one of A-1 to A-3, wherein the power input/output portion includes a connector having an electrical contact.

<A-5>

The vehicle according to any one of A-1 to A-4, wherein the coolant input portion is part of a first pipe, the first pipe continuing from the outside of the battery pack to the coolant layer, and wherein the coolant output portion is part of a second pipe, the second pipe continuing from the coolant layer to the outside of the battery pack.

<A-6>

The vehicle according to any one of A-1 to A-5, wherein the refrigerant input portion is part of a third pipe, the third pipe continuing from the outside of the battery pack to the refrigerant layer, and wherein the refrigerant output portion is part of a fourth pipe, the fourth pipe continuing from the refrigerant layer to the outside of the battery pack.

<A-7>

The vehicle according to any one of A-1 to A-6, wherein the housing of the battery pack has a predetermined surface arranged on the predetermined side and extending along a direction from the first surface to the second surface, and wherein the coolant input portion, the coolant output portion, the refrigerant input portion, the refrigerant output portion, and the power input/output portion are arranged on the predetermined surface of the predetermined side.

<A-8>

The vehicle according to any one of A-1 to A-7, wherein the housing of the battery pack has a predetermined shape having the predetermined side in the plan view, wherein the predetermined shape has a first side which is the predetermined side and a second side opposing the first side, and wherein the predetermined shape further includes a third side and a fourth side opposite to the third side, in addition to the first side and the second side.

<A-9>

The vehicle according to A-8, wherein the vehicle is movable in a predetermined direction by the first wheel and the second wheel, wherein at least the third side is longer than the first side, and wherein at least the third side is arranged along the predetermined direction.

<A-10>

The vehicle according to A-9, wherein the first side of the housing of the battery pack is arranged between the electric motor and the second side of the housing of the battery pack.

<A-11>

A battery pack mountable on a vehicle, the vehicle including a vehicle body, a first wheel and a second wheel that are coupled to the vehicle body, and an electric motor configured to drive at least the first wheel using power supplied from the battery pack, the battery pack including:

a heat exchanger plate that has a first surface and a second surface opposite to the first surface, the heat exchanger plate including a coolant layer configured to allow a coolant to circulate between the first surface and the second surface, and a refrigerant layer configured to allow a refrigerant to circulate between the first surface and the second surface;

a battery module group including a plurality of battery modules, the battery module group being arranged along the first surface of the heat exchange plate; and a housing configured to store the heat exchange plate and the battery module group, wherein the housing of the battery pack includes:

a coolant input portion configured to allow the coolant to be input from an outside of the battery pack to the coolant layer;

a coolant output portion configured to allow the coolant to be output from the coolant layer to the outside of the battery pack;

a refrigerant input portion configured to allow the refrigerant to be input from the outside of the battery pack to the refrigerant layer;

a refrigerant output portion configured to allow the refrigerant to be output from the refrigerant layer to the outside of the battery pack; and a power input/output portion configured to input or output power between the battery module group and the outside of the battery pack, wherein the housing of the battery pack has a predetermined side in a plan view, wherein the coolant input portion, the coolant output portion, the refrigerant input portion, the refrigerant output portion, and the power input/output portion are arranged on the predetermined side, and wherein at least one of the refrigerant input portion and the refrigerant output portion is arranged between the power input/output portion and at least one of the coolant input portion and the coolant output portion.

<A-12>

The battery pack according to A-11, wherein the refrigerant input portion is arranged between the coolant input portion and the power input/output portion, and wherein the refrigerant output portion is arranged between the coolant output portion and the power input/output portion.

<A-13>

The battery pack according to A-11, wherein the refrigerant input portion and the refrigerant output portion are arranged between: the power input/output portion; and the coolant input portion and the coolant output portion.

<A-14>

The battery pack according to any one of A-11 to A-13, wherein the power input/output portion includes a connector having an electrical contact.

<A-15>

The battery pack according to any one of A-11 to A-14, wherein the coolant input portion is part of a first pipe, the first pipe continuing from the outside of the battery pack to the coolant layer, and wherein the coolant output portion is part of a second pipe, the second pipe continuing from the coolant layer to the outside of the battery pack.

<A-16>

The battery pack according to any one of A-11 to A-15, wherein the refrigerant input portion is part of a third pipe, the third pipe continuing from the outside of the battery pack to the refrigerant layer, and wherein the refrigerant output portion is part of a fourth pipe, the fourth pipe continuing from the refrigerant layer to the outside of the battery pack.

<A-17>

The battery pack according to any one of A-11 to A-16, wherein the housing of the battery pack has a predetermined surface arranged on the predetermined side and extending along a direction from the first surface to the second surface, and wherein the coolant input portion, the coolant output portion, the refrigerant input portion, the refrigerant output portion, and the power input/output portion are arranged on the predetermined surface of the predetermined side.

<A-18>

The battery pack according to any one of A-11 to A-17, wherein the housing of the battery pack has a predetermined shape having the predetermined side in the plan view, wherein the predetermined shape has a first side which is the predetermined side and a second side opposing the first side, and wherein the predetermined shape further includes a third side and a fourth side opposite to the third side, in addition to the first side and the second side.

<A-19>

The battery pack according to A-18, wherein the vehicle is movable in a predetermined direction by the first wheel and the second wheel, wherein at least the third side is longer than the first side, and wherein at least the third side can be arranged along the predetermined direction.

<A-20>

The battery pack according to A-19, wherein the first side of the housing of the battery pack is arrangeable between the electric motor and the second side of the housing of the battery pack.

<B-1>

A vehicle including:

a heat exchanger plate that has a first surface and a second surface opposite to the first surface, the heat exchanger plate including a coolant layer configured to allow a coolant to circulate between the first surface and the second surface, and a refrigerant layer configured to allow a refrigerant to circulate between the first surface and the second surface;

a battery module group including a plurality of battery modules, the battery module group being arranged along the first surface of the heat exchange plate;

a battery pack including a housing configured to store the heat exchange plate and the battery module group;

a vehicle body configured to store the battery pack;

a first wheel and a second wheel that are coupled to the vehicle body; and an electric motor configured to drive at least the first wheel using power supplied from the battery module group, wherein the housing of the battery pack includes:

a coolant input portion configured to allow the coolant to be input from an outside of the battery pack to the coolant layer;

a coolant output portion configured to allow the coolant to be output from the coolant layer to the outside of the battery pack;

a refrigerant input portion configured to allow the refrigerant to be output from the outside of the battery pack to the refrigerant layer;

a refrigerant output portion configured to allow the refrigerant to be output from the refrigerant layer to the outside of the battery pack; and a power input/output portion configured to input or output power between the battery module group and the outside of the battery pack, wherein the housing of the battery pack has a predetermined side in a plan view, wherein the coolant input portion, the coolant output portion, the refrigerant input portion, the refrigerant output portion, and the power input/output portion are arranged on the predetermined side, and wherein at least one of the coolant input portion and the coolant output portion is arranged between the power input/output portion and at least one of the refrigerant input portion and the refrigerant output portion.

<B-2>

The vehicle according to B-1, wherein the coolant input portion is arranged between the refrigerant input portion and the power input/output portion, and wherein the coolant output portion is arranged between the refrigerant output portion and the power input/output portion.

<B-3>

The vehicle according to B-1, wherein the coolant input portion and the coolant output portion are arranged between: the power input/output portion; and the refrigerant input portion and the refrigerant output portion.

<B-4>

The vehicle according to any one of B-1 to B-3, wherein the power input/output portion includes a connector having an electrical contact.

<B-5>

The vehicle according to any one of B-1 to B-4, wherein the coolant input portion is part of a first pipe, the first pipe continuing from the outside of the battery pack to the coolant layer, and wherein the coolant output portion is part of a second pipe, the second pipe continuing from the coolant layer to the outside of the battery pack.

<B-6>

The vehicle according to B-5, wherein the refrigerant input portion is part of a third pipe, the third pipe continuing from the outside of the battery pack to the refrigerant layer, wherein the refrigerant output portion is part of a fourth pipe, the fourth pipe continuing from the refrigerant layer to the outside of the battery pack, and wherein an insulation property of at least one of the first pipe and the second pipe is higher than an insulation property of at least one of the third pipe and the fourth pipe.

<B-7>

The vehicle according to any one of B-1 to B-6, wherein the housing of the battery pack has a predetermined surface arranged on the predetermined side and extending along a direction from the first surface to the second surface, and wherein the coolant input portion, the coolant output portion, the refrigerant input portion, the refrigerant output portion, and the power input/output portion are arranged on the predetermined surface of the predetermined side.

<B-8>

The vehicle according to any one of B-1 to B-7, wherein the housing of the battery pack has a predetermined shape having the predetermined side in the plan view, wherein the predetermined shape has a first side which is the predetermined side and a second side opposing the first side, and wherein the predetermined shape further includes a third side and a fourth side opposite to the third side, in addition to the first side and the second side.

<B-9>

The vehicle according to B-8, wherein the vehicle is movable in a predetermined direction by the first wheel and the second wheel, wherein at least the third side is longer than the first side, and wherein at least the third side is arranged along the predetermined direction.

<B-10>

The vehicle according to B-9, wherein the first side of the housing of the battery pack is arranged between the electric motor and the second side of the housing of the battery pack.

<B-11>

A battery pack mountable on a vehicle, the vehicle including a vehicle body, a first wheel and a second wheel that are coupled to the vehicle body, and an electric motor configured to drive at least the first wheel using power supplied from the battery pack, the battery pack including:

a heat exchanger plate that has a first surface and a second surface opposite to the first surface, the heat exchanger plate including a coolant layer configured to allow a coolant to circulate between the first surface and the second surface, and a refrigerant layer configured to allow a refrigerant to circulate between the first surface and the second surface;

a battery module group including a plurality of battery modules, the battery module group being arranged along the first surface of the heat exchange plate; and a housing configured to store the heat exchange plate and the battery module group, wherein the housing of the battery pack includes:

a coolant input portion configured to allow the coolant to be input from an outside of the battery pack to the coolant layer;

a coolant output portion configured to allow the coolant to be output from the coolant layer to the outside of the battery pack;

a refrigerant input portion configured to allow the refrigerant to be input from the outside of the battery pack to the refrigerant layer;

a refrigerant output portion configured to allow the refrigerant to be output from the refrigerant layer to the outside of the battery pack; and a power input/output portion configured to input or output power between the battery module group and the outside of the battery pack, wherein the housing of the battery pack has a predetermined side in a plan view, wherein the coolant input portion, the coolant output portion, the refrigerant input portion, the refrigerant output portion, and the power input/output portion are arranged on the predetermined side, and wherein at least one of the coolant input portion and the coolant output portion is arranged between the power input/output portion and at least one of the refrigerant input portion and the refrigerant output portion.

<B-12>

The battery pack according to B-11, wherein the coolant input portion is arranged between the refrigerant input portion and the power input/output portion, and wherein the coolant output portion is arranged between the refrigerant output portion and the power input/output portion.

<B-13>

The battery pack according to B-11, wherein the coolant input portion and the coolant output portion are arranged between: the power input/output portion; and the refrigerant input portion and the refrigerant output portion.

<B-14>

The battery pack according to any one of B-11 to B-13, wherein the power input/output portion includes a connector having an electrical contact.

<B-15>

The battery pack according to any one of B-11 to B-14, wherein the coolant input portion is part of a first pipe, the first pipe continuing from the outside of the battery pack to the coolant layer, and wherein the coolant output portion is part of a second pipe, the second pipe continuing from the coolant layer to the outside of the battery pack.

<B-16>

The battery pack according to B-15, wherein the refrigerant input portion is part of a third pipe, the third pipe continuing from the outside of the battery pack to the refrigerant layer, wherein the refrigerant output portion is part of a fourth pipe, the fourth pipe continuing from the refrigerant layer to the outside of the battery pack, and wherein an insulation property of at least one of the first pipe and the second pipe is higher than an insulation property of at least one of the third pipe and the fourth pipe.

<B-17>

The battery pack according to any one of B-11 to B-16, wherein the housing of the battery pack has a predetermined surface arranged on the predetermined side and extending along a direction from the first surface to the second surface, and wherein the coolant input portion, the coolant output portion, the refrigerant input portion, the refrigerant output portion, and the power input/output portion are arranged on the predetermined surface of the predetermined side.

<B-18>

The battery pack according to any one of B-11 to B-17, wherein the housing of the battery pack has a predetermined shape having the predetermined side in the plan view, wherein the predetermined shape has a first side which is the predetermined side and a second side opposing the first side, and wherein the predetermined shape further includes a third side and a fourth side opposite to the third side, in addition to the first side and the second side.

<B-19>

The battery pack according to B-18, wherein the vehicle is movable in a predetermined direction by the first wheel and the second wheel, wherein at least the third side is longer than the first side, and wherein at least the third side can be arranged along the predetermined direction.

<B-20>

The battery pack according to B-19, wherein the first side of the housing of the battery pack is arrangeable between the electric motor and the second side of the housing of the battery pack.

<C-1>

A vehicle including:

a battery module group including a plurality of battery modules;

a battery pack including a housing configured to store the battery module group;

a vehicle body configured to store the battery pack;

a refrigerant layer configured to allow a refrigerant to circulate;

a coolant layer configured to allow a coolant to circulate;

a first wheel and a second wheel that are coupled to the vehicle body; and an electric motor configured to drive at least the first wheel using power supplied from the battery module group, wherein the housing of the battery pack has a predetermined inner surface, wherein the battery module group, the refrigerant layer, and the coolant layer are arranged along the predetermined inner surface, and wherein the coolant layer is arranged outside the predetermined inner surface of the housing of the battery pack and inside the vehicle body.

<C-2>

The vehicle according to C-1, wherein at least part of the refrigerant layer is arranged between the battery module group and the coolant layer.

<C-3>

The vehicle according to C-1, wherein the battery module group includes at least a first battery module and a second battery module, and wherein at least part of the refrigerant layer is arranged between the first battery module and the second battery module.

<C-4>

The vehicle according to any one of C-1 to C-3, wherein the housing of the battery pack includes a planar member having a predetermined thickness on the predetermined inner surface, and wherein the coolant layer is provided inside the planar member.

<C-5>

The vehicle according to any one of C-1 to C-3, wherein the housing of the battery pack includes a planar member having a predetermined thickness on the predetermined inner surface, wherein the planar member has a predetermined outer surface opposite to the predetermined inner surface and extending along the predetermined inner surface, and wherein the coolant layer is arranged along the predetermined outer surface, outside the housing of the battery pack, and inside the vehicle body.

<C-6>

The vehicle according to any one of C-1 to C-5, wherein the coolant layer has a first surface and a second surface opposite to the first surface, wherein the first surface of the coolant layer is arranged between the refrigerant layer and the second surface of the coolant layer, wherein the vehicle further including:

a first adjacent member arranged adjacent to the first surface of the coolant layer; and a second adjacent member arranged adjacent to the second surface of the coolant layer, and wherein a first thermal conductivity of the first adjacent member is higher than a second thermal conductivity of the second adjacent member.

<C-7>

The vehicle according to C-6, wherein the first adjacent member has a planar shape.

<C-8>

The vehicle according to C-1, wherein the housing of the battery pack includes a planar member having a predetermined thickness on the predetermined inner surface, and wherein the coolant layer and the refrigerant layer are provided inside the planar member.

<C-9>

The vehicle according to any one of C-1 to C-8, wherein the housing of the battery pack is sealed.

<C-10>

The vehicle according to any one of C-1 to C-9, wherein the housing of the battery pack includes a first housing member and a second housing member, wherein the first housing member has the predetermined inner surface, and wherein the battery module group is arranged between the first housing member and the second housing member.

<C-11>

A battery pack allowed to be stored in a vehicle, the vehicle including a vehicle body, a first wheel and a second wheel that are coupled to a vehicle body, and an electric motor configured to drive at least the first wheel, the battery pack including:

a battery module group including a plurality of battery modules;

a housing configured to store the battery module group;

a refrigerant layer configured to allow a refrigerant to circulate; and a coolant layer configured to allow a coolant to circulate, wherein the housing has a predetermined inner surface, wherein the battery module group, the refrigerant layer, and the coolant layer are arranged along the predetermined inner surface, and wherein the coolant layer is arranged outside the predetermined inner surface of the housing.

<C-12>

The battery pack according to C-11, wherein at least part of the refrigerant layer is arranged between the battery module group and the coolant layer.

<C-13>

The battery pack according to C-11, wherein the battery module group includes at least a first battery module and a second battery module, and wherein at least part of the refrigerant layer is arranged between the first battery module and the second battery module.

<C-14>

The battery pack according to any one of C-11 to C-13, wherein the housing includes a planar member having a predetermined thickness on the predetermined inner surface, and wherein the coolant layer is provided inside the planar member.

<C-15>

The battery pack according to any one of C-11 to C-13, wherein the housing includes a planar member having a predetermined thickness on the predetermined inner surface, wherein the planar member has a predetermined outer surface opposite to the predetermined inner surface and extending along the predetermined inner surface, and wherein the coolant is arranged outside the housing along the predetermined outer surface.

<C-16>

The battery pack according to any one of C-11 to C-15, wherein the coolant layer has a first surface and a second surface opposite to the first surface, wherein the first surface of the coolant layer is arranged between the refrigerant layer and the second surface of the coolant layer, wherein the battery pack further including:

a first adjacent member arranged adjacent to the first surface of the coolant layer; and a second adjacent member arranged adjacent to the second surface of the coolant layer, and wherein a first thermal conductivity of the first adjacent member is higher than a second thermal conductivity of the second adjacent member.

<C-17>

The battery pack according to C-16, wherein the first adjacent member has a planar shape.

<C-18>

The battery pack according to C-11, wherein the housing of the battery pack includes a planar member having a predetermined thickness on the predetermined inner surface, and wherein the coolant layer and the refrigerant layer are provided inside the planar member.

<C-19>

The battery pack according to any one of C-11 to C-18, wherein the housing is sealed.

<C-20>

The battery pack according to any one of C-11 to C-19, wherein the housing includes a first housing member and a second housing member, wherein the first housing member has the predetermined inner surface, and wherein the battery module group is arranged between the first housing member and the second housing member.

<D-1>

A vehicle including:

a battery module group including a plurality of battery modules;

a coolant layer configured to allow a coolant to circulate;

a refrigerant layer configured to allow a refrigerant to circulate;

a first wheel and a second wheel that are coupled to a vehicle body;

an electric motor configured to drive at least the first wheel using power supplied from the battery module group, wherein the coolant layer has a first surface and a second surface opposite to the first surface, wherein the refrigerant layer has a third surface and a fourth surface opposite to the third surface, wherein the first surface of the coolant layer is closer to the battery module group than the second surface of the coolant layer, wherein the third surface of the refrigerant layer is closer to the battery module group than the fourth surface of the refrigerant layer, wherein the battery module group is arranged along the first surface of the coolant layer, and wherein at least part of the coolant layer is arranged between the refrigerant layer and the battery module group in a plan view.

<D-2>

The vehicle according to D-1, wherein a flow path cross-sectional area of the coolant layer is larger than a flow path cross-sectional area of the refrigerant layer.

<D-3>

The vehicle according to D-1 or D-2, wherein a distance between the first surface and the second surface of the coolant layer is larger than a distance between the third surface and the fourth surface of the refrigerant layer.

<D-4>

The vehicle according to any one of D-1 to D-3, wherein the refrigerant layer includes an inlet through which the refrigerant enters the refrigerant layer and an outlet through which the refrigerant exits from the refrigerant layer, and wherein a first distance between the third surface and the fourth surface at the inlet is smaller than a second distance between the third surface and the fourth surface at the outlet.

<D-5>

The vehicle according to any one of D-1 to D-4, wherein at least part of the third surface of the refrigerant layer is arranged between the first surface of the coolant layer and the second surface of the coolant layer.

<D-6>

The vehicle according to D-5, wherein the fourth surface corresponding to the at least part of the third surface of the refrigerant layer is along the second surface of the coolant layer.

<D-7>

The vehicle according to D-6, including:

a battery pack housing configured to store at least the battery module group, the coolant layer, and the refrigerant layer, wherein at least part of an inner surface of the battery pack housing is arranged along the second surface of the coolant layer.

<D-8>

The vehicle according to any one of D-5 to D-7, wherein a first distance of a first flow path through which the coolant flows between the at least part of the third surface of the refrigerant layer and the first surface of the coolant layer is smaller than a second distance of a second flow path through which the coolant flows between the first surface and the second surface of the coolant layer.

<D-9>

The vehicle according to D-8, wherein one of the plurality of battery modules constituting the battery module group is arranged corresponding to the first flow path.

<D-10>

The vehicle according to any one of D-5 to D-9, wherein the coolant layer includes a first coolant passage, a second coolant passage arranged in parallel with the first coolant passage, and a third coolant passage that connects the first coolant passage and the second coolant passage, wherein the refrigerant layer includes a first refrigerant passage, a second refrigerant passage arranged in parallel with the first refrigerant passage, and a third refrigerant passage that connects the first refrigerant passage and the second refrigerant passage, and wherein the third coolant passage includes the third refrigerant passage.

<D-11>

A battery pack mountable on a vehicle, the vehicle including a first wheel and a second wheel that are coupled to a vehicle body, and an electric motor configured to drive at least the first wheel, the battery pack including:

a battery module group including a plurality of battery modules;

a coolant layer configured to allow a coolant to circulate; and a refrigerant layer configured to allow a refrigerant to circulate, wherein the coolant layer has a first surface and a second surface opposite to the first surface, wherein the refrigerant layer has a third surface and a fourth surface opposite to the third surface, wherein the first surface of the coolant layer is closer to the battery module group than the second surface of the coolant layer, wherein the third surface of the refrigerant layer is closer to the battery module group than the fourth surface of the refrigerant layer, wherein the battery module group is arranged along the first surface of the coolant layer, and wherein at least part of the coolant layer is arranged between the refrigerant layer and the battery module group in a plan view.

<D-12>

The battery pack according to D-11, wherein a flow path cross-sectional area of the coolant layer is larger than a flow path cross-sectional area of the refrigerant layer.

<D-13>

The battery pack according to D-11 or D-12, wherein a distance between the first surface and the second surface of the coolant layer is larger than a distance between the third surface and the fourth surface of the refrigerant layer.

<D-14>

The battery pack according to any one of D-11 to D-13, wherein the refrigerant layer includes an inlet through which the refrigerant enters the refrigerant layer and an outlet through which the refrigerant exits from the refrigerant layer, and wherein a first distance between the third surface and the fourth surface at the inlet is smaller than a second distance between the third surface and the fourth surface at the outlet.

<D-15>

The battery pack according to any one of D-11 to D-14, wherein at least part of the third surface of the refrigerant layer is arranged between the first surface of the coolant layer and the second surface of the coolant layer.

<D-16>

The battery pack according to D-15, wherein the fourth surface corresponding to the at least part of the third surface of the refrigerant layer is along the second surface of the coolant layer.

<D-17>

The battery pack according to D-16 including:

a battery pack housing configured to store at least the battery module group, the coolant layer, and the refrigerant layer, wherein at least part of an inner surface of the battery pack housing is arranged along the second surface of the coolant layer.

<D-18>

The battery pack according to any one of D-15 to D-17, wherein a first distance of a first flow path through which the coolant flows between the at least part of the third surface of the refrigerant layer and the first surface of the coolant layer is smaller than a second distance of a second flow path through which the coolant flows between the first surface and the second surface of the coolant layer.

51

<D-19>

The battery pack according to D-18, wherein one of the plurality of battery modules constituting the battery module group is arranged corresponding to the first flow path.

<D-20>

The battery pack according to any one of D-15 to D-19, wherein the coolant layer includes a first coolant passage, a second coolant passage arranged in parallel with the first coolant passage, and a third coolant passage that connects the first coolant passage and the second coolant passage, wherein the refrigerant layer includes a first refrigerant passage, a second refrigerant passage arranged in parallel with the first refrigerant passage, and a third refrigerant passage that connects the first refrigerant passage and the second refrigerant passage, and wherein the third coolant passage includes the third refrigerant passage.

The technique of the present disclosure is useful for a vehicle driven by an in-vehicle battery.

The invention claimed is:

1. A vehicle comprising:

a battery module group including at least a first battery module, a second battery module, and a third battery module;

a coolant layer configured to allow a coolant to circulate;

a refrigerant layer configured to allow a refrigerant to circulate;

a first wheel and a second wheel that are coupled to a vehicle body;

an electric motor configured to drive at least the first wheel using power supplied from the battery module group, wherein the coolant layer has a first surface and a second surface opposite to the first surface, wherein the refrigerant layer has a third surface and a fourth surface opposite to the third surface, wherein the first surface of the coolant layer is closer to the battery module group than the second surface of the coolant layer, wherein the third surface of the refrigerant layer is closer to the battery module group than the fourth surface of the refrigerant layer, wherein the battery module group is arranged along the first surface of the coolant layer, wherein the coolant layer includes a first coolant passage arranged to extend from one end side to another end side of the vehicle along the travel direction, a second coolant passage arranged to extend from the other end side to the one end side along the travel direction, and a third coolant passage connecting the first coolant passage and the second coolant passage at the other end side, and the coolant is configured to circulate through the first coolant passage, the third coolant passage, and the second coolant passage, wherein the refrigerant layer includes a first refrigerant passage arranged to extend from the one end side to the other end side of the vehicle along the travel direction, a second refrigerant passage arranged to extend from the other end side to the one end side along the travel direction, a third refrigerant passage extending along a width direction perpendicular to the travel direction and connecting the first refrigerant passage and the second refrigerant passage, and a fourth refrigerant passage extending along the width direction and connecting the first refrigerant passage and the second refrigerant passage, the fourth refrigerant passage being located closer to the one end side than the third refrigerant passage, and the refrigerant is configured to circulate through the first refrigerant passage, the third refrigerant passage, the fourth refrigerant passage, and the second refrigerant passage, wherein a first part of the fourth refrigerant passage overlaps the first coolant passage, and a second part of the fourth refrigerant passage overlaps the second coolant passage, the second part of the fourth refrigerant passage being different from the first part of the fourth refrigerant passage, wherein at least a part of the first battery module corresponds to the first part of the fourth refrigerant passage and overlaps the first coolant passage, at least a part of the second battery module corresponds to the second part of the fourth refrigerant passage and overlaps the second coolant passage, and at least a part of the third battery module corresponds to the third refrigerant passage and overlaps the third coolant passage, and wherein at least part of the coolant layer is arranged between the refrigerant layer and the battery module group in a plan view.

2. The vehicle according to claim 1, wherein a flow path cross-sectional area of the coolant layer is larger than a flow path cross-sectional area of the refrigerant layer.

3. The vehicle according to claim 1, wherein a distance between the first surface and the second surface of the coolant layer is larger than a distance between the third surface and the fourth surface of the refrigerant layer.

4. The vehicle according to claim 1, wherein the refrigerant layer includes an inlet through which the refrigerant enters the refrigerant layer and an outlet through which the refrigerant exits from the refrigerant layer, and wherein a first distance between the third surface and the fourth surface at the inlet is smaller than a second distance between the third surface and the fourth surface at the outlet.

5. The vehicle according to claim 1, wherein at least part of the third surface of the refrigerant layer is arranged between the first surface of the coolant layer and the second surface of the coolant layer.

6. The vehicle according to claim 5, wherein the fourth surface corresponding to the at least part of the third surface of the refrigerant layer is along the second surface of the coolant layer.

7. The vehicle according to claim 6, comprising:

a battery pack housing configured to store at least the battery module group, the coolant layer, and the refrigerant layer, wherein at least part of an inner surface of the battery pack housing is arranged along the second surface of the coolant layer.

8. The vehicle according to claim 5, wherein a first distance of a first flow path through which the coolant flows between the at least part of the third surface of the refrigerant layer and the first surface of the coolant layer is smaller than a second distance of a second flow path through which the coolant flows between the first surface and the second surface of the coolant layer.

9. A battery pack configured to be mounted on a vehicle, comprising:

a battery module group including at least a first battery module, a second battery module, and a third battery module;

a coolant layer configured to allow a coolant to circulate; and a refrigerant layer configured to allow a refrigerant to circulate, wherein the coolant layer has a first surface and a second surface opposite to the first surface, wherein the refrigerant layer has a third surface and a fourth surface opposite to the third surface, wherein the first surface of the coolant layer is closer to the battery module group than the second surface of the coolant layer, wherein the third surface of the refrigerant layer is closer to the battery module group than the fourth surface of the refrigerant layer, wherein the battery module group is arranged along the first surface of the coolant layer, wherein the coolant layer includes a first coolant passage arranged to extend from one end side to another end side of the battery pack along a first direction, a second coolant passage arranged to extend from the other end side to the one end side along the first direction, and a third coolant passage connecting the first coolant passage and the second coolant passage at the other end side, and the coolant is configured to circulate through the first coolant passage, the third coolant passage, and the second coolant passage, wherein the refrigerant layer includes a first refrigerant passage arranged to extend from the one end side to the other end side of the battery pack along the first direction, a second refrigerant passage arranged to extend from the other end side to the one end side along the first direction, a third refrigerant passage extending along a second direction perpendicular to the first direction and connecting the first refrigerant passage and the second refrigerant passage, and a fourth refrigerant passage extending along the second direction and connecting the first refrigerant passage and the second refrigerant passage, the fourth refrigerant passage being located closer to the one end side than the third refrigerant passage, and the refrigerant is configured to circulate through the first refrigerant passage, the third refrigerant passage, the fourth refrigerant passage, and the second refrigerant passage, wherein a first part of the fourth refrigerant passage overlaps the first coolant passage, and a second part of the fourth refrigerant passage overlaps the second coolant passage, the second part of the fourth refrigerant passage being different from the first part of the fourth refrigerant passage, wherein at least a part of the first battery module corresponds to the first part of the fourth refrigerant passage and overlaps the first coolant passage, at least a part of the second battery module corresponds to the second part of the fourth refrigerant passage and overlaps the second coolant passage, and at least a part of the third battery module corresponds to the third refrigerant passage and overlaps the third coolant passage, and wherein at least part of the coolant layer is arranged between the refrigerant layer and the battery module group in a plan view.

10. The battery pack according to claim 9, wherein a flow path cross-sectional area of the coolant layer is larger than a flow path cross-sectional area of the refrigerant layer.

11. The battery pack according to claim 9, wherein a distance between the first surface and the second surface of the coolant layer is larger than a distance between the third surface and the fourth surface of the refrigerant layer.

12. The battery pack according to claim 9, wherein the refrigerant layer includes an inlet through which the refrigerant enters the refrigerant layer and an outlet through which the refrigerant exits from the refrigerant layer, and wherein a first distance between the third surface and the fourth surface at the inlet is smaller than a second distance between the third surface and the fourth surface at the outlet.

13. The battery pack according to claim 9, wherein at least part of the third surface of the refrigerant layer is arranged between the first surface of the coolant layer and the second surface of the coolant layer.

14. The battery pack according to claim 13, wherein the fourth surface corresponding to the at least part of the third surface of the refrigerant layer is along the second surface of the coolant layer.

15. The battery pack according to claim 14 comprising:

a battery pack housing configured to store at least the battery module group, the coolant layer, and the refrigerant layer, wherein at least part of an inner surface of the battery pack housing is arranged along the second surface of the coolant layer.

16. The battery pack according to claim 13, wherein a first distance of a first flow path through which the coolant flows between the at least part of the third surface of the refrigerant layer and the first surface of the coolant layer is smaller than a second distance of a second flow path through which the coolant flows between the first surface and the second surface of the coolant layer.

17. The vehicle according to claim 1, wherein the third refrigerant passage connects an end of the first refrigerant passage at the other end side and an end of the second refrigerant passage at the other end side.

18. The vehicle according to claim 9, wherein the third refrigerant passage connects an end of the first refrigerant passage at the other end side and an end of the second refrigerant passage at the other end side.

19. The vehicle according to claim 1, wherein the first battery module is adjacent to the second battery module in the width direction, and is adjacent to the third battery module in the travel direction.

20. The vehicle according to claim 9, wherein the first battery module is adjacent to the second battery module in the first direction, and is adjacent to the third battery module in the second direction.

* * * * *